United States Patent [19]

Hanei

[11] Patent Number: 5,530,331
[45] Date of Patent: Jun. 25, 1996

[54] ENCODER, SERVO SYSTEM AND INDUSTRIAL ROBOT

[75] Inventor: Hiroyuki Hanei, Chiba, Japan

[73] Assignee: Hitachi, Ltd., Tokyo, Japan

[21] Appl. No.: 422,758

[22] Filed: Apr. 14, 1995

Related U.S. Application Data

[63] Continuation of Ser. No. 145,728, Nov. 4, 1993, abandoned, which is a continuation of Ser. No. 847,686, Mar. 6, 1992, abandoned.

[30] Foreign Application Priority Data

Mar. 6, 1991 [JP] Japan ..................... 3-039835

[51] Int. Cl.⁶ .................................. G05B 11/18
[52] U.S. Cl. .................. 318/592; 318/625; 318/661; 318/595; 318/602
[58] Field of Search ................... 318/560–646, 318/685, 696; 250/231 SE; 340/347 P, 347 AD, 347 SY; 364/183, 174, 519

[56] References Cited

U.S. PATENT DOCUMENTS

| | | | |
|---|---|---|---|
| 3,882,487 | 5/1975 | Rosenberg . | |
| 3,932,794 | 1/1976 | Iwako | 318/138 |
| 3,990,062 | 11/1976 | Miller et al. . | |
| 4,079,374 | 3/1978 | Cox, Jr. . | |
| 4,201,911 | 5/1980 | Dering | 250/231 SE |
| 4,308,525 | 12/1981 | Simon et al. | 340/347 SY |
| 4,353,020 | 10/1982 | Veale | 318/601 |
| 4,426,608 | 1/1984 | Larson et al. | 318/685 |
| 4,429,267 | 1/1984 | Veale | 318/594 |
| 4,465,928 | 8/1984 | Breslow | 250/231 SE |
| 4,591,969 | 5/1986 | Bloom et al. | 364/183 |
| 4,631,523 | 12/1986 | Ono et al. . | |
| 4,647,827 | 3/1987 | Toyoda et al. | 318/592 |
| 4,780,703 | 10/1988 | Ishida et al. | 250/231 SE X |
| 4,837,493 | 6/1989 | Maeno et al. | 318/685 |
| 4,849,680 | 7/1989 | Miyamoto | 318/602 |
| 4,884,016 | 11/1989 | Aiello | 318/685 |
| 4,999,558 | 3/1991 | Onodera et al. | 318/685 |
| 5,013,988 | 5/1991 | Sakano | 318/602 |

FOREIGN PATENT DOCUMENTS

| | | |
|---|---|---|
| 0154654 | 9/1985 | European Pat. Off. . |
| 0325149 | 7/1989 | European Pat. Off. . |
| 0341314 | 11/1989 | European Pat. Off. . |
| 0449037 | 10/1991 | European Pat. Off. . |
| 3-148014 | 6/1991 | Japan . |

*Primary Examiner*—Paul Ip
*Attorney, Agent, or Firm*—Antonelli, Terry, Stout & Kraus

[57] ABSTRACT

An encoder for indicating a position of a movable member and for generating at least two signals which are offset in phase from one another in accordance with movement of the movable member. The encoder includes a position detector and a presettable counter. The position detector generates a position reference signal indicating at least one reference position during movement of the movable member, and the presettable counter is preset for an absolute position of the encoder during movement of the movable member when the position reference signal is generated. The encoder can be constructed in a small size enabling use in servo systems and in industrial robots.

39 Claims, 33 Drawing Sheets

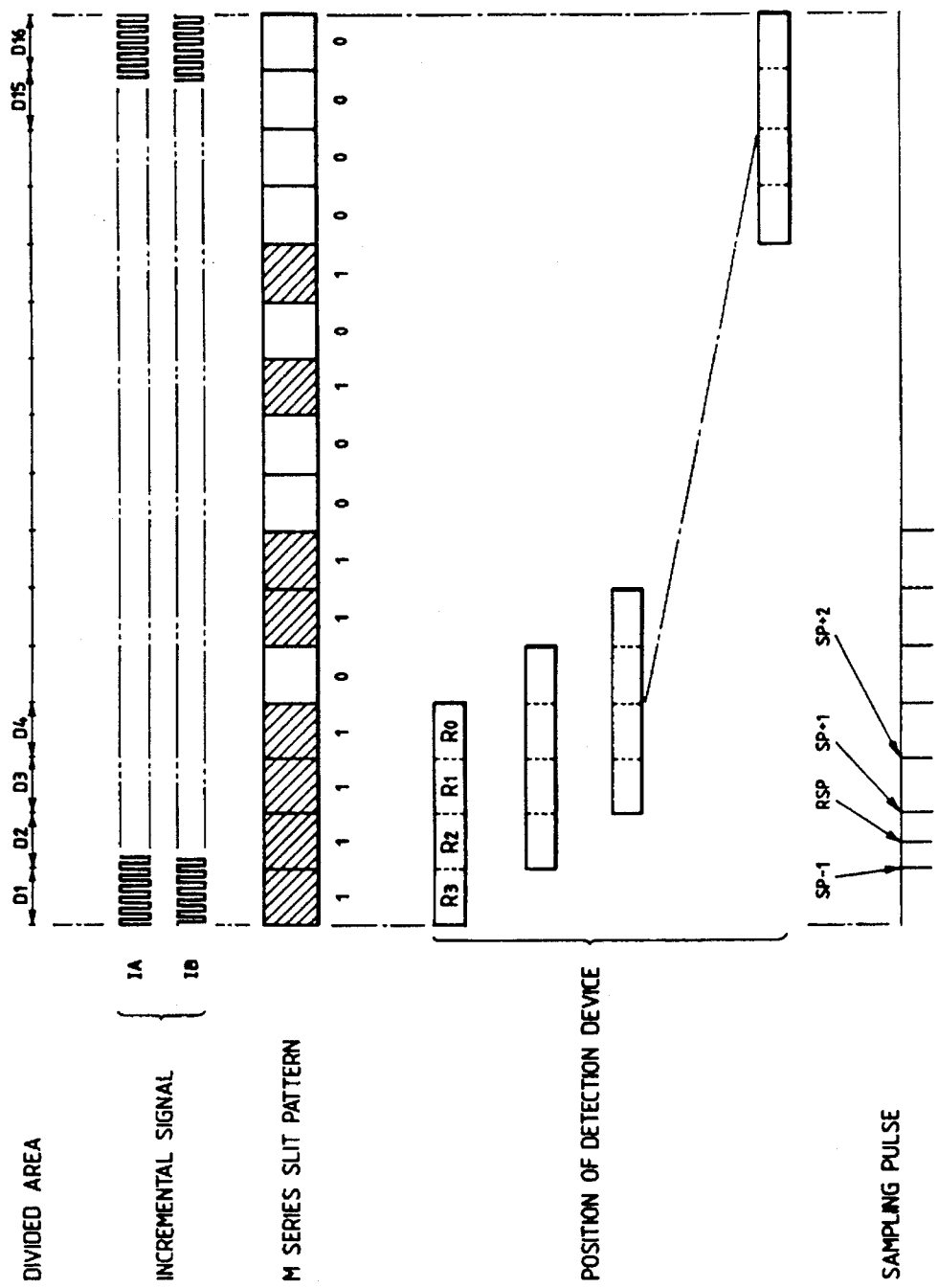

1

ENCODER, SERVO SYSTEM AND INDUSTRIAL ROBOT

This application is a continuation application of Ser. No. 08/145,728, filed Nov. 4, 1993, now abandoned, which is a continuation of application Ser. No. 07/847,686, filed Mar. 6, 1992, now abandoned.

BACKGROUND OF THE INVENTION

The present invention relates generally to an encoder and more particularly to an absolute position encoder. The invention may be utilized in position detecting applications involving DC servo motors, AC servo motors and other related components.

Heretofore, an absolute value encoder is typically composed of a rotating disk on which to record position information per revolution and a counter for counting a revolution count, as discussed in the periodical of Yasukawa Electric Mfg. Co., Ltd., Vol. 51, Ser. No. 196, No. 3 (1987), P. 257. The position information per revolution is recorded on the rotating disk as absolute values. If the resolution per revolution is, for example, 11 bits, the rotating disk has at least 11 signal slits. The 11 signals are detected by 11 sensors and processed as binary signals. After conversion to the binary format, the absolute values are added to the revolution count counted by the counter. The result is output as an encoder output signal for multiple revolution absolute values. According to the Yasukawa literature, a rotation signal contained in multiple revolution absolute values is output as a serial signal in phase A and the position information per revolution is output as initial incremental pulses in phases A and B. One typical multiple revolution absolute value encoder is the AEM Series shown in The Comprehensive Catalog of Rotary Encoders and Rotating Sensors (Vol. 02, Jan. 1990, P. 106) of Samtac Inc. This type of encoder comprises a sensor for detecting an absolute signal per revolution (at least 11 slots on the rotating disk for 11-bit resolution) and a sensor for detecting the revolution count. In operation, the encoder detects signals on the slits of the rotating disk, counts the number of revolutions and determines the position for each revolution. The revolution count and the position for each revolution are combined by an absolute register. The result is 24-bit multiple revolution absolute position information that may be output through a modem.

With the above-described prior art, it is necessary to provide on the rotating disk a number of slits corresponding to the position resolution required to obtain position information for each revolution. If the required resolution is 2,048 pulses per revolution ($2^{11}$ pulses per revolution), at least 11 slits are needed on the rotating disk. To detect phases A, B and Z as well as the revolution count requires more two-phase signals (phases RA and RB). This in turn requires five more slits on the rotating disk. As a result, the disk becomes larger and increasingly numerous sensor elements are needed. This leads to such disadvantages as higher costs and bulkier device dimensions. With the increasing number of parts involved, more steps are needed for manufacture. The numerous parts tend to suffer from lower reliability and poor yield. If the number of pulses is increased for phases A and B for higher levels of resolution, it is necessary to boost the resolution of absolute values per revolution. As a result, there may be only two alternatives: either to give up adding more slits to the rotating disk of the same size, or to further enlarge the rotating disk. Thus the increase of resolution is diametrically opposed to reducing the encoder size. The greater the encoder size, the more constraints the end product incorporating the encoder is subjected to.

SUMMARY OF THE INVENTION

It is therefore an object of the present invention to provide a multiple revolution type absolute value encoder which falls within the range of today's incremental encoder technology and which is smaller in size and lower in manufacturing cost.

Many applications in which the multiple revolution type absolute value encoder is used are primarily aimed at eliminating an origin synchronizing operation and the time required to accomplish that operation. In that sense, some motor revolutions are allowable. Thus in carrying out the invention, there is provided an encoder comprising a counter which is preset for the absolute value of each revolution with respect to a plurality of reference positions per revolution. After being preset, the counter counts an incremental signal so that it keeps detecting the absolute value of any desired position during each revolution. The detected absolute value and the revolution count are stored in an absolute data register. The contents of the register are output via a modem. This provides functions equivalent to those of the conventional multiple revolution absolute value encoder mentioned above.

In accordance with the present invention, at least one reference position needs to be established per revolution. Signals representing such positions are keyed to slits on a rotating disk movable in accordance with movement of a movable member whose position is to be indicated. Reference position signals obtained from the slits indicate a particular position at a particular moment during a revolution. Thus the absolute position of each revolution is acquired. The counter is preset for that absolute position. This makes the absolute value at the position of reference signal generation the value on the counter. That is, the counter indicates the absolute position during each revolution. The incremental pulse count made available with incremental signal phases A and B is counted by the counter with reference to the preset position. This allows the counter to indicate the absolute position of a given position during each revolution. When an incremental encoder with phases U, V and W for AC servo use is employed, the reference position signal may be provided at edges of the phases U, V and W.

The present invention eliminates the need to provide numerous absolute value slits on the rotating disk. This makes it possible to manufacture an absolute value encoder within the range of today's incremental encoder technology. As a result, the encoder remains small in size and moderate in manufacturing cost.

These and further objects, features and advantages of the present invention will become more obvious from the following description when taken in connection with the accompanying drawings which show for purposes of illustration only, several embodiments in accordance with the present invention.

BRIEF DESCRIPTION OF THE DRAWINGS

FIG. 41 illustrates how the M series type encoder functions.

DESCRIPTION OF PREFERRED EMBODIMENTS

An embodiment of the present invention will now be described with reference to FIGS. 1 through 4 wherein a four-pole type AC servo encoder of 2,048 pulses per revolution (an encoder with phases U, V and W of the commutation signal (CS signal)) supplemented by phase RA and RB signals for revolution count detection is provided.

Figure 2:
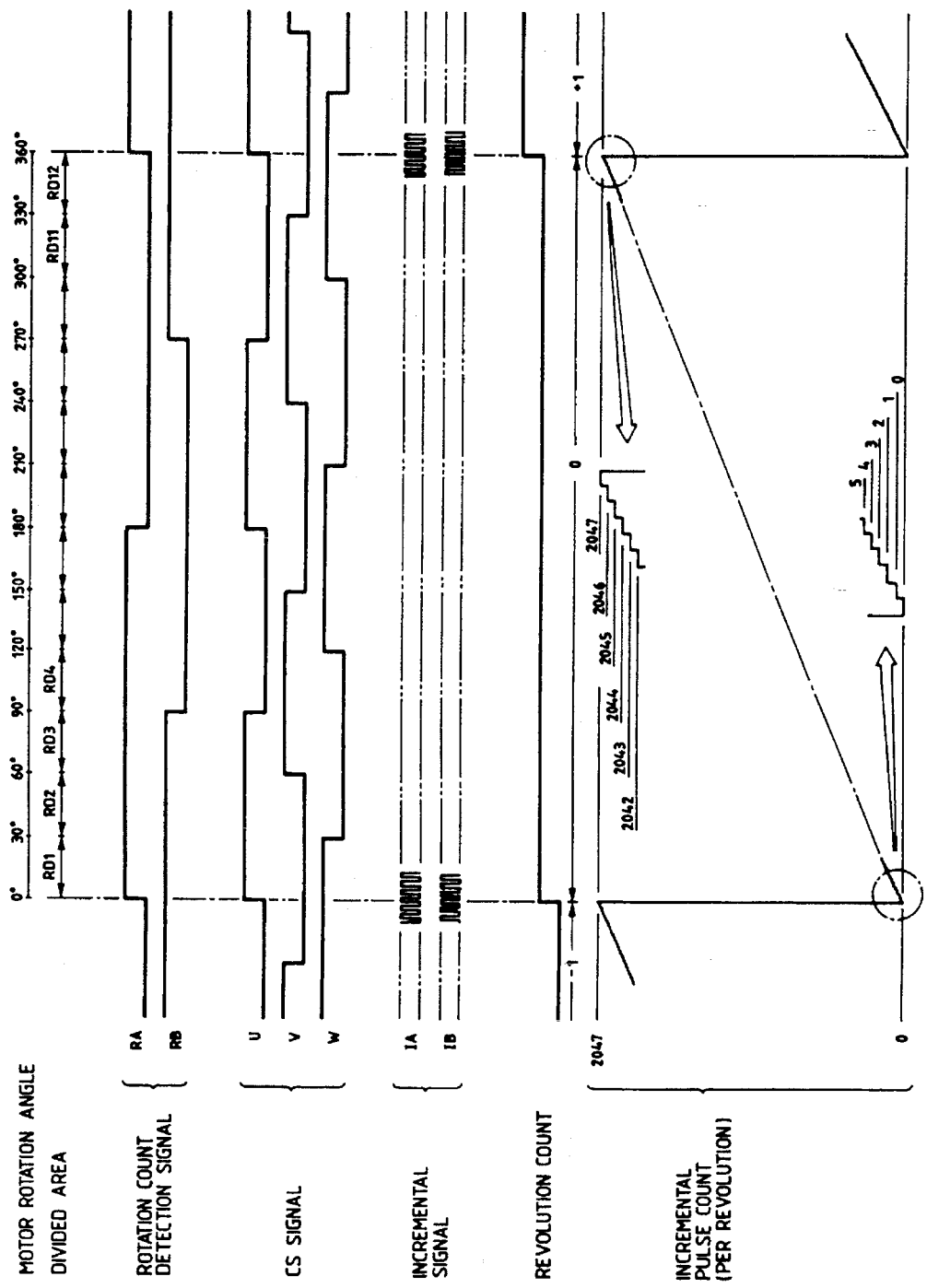
FIG. 2 is a view illustrating encoder signals associated with the embodiment.

Referring to FIG. 2, a rotating disk 11 of the encoder contains a slit pattern that generates signals for the following purposes:

two-phase incremental signal with phases RA and RB 90 degrees apart for counting a revolution count;

CS signal with phases U, V and W for detecting pole positions; and two-phase increment signal with phases IA and IB 90 degrees apart for detecting an incremental pulse count.

It is assumed that the edges of phase RA are positioned at 0°, 180° and 360°. When phase RB is High, the edge change of phase RA causes the revolution count to be counted. It is also assumed that the edges of phase U of the CS signal are positioned at 0°, 90°, 180°, 270° and 360°; the edges of phase V at 60°, 150°, 240° and 330°; and the edges of phase W at 30°, 120°, 210° and 300°. Combinations of the three phases of the CS signal divide each motor revolution into units of 30°. When combined with phase RA or RB, the phases of the CS signal divide the motor rotation angle range into 12 divisions RDI through RD12 as shown in FIG. 2. Meanwhile, the incremental pulses of phases IA and IB constitute an incremental pulse count, which is 2,048 per revolution. It is assumed that the edges of phase IA are at motor positions 0° and 360°. The encoder has the number of revolutions counted −1, 0, +1 using phases RA and RB and the incremental pulse count counted from 0 to 2,047 (incremental pulses multiplied by 1) using phases IA and IB. The revolution count and the incremental pulse count are then combined. This provides the functionality of an absolute value encoder. As outlined, the present invention permits movement during any of the 12 divisions (RD1–RD12) of the motor rotation angle range. By updating the absolute position at the boundary between such divisions, the present invention constitutes an absolute value encoder in a simplified manner.

Figure 1:
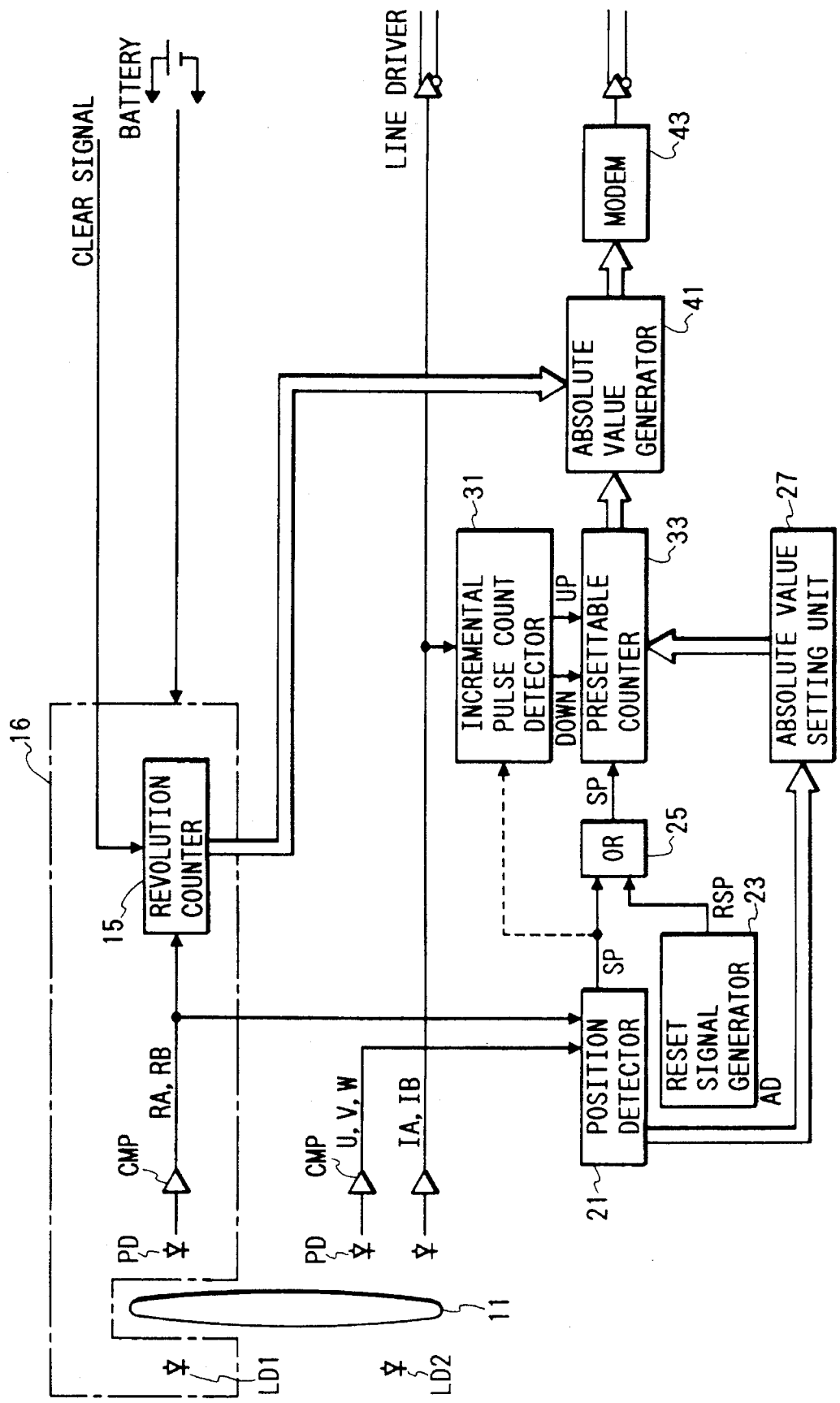
FIG. 1 is a block diagram of an encoder embodying the present invention.

Referring to FIG. 1, light beams from LED's LD1 and LD2 pass through the slits of the rotating disk 11 which is rotated in accordance with movement of a movable member whose position is to be indicated and are received by photodiodes PD's. The received light beams are rectified in waveform by comparators CMP's that generate signals RA, RB, U, V, W, IA and IB. The signals RA and RB are counted by a revolution counting unit 15 that counts the number of revolutions (i.e., revolution count). One LED LD1, one photodiode PD and one comparator CMP and the revolution counting unit 15 are connected to a backup battery, as shown within the broken line block 16, so that the revolution count will be counted and retained regardless of the main power status. The other LED, photodiode and the related circuits operate only from the main power Vcc of the encoder. If the coverage of battery backup is extended to include components 21, 23, 25, 27, 31, 33 and 41 in FIG. 1, absolute positions may be always retained even if the main power is removed.

At least one of the revolution count detecting signals RA and RB as well as the CS signals U, V and W are input to a rotating position detecting unit 21. Every time an edge of the phases U, V and W is detected, the rotating position detecting unit 21 outputs a sampling pulse SP. In addition, the rotating position detecting unit 21 supplies an absolute value setting unit 27 with a signal AD indicating one of the 12 rotating position divisions of the encoder, the indicated division being in effect when the sampling pulse SP is output. Upon receipt of the AD signal, the absolute value setting unit 27 loads an incremental pulse counting unit 33 (e.g., presettable counter such as SN74193 by Texas Instruments, and hereafter called the counter 33) with the absolute position in effect when the sampling pulse SP is output. The absolute value setting unit 27 may be any memory device including a ROM that outputs fixed information in response to its input.

Meanwhile, when the power Vcc is applied, a reset signal generating unit 23 outputs a reset signal that triggers a reset sampling pulse RSP. The reset signal may be generated using Mitsubishi's M51967BL, for example. The reset sampling pulse RSP and the sampling pulse SP are OR'ed by an OR circuit 25. The result is a load signal SP directed to the counter 33.

An incremental pulse count detecting unit 31 receives incremental signals IA and IB and, as disclosed in Japanese Patent Laid-Open No. 60-4924 and Japanese Patent Application No. 58-109812, outputs up and down pulses. The up and down pulses are input to the counter 33, whereby the counter value is updated. By counting incremental pulses, the counter 33 retains the absolute value of the rotating position. With this embodiment, the pulse count is not multiplied. However, if it is desired to multiply the pulse count, all that needs to be done is to modify the contents of preset data. The data stored in the incremental pulse counter 33 and that in the revolution counter 15 are input to the multiple revolution absolute value generator 41. The converged data become multiple revolution absolute value data. The multiple revolution absolute value data is transmitted upstream via a modem 43 and a line driver. The components 15, 41 and 31 may be constituted using the AEM encoder from Samtac.

Figure 3:
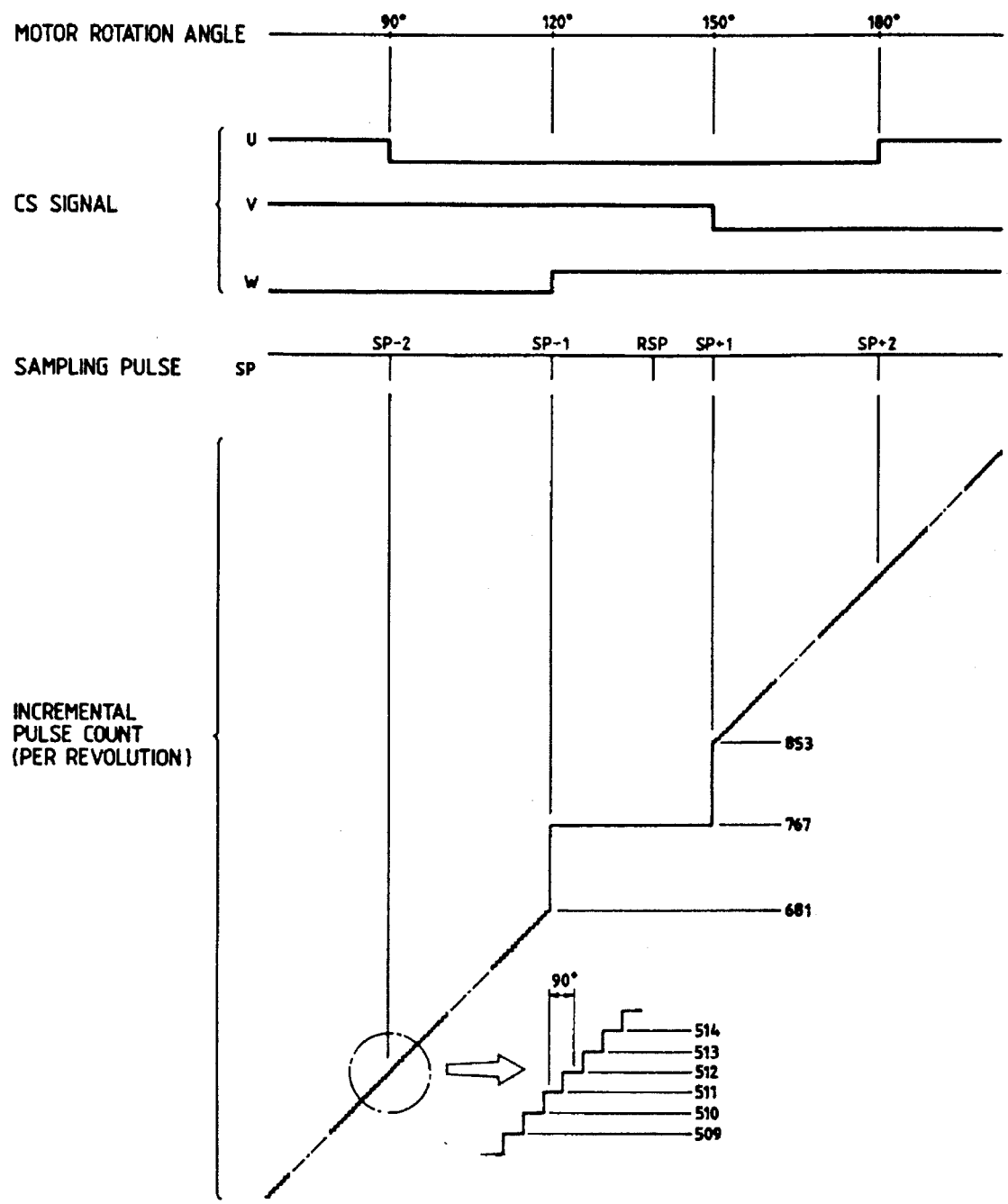
FIG. 3 is a view showing how encoder signals (for four-pole type encoder) are output in connection with the embodiment.
Figure 4:
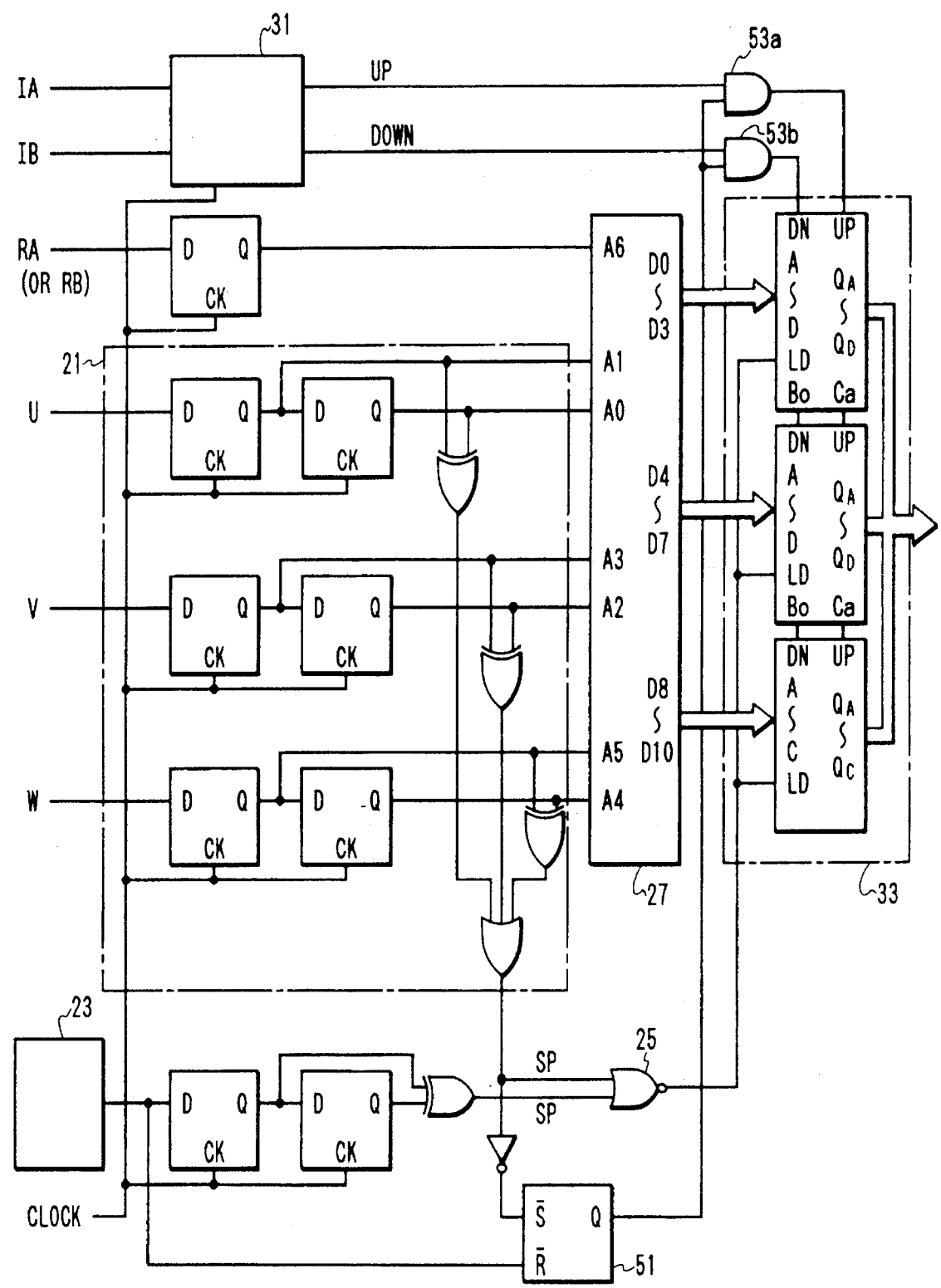
FIG. 4 is a circuit diagram of a portion of an encoder according to the present invention.

The operation of the embodiment will now be described with reference to FIG. 3. It is assumed that the power Vcc is applied between 120° and 150° of motor rotation angle. When the power Vcc is applied, a reset sampling pulse RSP causes data (hex data; 2FF) indicating a motor rotation angle of 135° to be loaded into the counter 33. The motor then rotates. Upon motor rotation, the rotating position detector 21 generates a sampling pulse SP. (In forward rotation, a sampling pulse SP+1 is generated at 150° and a sampling pulse SP+2 at 180°; in reverse rotation, a sampling pulse SP−1 is generated at 120° and a sampling pulse SP−2 at 90°.) The pulse, generated at an edge of the CS signal, is an accurate position signal which represents a motor rotation angle and which presets the counter 33 to a predetermined normal value. Thereafter, incremental signals IA and IB are counted so that the counter 33 indicates the correct rotation angle. FIG. 4 shows a typical setup in which the rotating position detector 21, the OR circuit 25 and the reset signal generator 23 are illustratively arranged.

How the rotating position detector 21 operates will now be described. The phases U, V and W of the CS signal are each sampled by a two-stage D type flip-flop (called a D-FF) in synchronism with a clock signal. For phase U, the D-FF output becomes inputs A0 and A1 directed to the absolute value setting unit 27 (A2 and A3 for phase V; A4 and A5 for phase W), whereby an absolute value is determined. At least one of the revolution count detection signal RA and RB is sampled in synchronism with the same clock signal. The result of the sampling provides an input A6 to the absolute value setting unit 27. In accordance with the inputs A0 through A6, the absolute value setting means 27 outputs the absolute value per motor revolution as preset data of the counter 33. The two-stage D-FF output is also input to an exclusive-OR circuit. If there occurs a mismatch between the two signals (between A0 and A1; between A2 and A3; between A4 and A5), i.e., if an edge of each phase is detected, a sampling pulse SP one clock pulse wide is output.

The reset signal generated by the reset signal generating unit 23 is sampled by another two-stage D-FF and fed to an exclusive-OR circuit. The exclusive-OR circuit outputs a reset sampling pulse RSP. The sampling pulse SP and the reset sampling pulse RSP are OR'ed by the OR circuit 25. The result is the load signal SP that enters the counter 33 as a set signal thereof. The load signal SP causes the output of the absolute value setting unit 27 to be set in the counter 33. The setting of the absolute value by the reset sampling pulse RSP is only temporary with the setting by the sampling pulse SP providing a true absolute position.

An RS flip-flop (called an RS-FF) 51 is reset by the reset signal and set by the sampling pulse SP. The RS-FF output is applied to the inputs on one side of AND circuits 53a and 53b. The other input of the AND circuit 53a receives an up pulse signal from the incremental pulse count detecting unit 31 and; the other input of the AND circuit 53b is connected to a down pulse signal from the unit 31. This arrangement is provided so that incremental pulses are counted using the incremental signals IA and IB after an edge of any phase U, V or W of the CS signal is detected and a true absolute value is set in the counter 33. Thus the counter 33 outputs a temporary absolute position in response to the reset sampling pulse RSP and then outputs a true absolute position in accordance with the sampling pulse SP. Thereafter, the counter 33 keeps outputting true absolute positions while counting the incremental signals. If a sampling pulse SP−2 or SP+1 is provided, a preset signal is again input while the counter 33 is counting so as to preset the corresponding absolute value on the counter. This eliminates the possibility of any erroneous count due to the intrusion of noises during counting. The scheme above provides a noise-resistant feature for the encoder.

Figure 5:
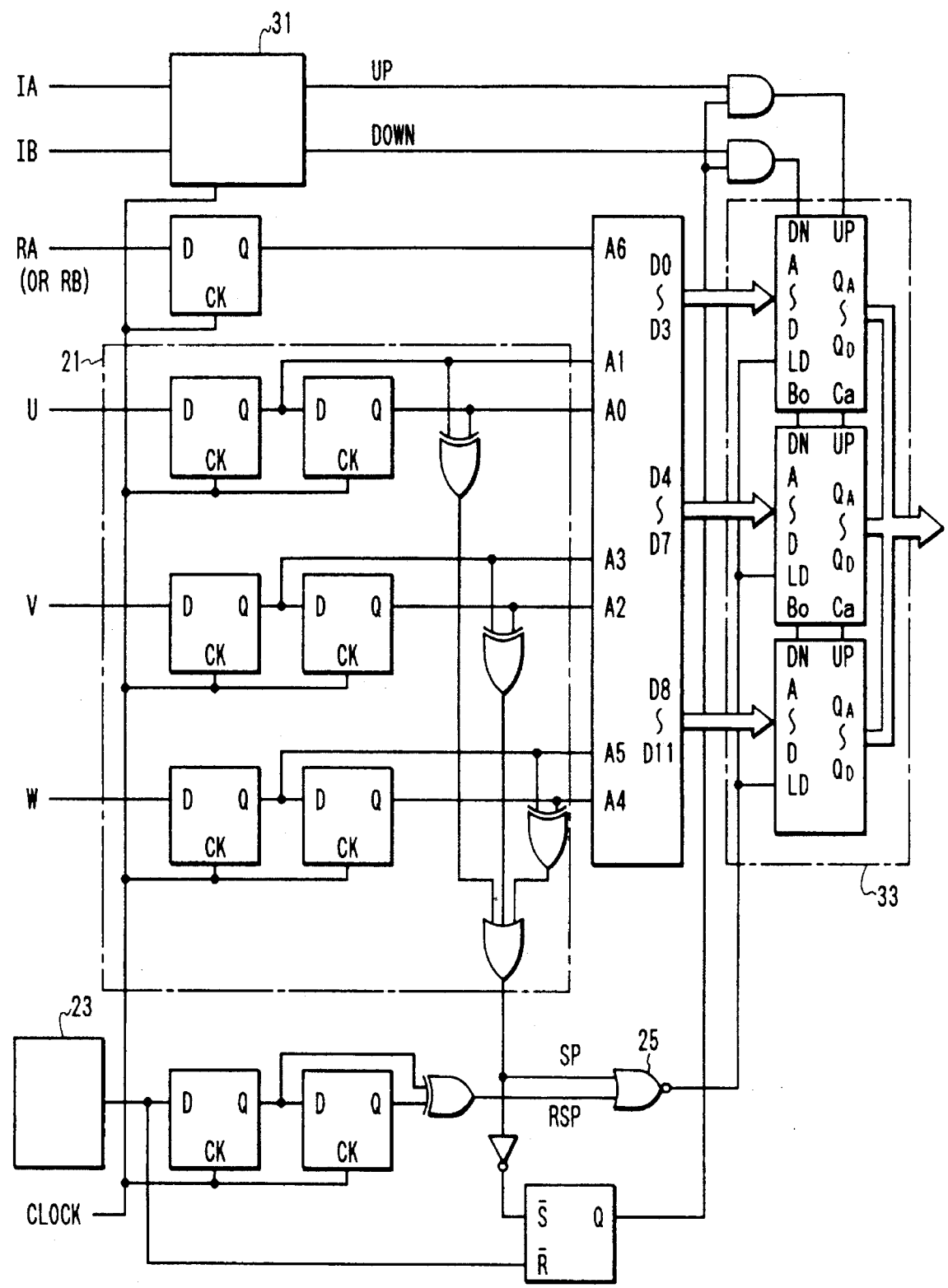
FIG. 5 is a circuit diagram of a portion of an encoder in which incremental pulses are multiplied by 2.
Figure 6:
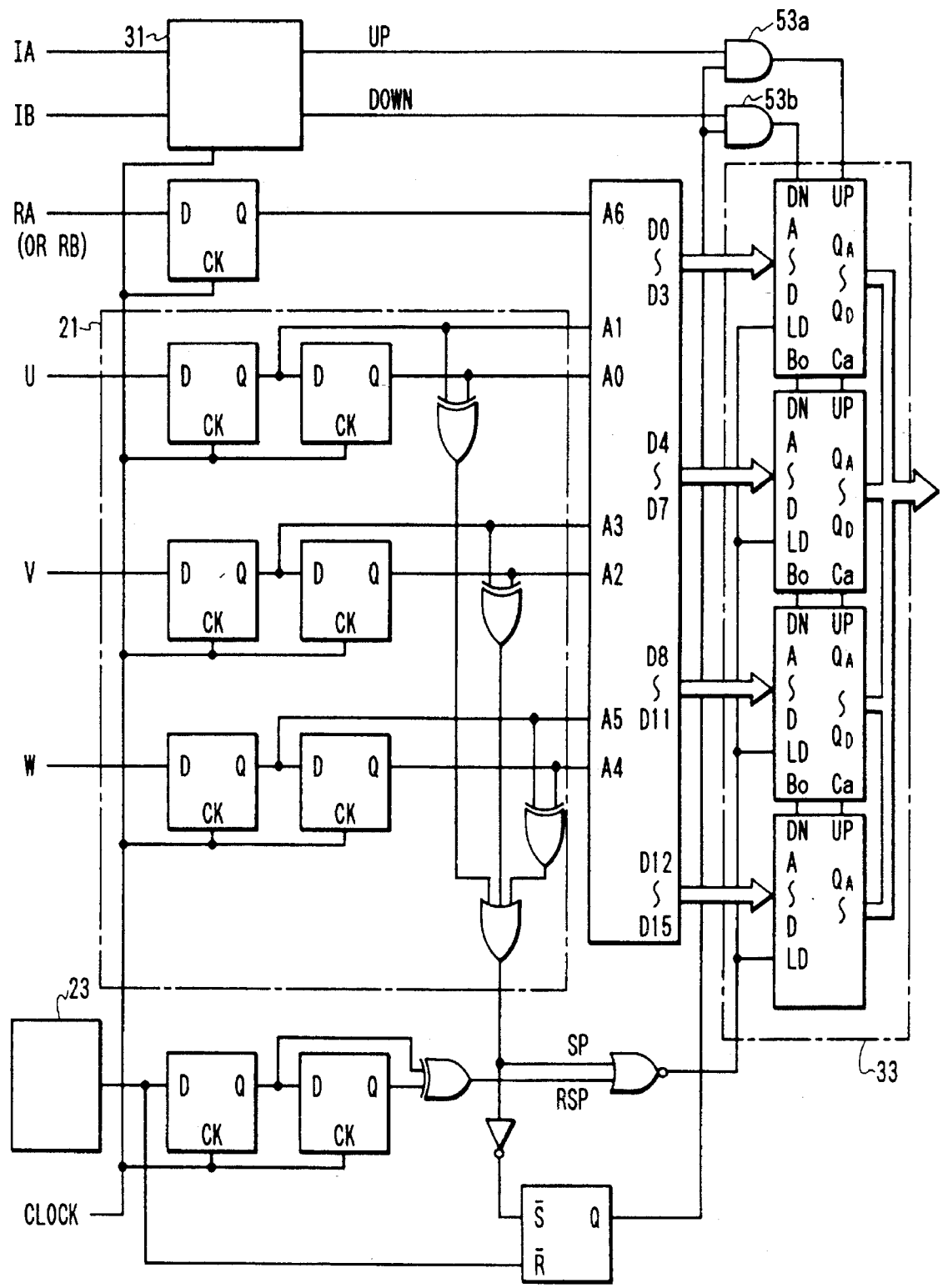
FIG. 6 is a circuit diagram of a portion of an encoder in which the pulse count is increased.

The period of the sampling clock signal needs to be equal to or lower than the period of the encoder signal change. Preferably, the sampling clock period is one eighth or less of the shortest encoder signal change period so that the shortest phase difference between signals IA and IB will be at least two clock pulses. FIG. 5 depicts an example in which the incremental signals IA and IB are multiplied by 2 each. In this case, compared with the arrangement of FIG. 4, all that needs to be done is to increase by one bit the output data sent from the absolute value setting unit 27 to the incremental pulse counter 33, the data becoming 12 bit-data of D0 through D11. As described, multiplied signals may be addressed by increasing the number of bits in data. For example, where the incremental signals IA and IB are multiplied by 4 each, the bit count is simply increased to 13 (D0–D12). How this scheme is practiced is illustrated in FIG. 6.

Figure 7:
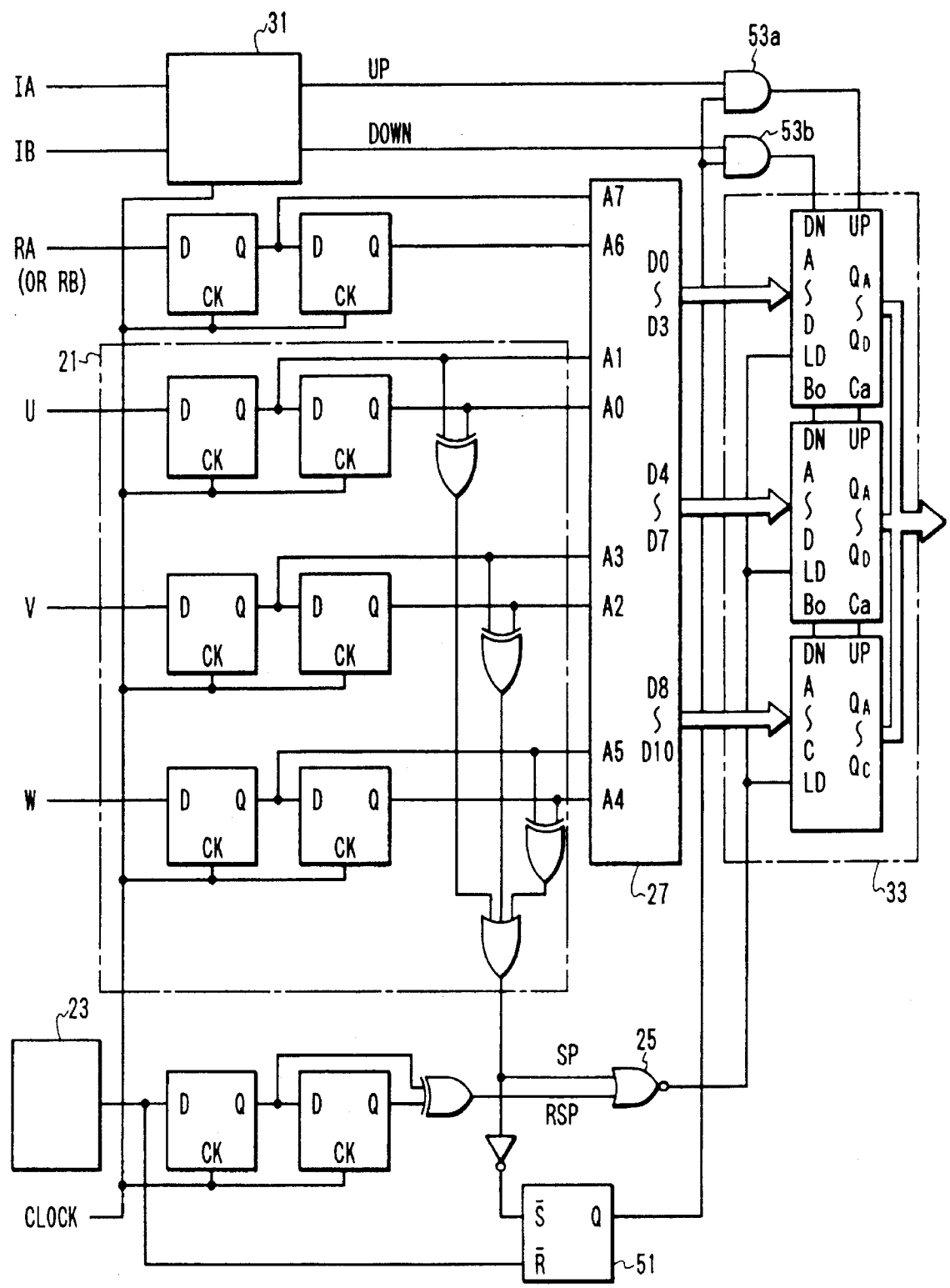
FIG. 7 is a circuit diagram of a portion of an encoder in which a revolution count detection signal is latched in two stages.

FIG. 7 shows an example in which the revolution count detection signal RA is sampled by a two-stage D-FF, the output of the D-FF being directed to inputs A6 and A7 of the absolute value setting unit 27. This arrangement offers the benefit of ensuring the setting of an absolute position at a point where the signal RA is changed.

Figure 8:
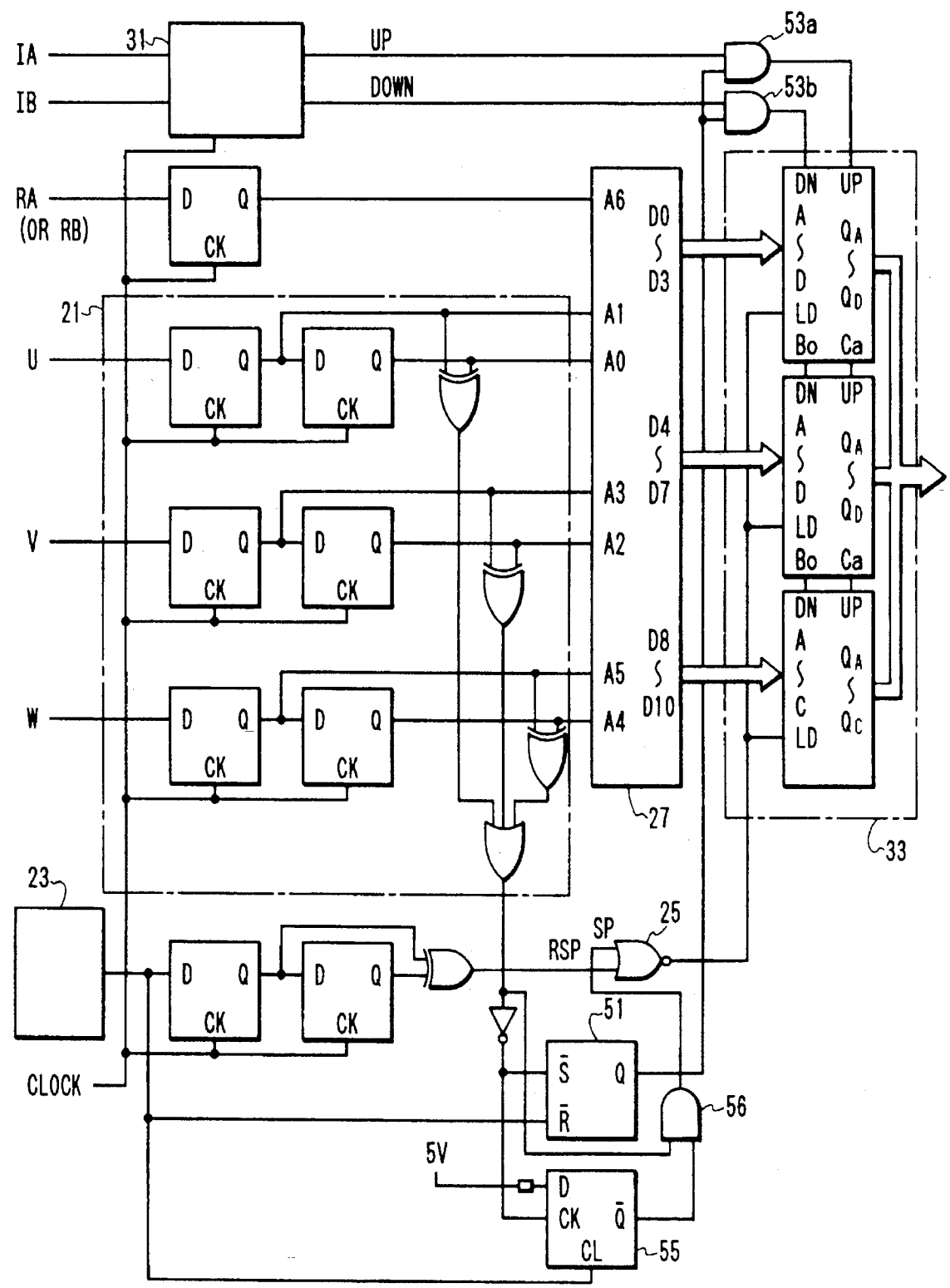
FIG. 8 is a circuit diagram of a portion of an encoder in which the sampling pulse count is reduced.
Figure 9:
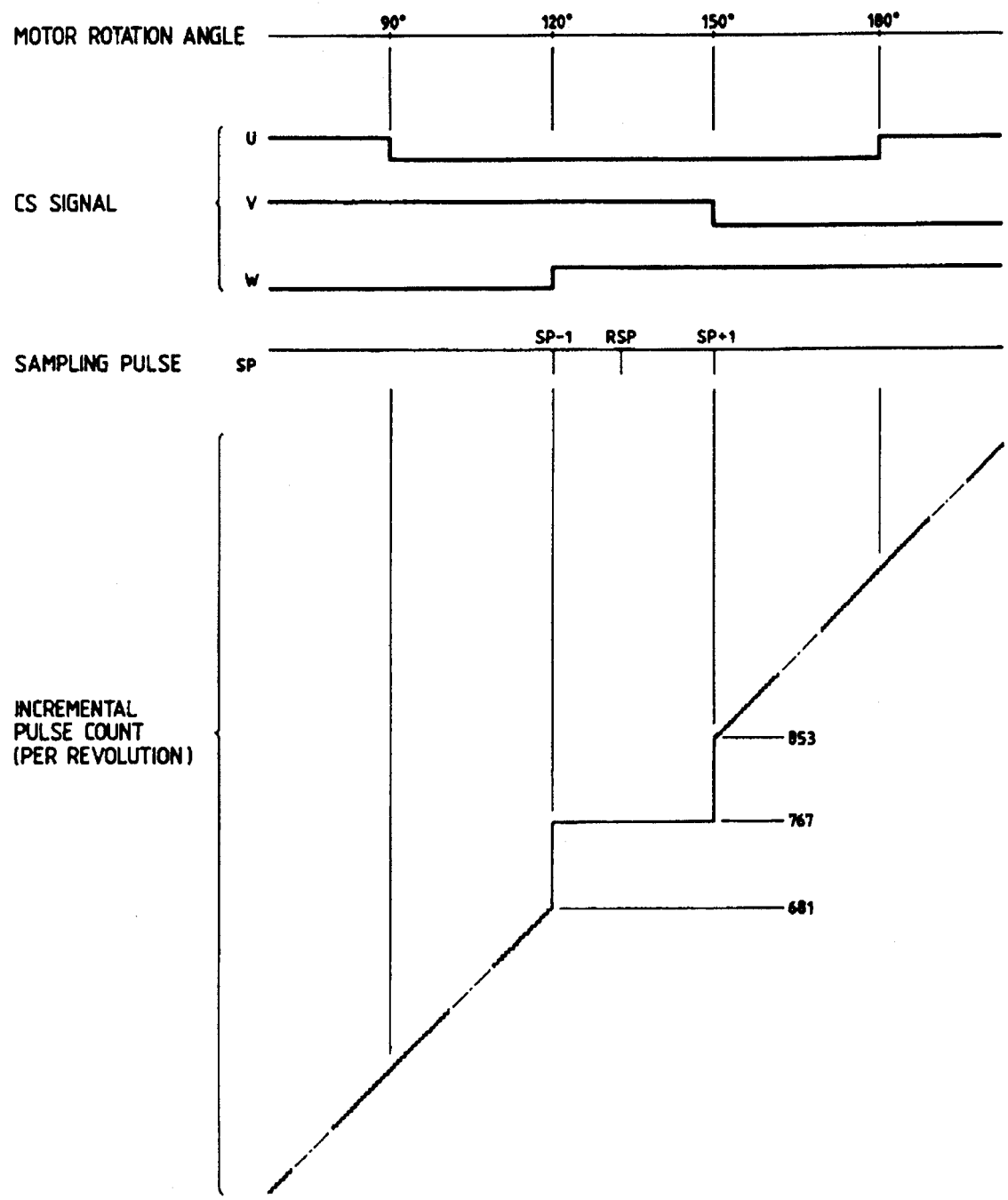
FIG. 9 is a view illustrating the encoder signals output by the circuit of FIG. 8.

FIG. 8 illustrates an example in which a D-FF 55 and an AND circuit 56 are utilized. These components make effective only that sampling pulse SP which is generated after reset (SP+1 in forward rotation; SP−1 in reverse rotation) from among those generated at the edges of phases U, V and W of the CS signal. The signal is then used as the load signal SP. How these signals behave is illustrated in FIG. 9.

Figure 10:
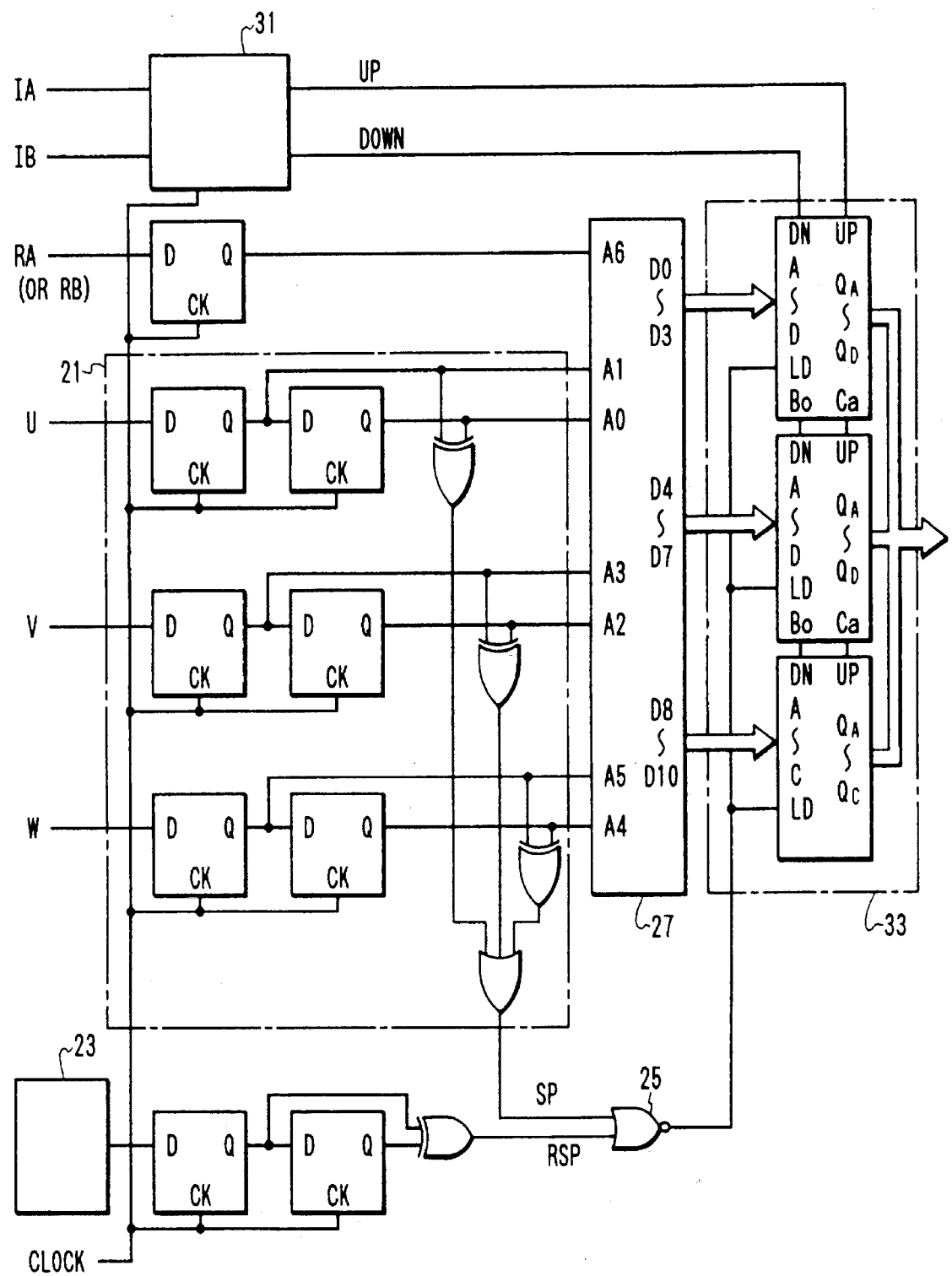
FIG. 10 is a circuit diagram of a portion of an encoder in which incremental signals are continuously counted.
Figure 11:
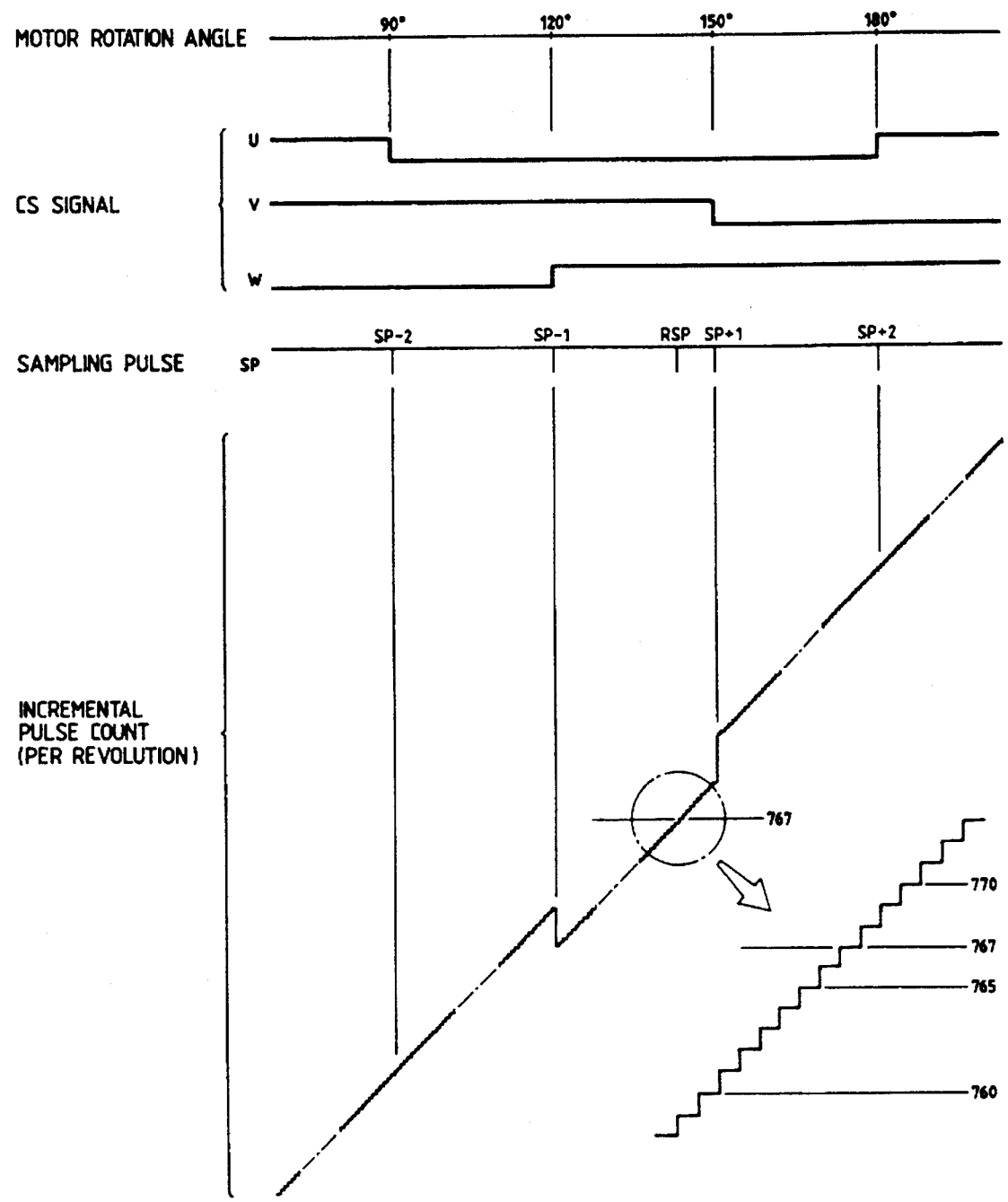
FIG. 11 is a view depicting the encoder signals output by the circuit of FIG. 10.

FIG. 10 depicts a circuit arrangement obtained by removing the D-FF 51 and the AND circuits 53a and 53b from the arrangement of FIG. 4. In this circuit arrangement, the up and down pulses are input by use of the incremental signals IA and IB. This keeps updating the value on the counter, as shown in FIG. 11. In this case, too, the incremental pulse counter 33 is preset for a true absolute position in accordance with the sampling pulses from the edges of phases U, V and W of the CS signal. Thereafter, the counter 33 keeps indicating the true absolute position by counting the up and down pulses.

Figure 12:
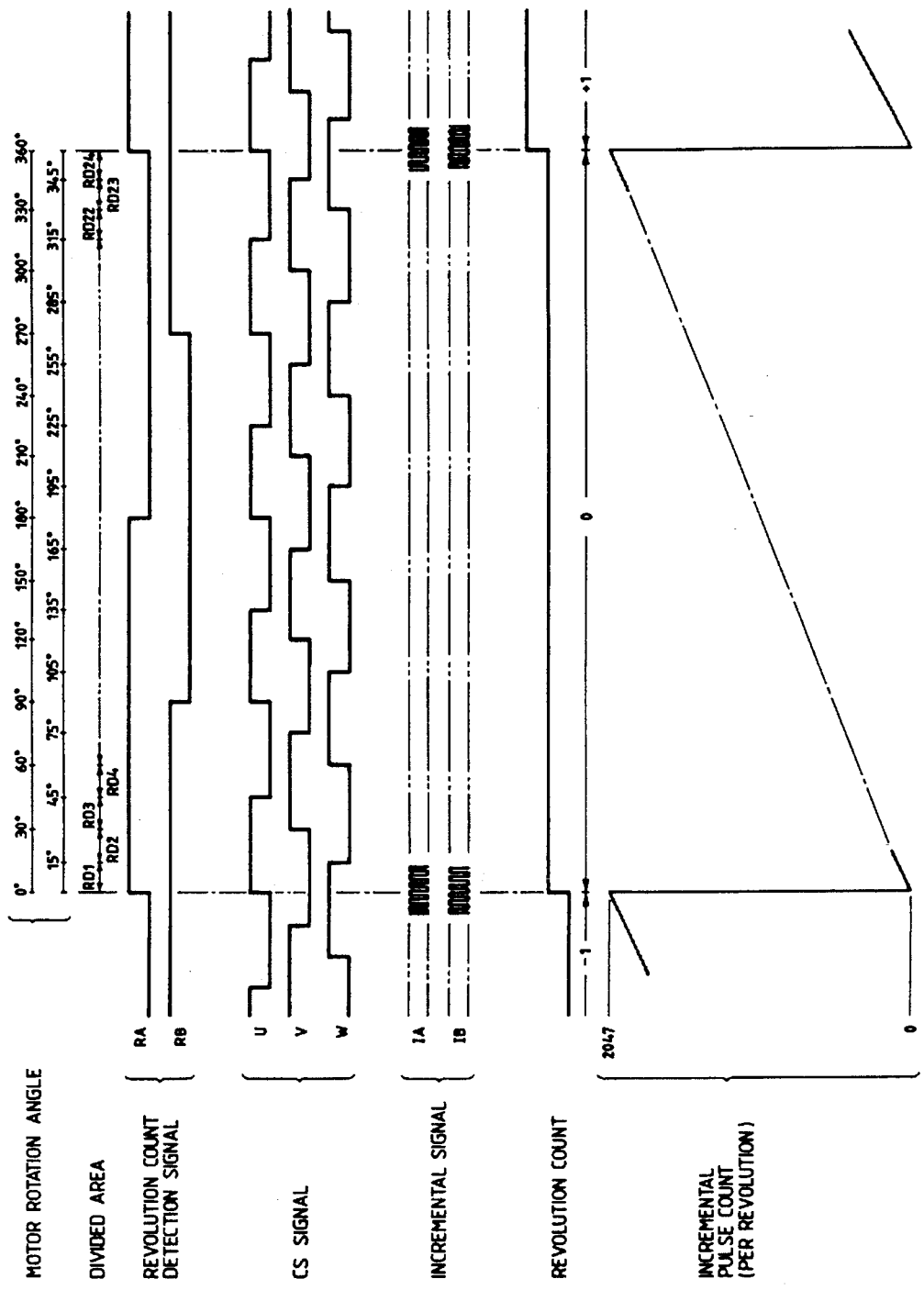
FIG. 12 is a view showing the encoder signals associated with an eight-pole type encoder.
Figure 13:
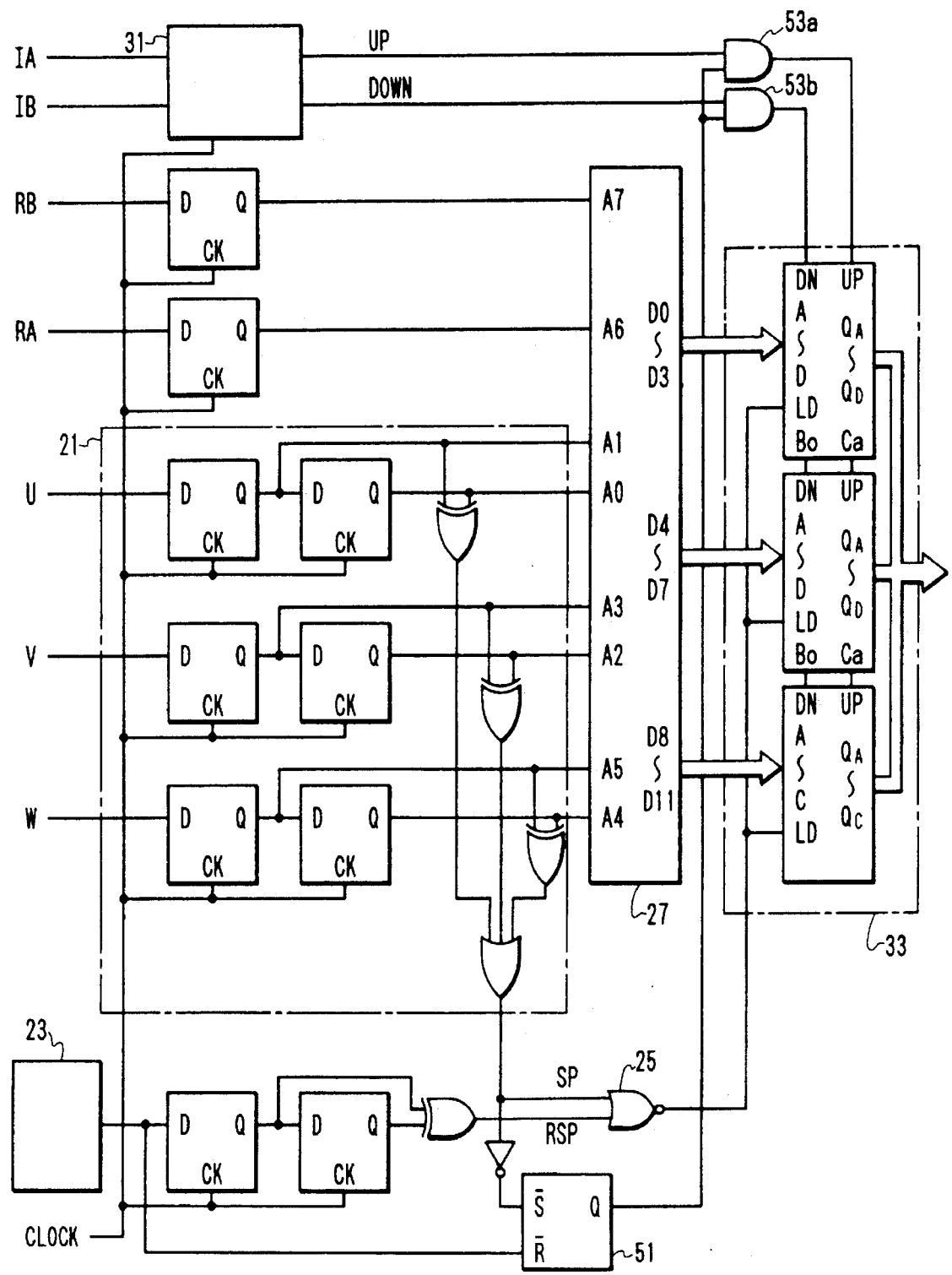
FIG. 13 is a circuit diagram of a portion of an encoder contained in the eight-pole type encoder.

FIGS. 2 through 11 have shown how the invention is illustratively practiced in the form of a four-pole encoder. FIG. 12 depicts how the invention is illustratively practiced as an eight-pole encoder whose signals are shown and their waveforms illustrated therein. In this case, one period of phases U, V and W of the CS signal corresponds to 90° of motor rotation angle. That is, four periods constitute a single motor revolution. This makes it possible to divide each motor revolution into 24 blocks, 15° each, using the revolution count detection signal RA and RB as well as the CS signals U, V and W. This eight-pole encoder may be handled in the same way as the four-pole encoder, with only minor differences. That is, the revolution count detection signals RA and RB are sampled by a D-FF each to determine one of the 24 blocks. The sampled signals are directed to inputs A6 and A7 of the absolute position setting unit 27 as shown in FIG. 13 so that the unit 27 will provide a different output.

Tables 1 and 2 below indicate relationships between inputs and outputs in connection with the absolute position setting unit 27.

TABLE 1

| Angle | A6 | A5 | A4 | A3 | A2 | A1 | A0 | For 2048 P/R Decimal Data | Hex Data | For 4096 R/R Decimal Data | Hex Data | For 8192 P/R Decimal Data | Hex Data |
|---|---|---|---|---|---|---|---|---|---|---|---|---|---|
| 0+ | 1 | 1 | 1 | 0 | 0 | 1 | 0 | 0 | 0 | 0 | 0 | 0 | 0 |
| ∫ | 1 | 1 | 1 | 0 | 0 | 1 | 1 | 85 | 55 | 171 | AB | 341 | 155 |
| 30− | 1 | 1 | 0 | 0 | 0 | 1 | 1 | 169 | A9 | 341 | 155 | 681 | 2A9 |
| 30+ | 1 | 0 | 1 | 0 | 0 | 1 | 1 | 170 | AA | 342 | 156 | 682 | 2AA |
| ∫ | 1 | 0 | 0 | 0 | 0 | 1 | 1 | 255 | FF | 512 | 200 | 1023 | 3FF |
| 60− | 1 | 0 | 0 | 0 | 1 | 1 | 1 | 340 | 154 | 682 | 2AA | 1364 | 554 |
| 60+ | 1 | 0 | 0 | 1 | 0 | 1 | 1 | 341 | 155 | 683 | 2AB | 1365 | 555 |
| ∫ | 1 | 0 | 0 | 1 | 1 | 1 | 1 | 426 | 1AA | 853 | 355 | 1706 | 6AA |
| 90− | 1 | 0 | 0 | 1 | 1 | 1 | 0 | 511 | 1FF | 1023 | 3FF | 2047 | 7FF |
| 90+ | 1 | 0 | 0 | 1 | 1 | 0 | 1 | 512 | 200 | 1024 | 400 | 2048 | 800 |
| ∫ | 1 | 0 | 0 | 1 | 1 | 0 | 0 | 597 | 255 | 1195 | 4AB | 2389 | 955 |
| 120− | 1 | 0 | 1 | 1 | 1 | 0 | 0 | 681 | 2A9 | 1365 | 555 | 2729 | AA9 |
| 120+ | 1 | 1 | 0 | 1 | 1 | 0 | 0 | 682 | 2AA | 1366 | 556 | 2730 | AAA |
| ∫ | 1 | 1 | 1 | 1 | 1 | 0 | 0 | 767 | 2FF | 1536 | 600 | 3071 | BFF |
| 150− | 1 | 1 | 1 | 1 | 0 | 0 | 0 | 852 | 354 | 1706 | 6AA | 3412 | D54 |
| 150+ | 1 | 1 | 1 | 0 | 1 | 0 | 0 | 853 | 355 | 1707 | 6AB | 3413 | D55 |
| ∫ | 1 | 1 | 1 | 0 | 0 | 0 | 0 | 938 | 3AA | 1877 | 755 | 3754 | EAA |
| 180− | 1 | 1 | 1 | 0 | 0 | 0 | 1 | 1023 | 3FF | 2047 | 7FF | 4095 | FFF |
| 180+ | 0 | 1 | 1 | 0 | 0 | 1 | 0 | 1024 | 400 | 2048 | 800 | 4096 | 1000 |
| ∫ | 0 | 1 | 1 | 0 | 0 | 1 | 1 | 1109 | 455 | 2219 | 8AB | 4437 | 1155 |
| 210− | 0 | 1 | 0 | 0 | 0 | 1 | 1 | 1193 | 4A9 | 2389 | 955 | 4777 | 12A9 |
| 210+ | 0 | 0 | 1 | 0 | 0 | 1 | 1 | 1194 | 4AA | 2390 | 956 | 4778 | 12AA |
| ∫ | 0 | 0 | 0 | 0 | 0 | 1 | 1 | 1279 | 4FF | 2560 | A00 | 5119 | 13FF |
| 240− | 0 | 0 | 0 | 0 | 1 | 1 | 1 | 1364 | 554 | 2730 | AAA | 5460 | 1554 |
| 240+ | 0 | 0 | 0 | 1 | 0 | 1 | 1 | 1365 | 555 | 2731 | AAB | 5461 | 1555 |
| ∫ | 0 | 0 | 0 | 1 | 1 | 1 | 1 | 1450 | 5AA | 2901 | B55 | 5802 | 16AA |
| 270− | 0 | 0 | 0 | 1 | 1 | 1 | 0 | 1535 | 5FF | 3071 | BFF | 6143 | 17FF |
| 270+ | 0 | 0 | 0 | 1 | 1 | 0 | 1 | 1536 | 600 | 3072 | C00 | 6144 | 1800 |
| ∫ | 0 | 0 | 0 | 1 | 1 | 0 | 0 | 1621 | 655 | 3243 | CAB | 6485 | 1955 |
| 300− | 0 | 0 | 1 | 1 | 1 | 0 | 0 | 1705 | 6A9 | 3413 | D55 | 6825 | 1AA9 |
| 300+ | 0 | 1 | 0 | 1 | 1 | 0 | 0 | 1706 | 6AA | 3414 | D56 | 6826 | 1AAA |
| ∫ | 0 | 1 | 1 | 1 | 1 | 0 | 0 | 1791 | 6FF | 3584 | E00 | 7167 | 1BFF |
| 330− | 0 | 1 | 1 | 1 | 0 | 0 | 0 | 1876 | 754 | 3754 | EAA | 7508 | 1D54 |

TABLE 1-continued

| | | | | | | | | For 2048 P/R | | For 4096 R/R | | For 8192 P/R | |
|---|---|---|---|---|---|---|---|---|---|---|---|---|---|
| Angle | A6 | A5 | A4 | A3 | A2 | A1 | A0 | Decimal Data | Hex Data | Decimal Data | Hex Data | Decimal Data | Hex Data |
| 330+ | 0 | 1 | 1 | 0 | 1 | 0 | 0 | 1877 | 755 | 3755 | EAB | 7509 | 1D55 |
| ∫ | 0 | 1 | 1 | 0 | 0 | 0 | 0 | 1962 | 7AA | 3925 | F55 | 7850 | 1EAA |
| 360− | 0 | 1 | 1 | 0 | 0 | 0 | 1 | 2047 | 7FF | 4095 | FFF | 8191 | 1FFF |
| 360+ | 1 | 1 | 1 | 0 | 0 | 1 | 0 | 0 | 0 | 0 | 0 | 0 | 0 |

TABLE 2

| | | | | | | | | | For 2048 P/R | | For 8192 P/R | |
|---|---|---|---|---|---|---|---|---|---|---|---|---|
| Angle | A7 | A6 | A5 | A4 | A3 | A2 | A1 | A0 | Decimal Data | Hex Data | Decimal Data | Hex Data |
| 0+ | 1 | 1 | 1 | 1 | 0 | 0 | 1 | 0 | 0 | 0 | 0 | 0 |
| ∫ | 1 | 1 | 1 | 1 | 0 | 0 | 1 | 1 | 42 | 2A | 170 | AA |
| 15− | 1 | 1 | 1 | 0 | 0 | 0 | 1 | 1 | 84 | 54 | 340 | 154 |
| 15+ | 1 | 1 | 0 | 1 | 0 | 0 | 1 | 1 | 85 | 55 | 341 | 155 |
| ∫ | 1 | 1 | 0 | 0 | 0 | 0 | 1 | 1 | 127 | 7F | 511 | 227 |
| 30− | 1 | 1 | 0 | 0 | 0 | 1 | 1 | 1 | 169 | A9 | 681 | 2A9 |
| 30+ | 1 | 1 | 0 | 0 | 1 | 0 | 1 | 1 | 170 | AA | 682 | 2AA |
| ∫ | 1 | 1 | 0 | 0 | 1 | 1 | 1 | 1 | 212 | D4 | 852 | 354 |
| 45− | | | | | | | 1 | 0 | 254 | FE | 1022 | 3FE |
| | | | | | | | | | | FF | 1023 | 3FF |
| | | | | | | | | | | | 1194 | 4AA |
| 300− | 1 | 0 | 0 | 0 | 0 | 1 | 1 | 1 | | | | 554 |
| 300+ | 1 | 0 | 0 | 0 | 1 | 0 | 1 | 1 | 1706 | | | |
| ∫ | 1 | 0 | 0 | 0 | 1 | 1 | 1 | 1 | 1748 | 6D4 | | |
| 315− | 1 | 0 | 0 | 0 | 1 | 1 | 1 | 0 | 1790 | 6FE | 7166 | 1BFE |
| 315+ | 1 | 0 | 0 | 0 | 1 | 1 | 0 | 1 | 1791 | 6FF | 7167 | 1BFF |
| ∫ | 1 | 0 | 0 | 0 | 1 | 1 | 0 | 0 | 1834 | 72A | 7338 | 1CAA |
| 330− | 1 | 0 | 0 | 1 | 1 | 1 | 0 | 0 | 1876 | 754 | 7508 | 1D54 |
| 330+ | 1 | 0 | 1 | 0 | 1 | 1 | 0 | 0 | 1877 | 755 | 7509 | 1D55 |
| ∫ | 1 | 0 | 1 | 1 | 1 | 1 | 0 | 0 | 1919 | 77F | 7679 | 1DFF |
| 345− | 1 | 0 | 1 | 1 | 1 | 0 | 0 | 0 | 1961 | 7A9 | 7849 | 1EA9 |
| 345+ | 1 | 0 | 1 | 1 | 0 | 1 | 0 | 0 | 1962 | 7AA | 7850 | 1EAA |
| ∫ | 1 | 0 | 1 | 1 | 0 | 0 | 0 | 0 | 2005 | 7D5 | 8021 | 1F55 |
| 360− | 1 | 0 | 1 | 1 | 0 | 0 | 0 | 1 | 2047 | 7FF | 8191 | 1FFF |
| 360+ | 1 | 1 | 1 | 1 | 0 | 0 | 1 | 0 | 0 | 0 | 0 | 0 |

Figure 18:
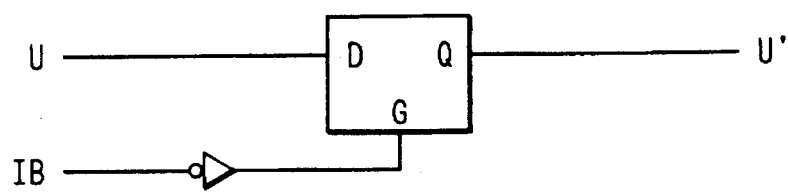
FIG. 18 is a circuit diagram of a signal synchronizing circuit in accordance with the present invention.
Figure 19:
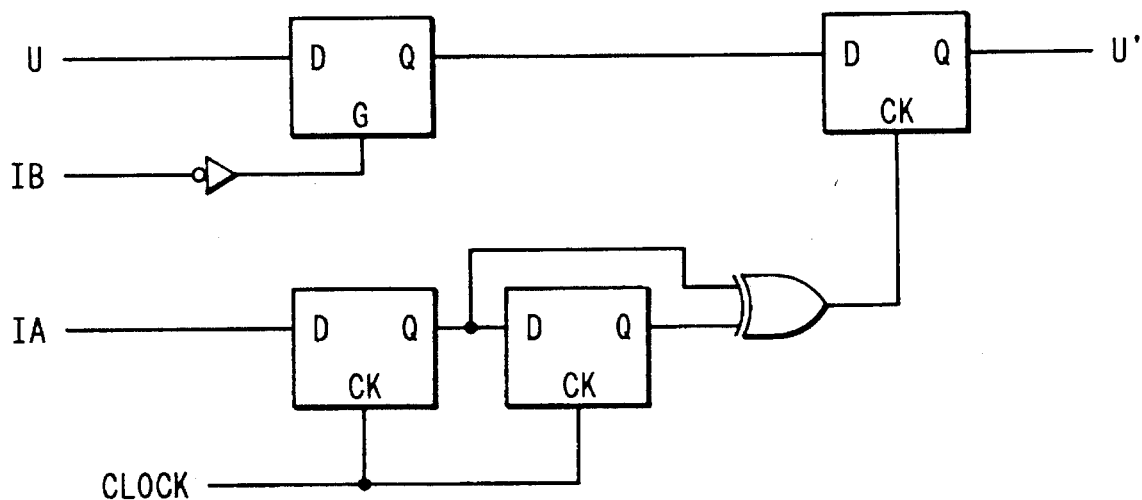
FIG. 19 is a circuit diagram of another signal synchronizing circuit in accordance with the present invention.

Although several examples have been discussed separately in connection with an embodiment of the invention, they may alternatively be used in any combination desired. The data to be preset to the counter at the edges of phases U, V and W of the CS signal may be replaced with those listed in Tables 1 and 2 above depending on the consideration for encoder manufacture as well as on the combination with a servo amplifier. Although the above embodiment has the preset signal SP generated at the edges of phases U, V and W of the CS signal, the preset data may be alternatively preset to the counter 33 using another signal. This signal may be a phase Z signal with which the encoder is usually furnished, or a slit signal obtained from a special preset signal generating slit on the rotating disk. The relationship between the edges of pole position signal phases U, V and W on the one hand, and the increment signal phases A and B on the other hand, may be made unique. This is accomplished illustratively by adding signal synchronizing arrangements of FIGS. 18 and 19 (shown for phase U only) between the comparator output and the rotating position detecting unit 21 in FIG. 1. Although the invention has been described in the form of an optical encoder, the invention may be obviously applied to many other types of encoders including the magnetic encoder. The components 21 and 27 in the above embodiment are made of FF-ROM combinations. Alternatively, the functions of these components may be taken over by the CPU.

Figure 14:
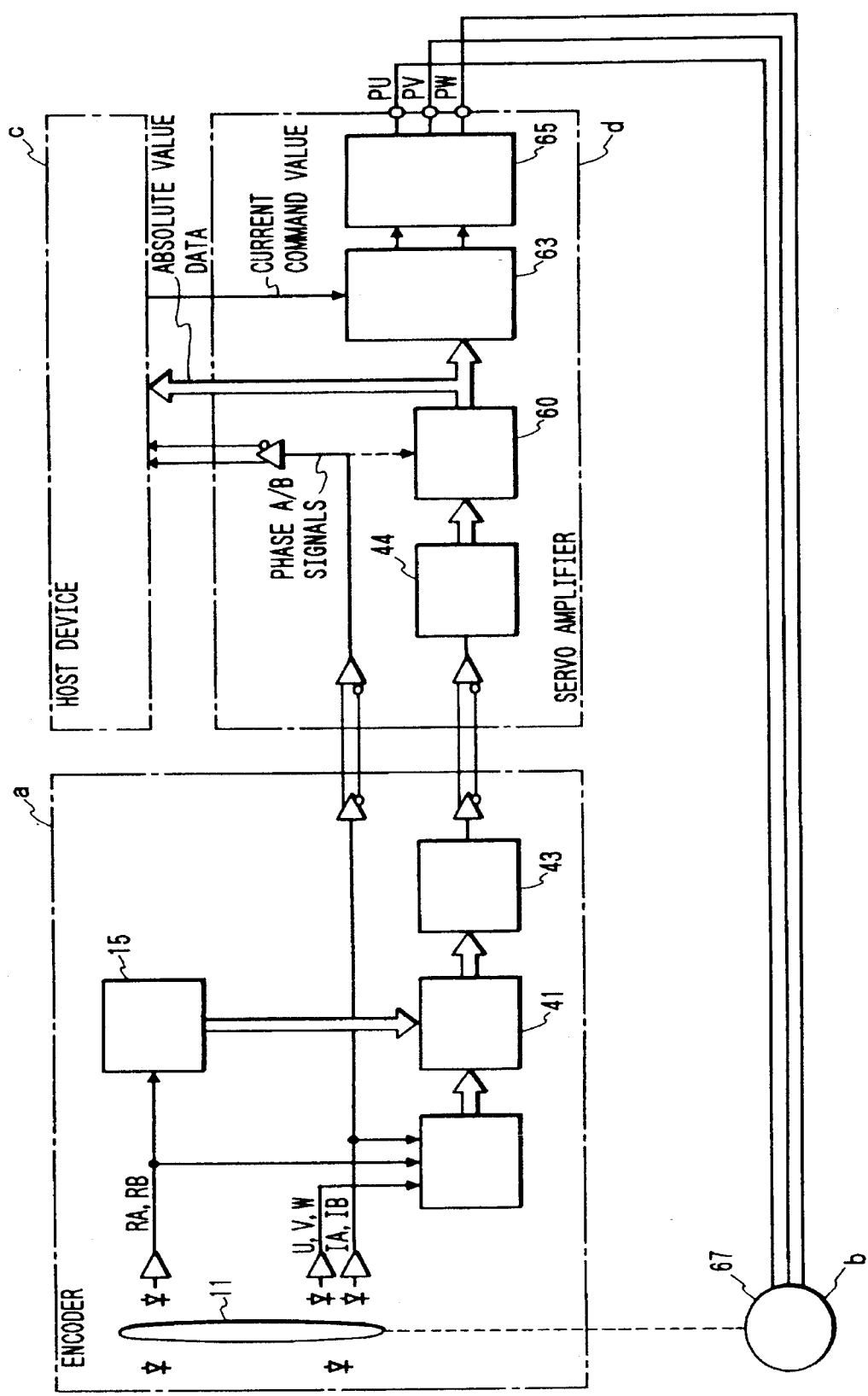
FIG. 14 is a circuit diagram of an AC servo system incorporating the encoder according to the present invention.

A servo system incorporating the encoder according to the invention is now described with reference to FIG. 14. A multiple revolution absolute value signal of the encoder a is serially transmitted to a servo amplifier d via a modem 43 and a line driver. The servo amplifier decodes the signal using a line receiver and a modem 44. The resulting multiple revolution absolute value data is output to a signal processing circuit 60. The signal processing circuit 60 processes the signal coming from the modem 44, and outputs the multiple revolution absolute value data to a host device c. The host device thus knows the multiple revolution absolute values of the motor. Meanwhile, a pole division circuit 63 receives a rotating position of the motor, i.e., the position per motor revolution gathered from the multiple revolution absolute value data. The circuit 63 uses the received motor rotating position as position data for pole division. Using the motor rotating position signal, the pole division circuit 63 subjects a current command value coming from the host device to the pole division process. As a result, the circuit 63 outputs a phase current command value. The phase current command value is translated by a current control unit (ACR) 65 into a motor current that rotates the motor 67 also indicated as motor b. The motor shaft is mechanically connected to the encoder shaft so that the encoder also rotates in combination. Meanwhile, two-phase incremental signals A and B are output from the servo amplifier to the host device. In the servo system of FIG. 14, applying power to the encoder causes it to transmit the data that was set by a set pulse RSP based on a reset signal. The servo amplifier generates the data phase current command value to rotate the motor. At this point, the motor is driven by square wave because the encoder position signal remains unchanged. When the motor rotates by 30° at the most (on a 4-pole type), the counter inside the encoder is set to a correct value by a set pulse SP from an edge of the CS signal. Thereafter, the counter always indicates the correct value. From the time the data is preset, the motor position data keeps changing, i.e., the motor is driven by sine wave. After being powered, the host device reads the multiple revolution absolute value data once and rotates the motor. (The motor is rotated by 30° at most if it is a four-pole type, or by 15° at most if it is an eight-pole type, until the motor rotating position is preset at an edge of the CS signal.) Then the host device again reads the multiple revolution absolute value data. Since the data that is read the second time indicates a true motor rotating position, suitable use of that data for position control constitutes a scheme of perfect position control. After the correct data has been read, the incremental signal phases A and B may be used illustratively to count the position.

Figure 15:
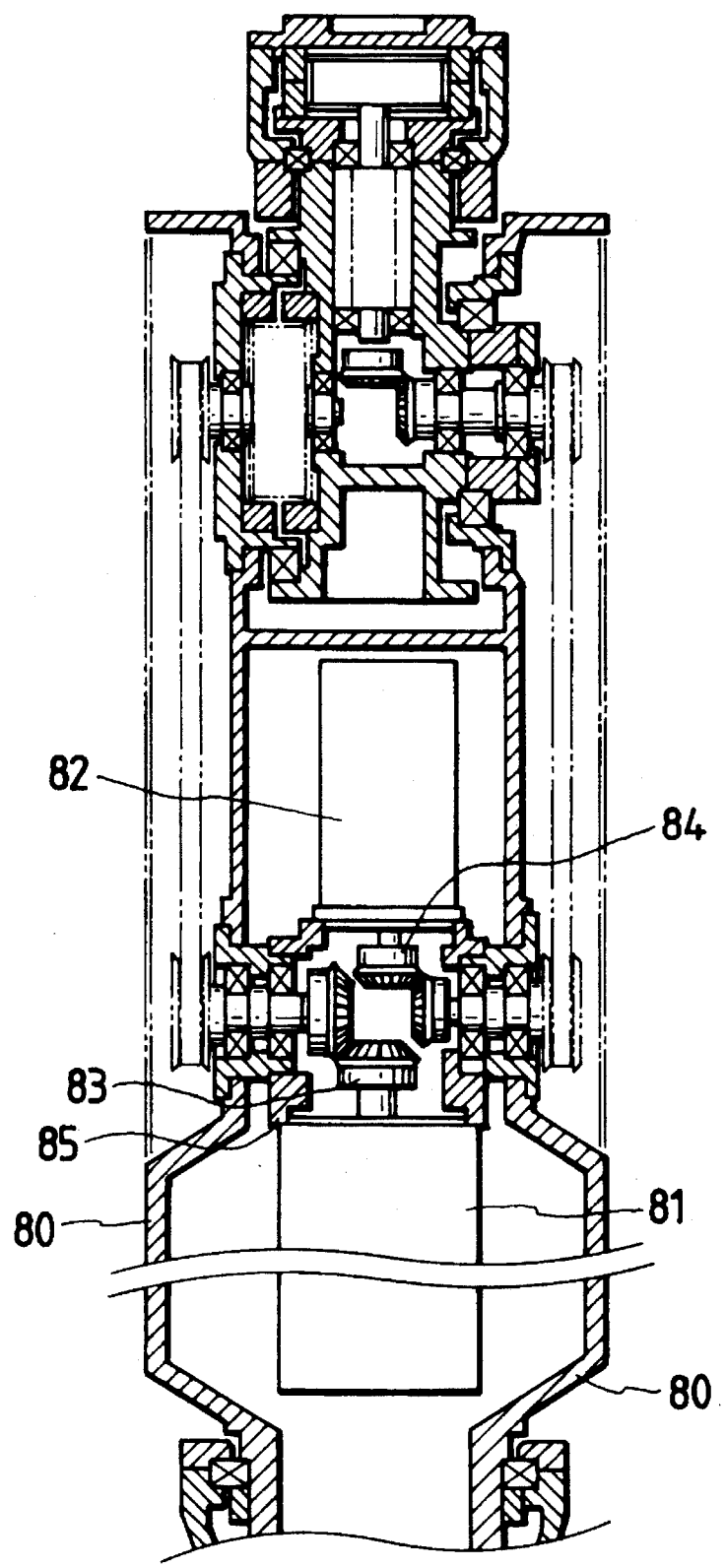
FIG. 15 is a view showing how the wrist of an industrial robot is generally constructed.
Figure 16:
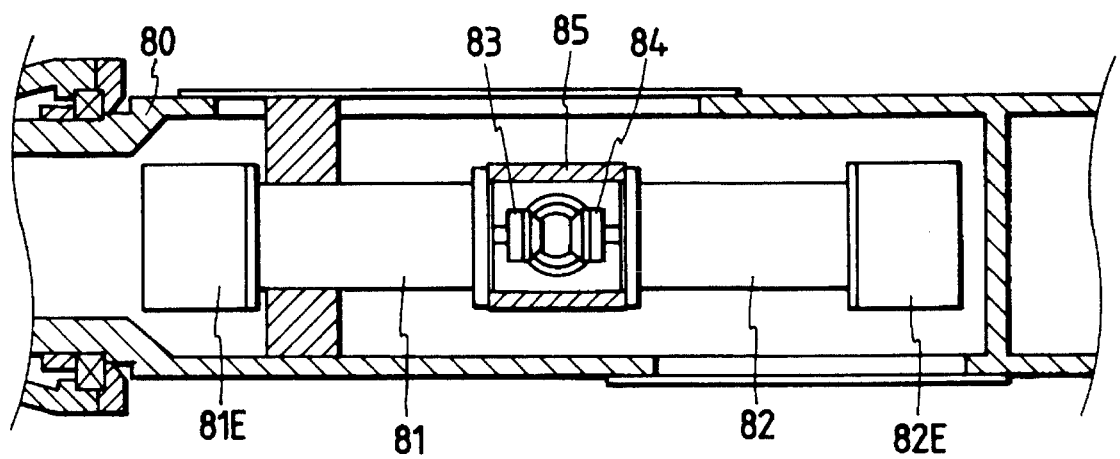
FIG. 16 is a view illustrating how the robot wrist is constructed using the conventional encoder.
Figure 17:
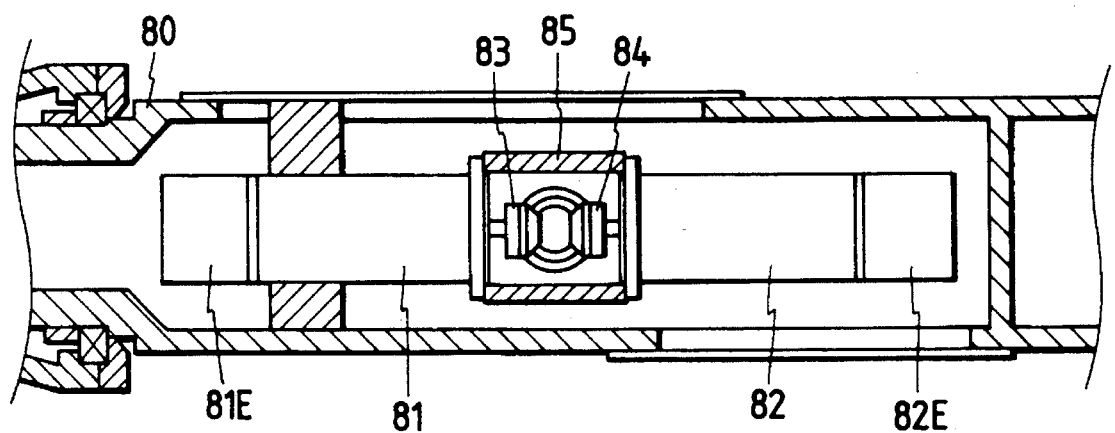
FIG. 17 is a view depicting how the robot wrist is constructed using the encoder embodying the invention.

An industrial robot incorporating the encoder according to the invention is now described with reference to FIGS. 15 through 17. Industrial robots are required to be equipped with the smallest possible wrist so as to minimize interference with their working surroundings. One conventional wrist shape is disclosed in Japanese Patent Laid-Open No. 1-177987 and as illustrated in FIG. 15 includes a wrist base 80 having two motors: an oscillating motor 81 and a rotating motor 82, and a gear box 85. The oscillating motor 81 is coupled via a level gear 83 for effecting movement of the wrist and the rotating motor 82 is coupled via level gear 84 for effecting movement of the wrist. In this wrist structure, the wrist base 80 is severely constrained in size by the motor and encoder dimensions. For comparative purposes, an encoder is cited from The Comprehensive Catalog of Rotary Encoders and Rotating Sensors (Vol. 02, Jan. 1990) of Samtac Inc. The invention envisages an encoder equivalent to the incremental encoder LHB-001-2500 in the cited literature, as opposed to the absolute value encoder AEM-002-2048 measuring 75 mm in diameter and 63.5 mm in length in the same literature. Assume that these encoders are built into an industrial robot. When the conventional encoder is used, as shown in FIG. 16, the encoder 81E for the oscillating motor 81 is larger than the motor 81 and, likewise, the encoder 82E for the rotating motor 82 is larger than the motor 82. Thus, the wrist size is constrained by the encoder dimensions. By contrast, the use of the encoder according to the invention as shown in FIG. 17 makes the motor 81 (82) substantially the same in size as the encoder 81E (82E) so that the wrist size may be reduced. That is, the inventive encoder measuring 46 mm in diameter and 42 mm in length is smaller by about 30 mm in external dimensions than its conventional equivalent. The dimensional reduction directly contributes to making the robot wrist smaller in external size. This benefit is particularly pronounced for small-size robots. Because the encoder according to the invention has a small outer diameter, there is no need to reduce the number of encoder slits. Hence there is no need to lower the resolution of absolute values, thereby allowing precise robot operations to be carried out.

On such a mechanically complicated machine as a multiple axis industrial robot, the use of the inventive encoder permits determination of the approximate position and attitude of the robot using the position information established by pulses RSP upon power-up. This makes it possible to activate the motor on each axis so as to have the robot approach its origin. That is, the robot may be moved until its home position determined by SP pulses is reached, with no interference with any tools that may surround it. Such movement of the robot to its home position poses no problem. The reason is that the amount of mechanical movement involved is 0.6 to 0.3 degrees with respect to a motor rotation angle of 30 degrees (maximum rotation of a four-pole motor with SP pulses), with the reduction ratio of the robot's reduction gear generally set between $1/50$ and $1/100$.

With the conventional robot construction, the origin synchronizing operation is carried out by locking the servo at a particular position of phase Z so as to replace the current value with a true current position. According to the invention, there is no need to follow that step because simply rotating the robot provides the true current position.

Another embodiment of an absolute value encoder with low resolution according to the present invention is described with reference to FIGS. 20–23. Assume that the incremental signal has a resolution of 2,048 pulses per revolution and that six gray code signals exist, i.e., GRAY1 through GRAY6. The six gray codes are arranged herein to provide 48 divisions (i.e., a multiple of 6) per revolution, as shown FIG. 21, although the six codes would otherwise add up to 64 divisions (=$2^6$) per revolution. This feature is intended to allow for AC servo use and for an envisaged encoder signal conversion to phases U, V and W of the commutation signal (CS signal).

The circuit features are the same as those of the above-described encoder which uses the incremental signal with phases U, V and W.

Figure 20:
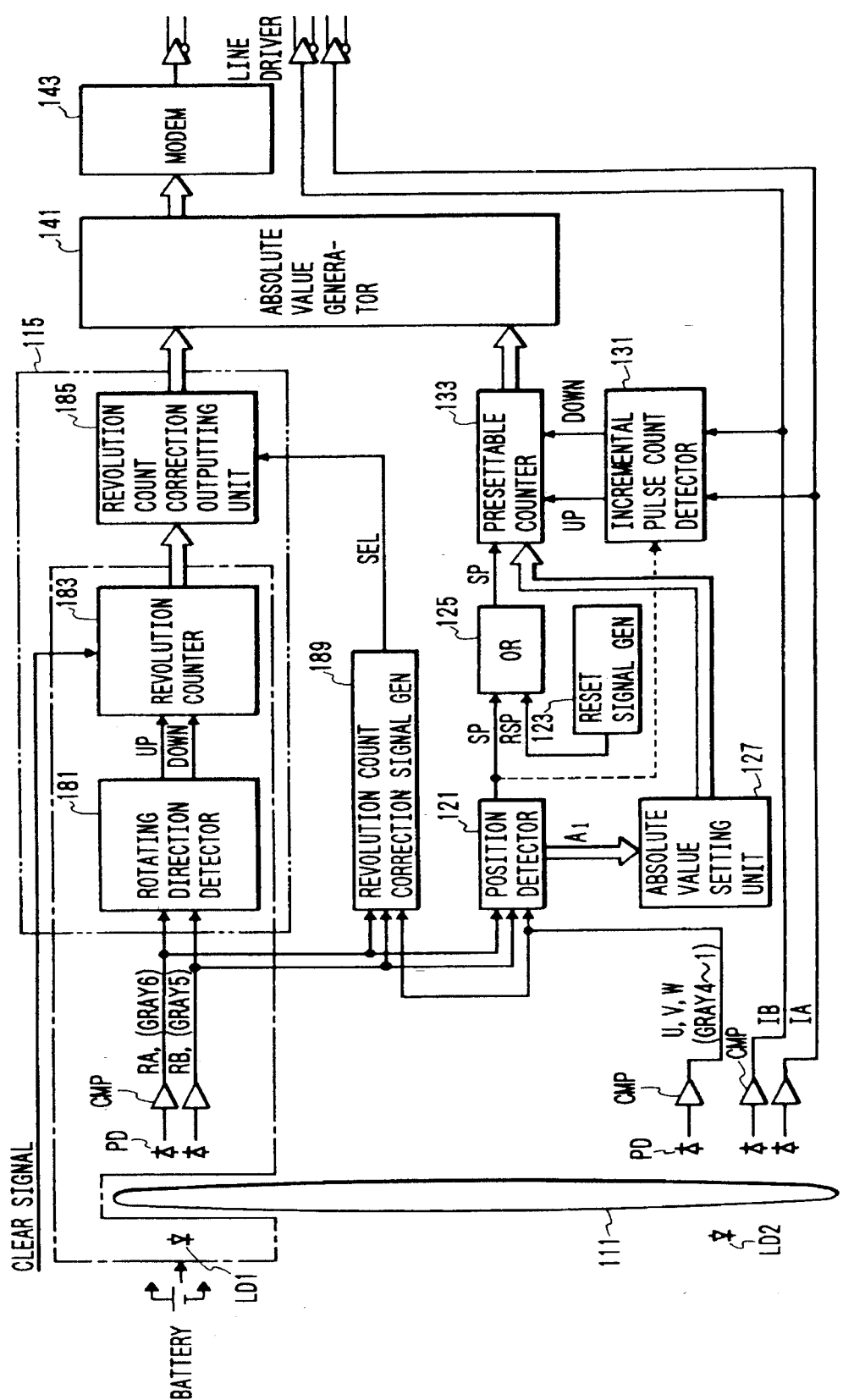
FIG. 20 is a block diagram of another embodiment of an encoder according to the present invention utilizing gray code signals.
Figure 21:
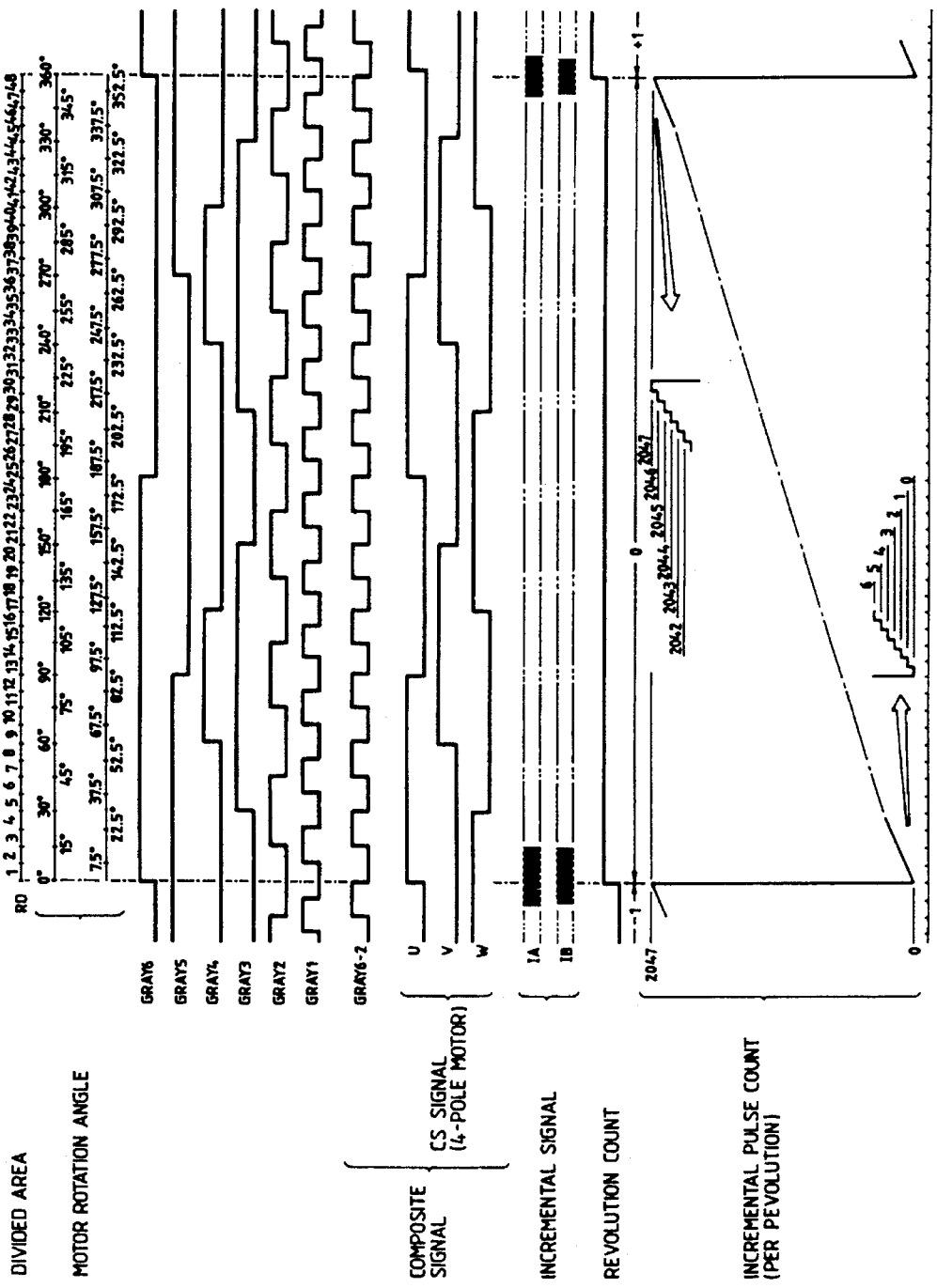
FIG. 21 is a view illustrating encoder signals based on gray codes.

Referring to FIG. 21, a rotating disk 111 of the encoder as shown in FIG. 20 contains a slit pattern for generating the following signals:

Gray code signals GRAY1 through GRAY6 for roughly dividing each revolution into positions;

Two-phase signals GRAY5 and GRAY6 (included in the gray code signals above) 90 degrees apart from each other and used to count revolutions; and Two-phase incremental signals for detecting an incremental pulse count, comprising phases IA and IB which are 90 degrees apart.

Meanwhile, it is assumed that the edges of signal GRAY6 are positioned at 0°, 180° and 360° that the edges of signal GRAY5 are positioned at 90° and 270°, and that the revolutions are counted by counting edge changes of signal GRAY5 when signal GRAY5 is held High. It is also assumed that the edges of signal GRAY4 are positioned at 60°, 120°, 240° and 300°; the edges of signal GRAY3 at 30°, 150°, 210° and 330°; the edges of signal GRAY2 at 15°, 45°, 75°, 105°, 135°, 165°, 195°, 225°, 255°, 285°, 315° and 345°; and the edges of GRAY1 at 7.5°, 22.5°, 37.5°, 52.5°, 67.5°, 82.5°, 97.5°, 112.5°, 127.5°, 142.5°, 157.5°, 172.5°, 187.5°, 202.5°, 217.5°, 232.5°, 247.5°, 262.5°, 277.5°, 292.5°, 307.5°, 322.5°, 337.5° and 352.5°. The six signals (GRAY1–GRAY6) are so combined as to split each motor revolution into divisions of 7.5°, thereby splitting the motor rotation angle range into 48 divisions (RD1–RD48).

Furthermore, it is assumed that the number of incremental pulses of phases IA and IB indicating the amount in which the disk is rotated is 2,048 per revolution, and that the edges of phase IA are positioned at 0° and 360°. With the encoder of the above construction, signals GRAY5 and GRAY6 are used to make revolution counts of −1, 0 and +1, while phases IA and IB are used to count the revolutions from 0 up to 2,047 (multiple of incremental pulses×1). The revolution count and the incremental pulse count per revolution are combined to provide the functionality of an absolute value encoder. Thus, this embodiment provides a simplified absolute value encoder which permits movement within one of 48 rotation angle range divisions so that the absolute position is precisely updated on the boundary between divisions.

Referring to FIG. 20, light beams from LED's LD1 and LD2 pass through the slits of the rotating disk 111 and are received by photodiodes PD's. The received light beams are rectified in waveform by comparators CMP's that generate signals GRAY6, GRAY5, GRAY4, GRAY3, GRAY2, GRAY1, IA and IB. The signals GRAY6 and GRAY5 are counted by a revolution counter 115 that counts the number of revolutions (i.e., revolution count).

detector 121 singly or in any combination in keeping with the required number of divisions. Although this embodiment utilizes only signal GRAY1 for edge detection, edges of each gray code signal or signals GRAY6 through GRAY2 may be exclusive OR'ed to produce a composite signal that achieves the same purpose.

Table 3 shows position data per revolution with respect to the edges of each signal for GRAY1 only.

TABLE 3

| | | | | | | | | GRAY 1 (ONLY) | | | |
|---|---|---|---|---|---|---|---|---|---|---|---|
| | | | | | | | | 2048P Established Data | | 8192P Established Data | |
| ANGLE | A6 | A5 | A4 | A3 | A2 | A1 | A0 | (DEC) | (HEX) | (DEC) | (HEX) |
| (0.0) | — | — | — | — | — | — | — | (0) | (0) | (0) | (0) |
| ∫ | 1 | 1 | 0 | 0 | 0 | 0 | 0 | 21 | 15 | 85 | 55 |
| 7.5− | 1 | 1 | 0 | 0 | 0 | 0 | 1 | 42 | 2A | 170 | AA |
| 7.5+ | 1 | 1 | 0 | 0 | 0 | 1 | 0 | 43 | 2B | 171 | AB |
| ∫ | 1 | 1 | 0 | 0 | 0 | 1 | 1 | 64 | 40 | 256 | 100 |
| (15.0) | — | — | — | — | — | — | — | (85) | (55) | (342) | (156) |
| ∫ | 1 | 1 | 0 | 0 | 1 | 1 | 1 | 106 | 6A | 427 | 1AB |
| 22.5− | 1 | 1 | 0 | 0 | 1 | 1 | 0 | 127 | 7F | 511 | 1FF |
| 22.5+ | 1 | 1 | 0 | 0 | 1 | 0 | 1 | 128 | 80 | 512 | 200 |
| ∫ | 1 | 1 | 0 | 0 | 1 | 0 | 0 | 149 | 95 | 597 | 255 |
| (30.0) | — | — | — | — | — | — | — | (171) | (AB) | (683) | (2AB) |
| ∫ | 1 | 1 | 0 | 1 | 1 | 0 | 0 | 192 | C0 | 768 | 300 |
| 37.5− | 1 | 1 | 0 | 1 | 1 | 0 | 1 | 213 | D5 | 853 | 355 |
| 37.5+ | 1 | 1 | 0 | 1 | 1 | 1 | 0 | 214 | D6 | 854 | 356 |
| ∫ | 1 | 1 | 0 | 1 | 1 | 1 | 1 | 235 | EB | 939 | 3AB |
| (45.0) | — | — | — | — | — | — | — | (256) | (100) | (1024) | (400) |
| ∫ | 1 | 1 | 0 | 1 | 0 | 1 | 1 | 277 | 115 | 1109 | 455 |
| 52.5− | 1 | 1 | 0 | 1 | 0 | 1 | 0 | 298 | 12A | 1194 | 4AA |
| 52.5+ | 1 | 1 | 0 | 1 | 0 | 0 | 1 | 299 | 12B | 1195 | 4AB |
| ∫ | 1 | 1 | 0 | 1 | 0 | 0 | 0 | 320 | 140 | 1280 | 500 |
| (60.0) | — | — | — | — | — | — | — | (342) | (156) | (1366) | (556) |
| ∫ | ∫ | ∫ | ∫ | ∫ | ∫ | ∫ | ∫ | ∫ | ∫ | ∫ | ∫ |
| (300.0) | — | — | — | — | — | — | — | (1707) | (6AB) | (6827) | (1AAB) |
| ∫ | 0 | 1 | 0 | 1 | 0 | 0 | 0 | 1728 | 6C0 | 6912 | 1B00 |
| 307.5− | 0 | 1 | 0 | 1 | 0 | 0 | 1 | 1749 | 6D5 | 6997 | 1B55 |
| 307.5+ | 0 | 1 | 0 | 1 | 0 | 1 | 0 | 1750 | 6D6 | 6998 | 1B56 |
| ∫ | 0 | 1 | 0 | 1 | 0 | 1 | 1 | 1770 | 6EA | 7082 | 1BAA |
| (315.0) | — | — | — | — | — | — | — | (1792) | (700) | (7168) | (1C00) |
| ∫ | 0 | 1 | 0 | 1 | 1 | 1 | 1 | 1813 | 715 | 7253 | 1C55 |
| 322.5− | 0 | 1 | 0 | 1 | 1 | 1 | 0 | 1834 | 72A | 7338 | 1CAA |
| 322.5+ | 0 | 1 | 0 | 1 | 1 | 0 | 1 | 1835 | 72B | 7339 | 1CAB |
| ∫ | 0 | 1 | 0 | 1 | 1 | 0 | 0 | 1856 | 740 | 7424 | 1D00 |
| (330.0) | — | — | — | — | — | — | — | (1878) | (756) | (7510) | (1D56) |
| ∫ | 0 | 1 | 0 | 1 | 1 | 0 | 0 | 1898 | 76A | 7594 | 1DAA |
| 337.5− | 0 | 1 | 0 | 1 | 1 | 0 | 1 | 1919 | 77F | 7679 | 1DFF |
| 337.5+ | 0 | 1 | 0 | 1 | 1 | 1 | 0 | 1920 | 780 | 7680 | 1E00 |
| ∫ | 0 | 1 | 0 | 1 | 1 | 1 | 1 | 1941 | 795 | 7765 | 1E55 |
| (345.0) | — | — | — | — | — | — | — | (1963) | (7AB) | (7851) | (1EAB) |
| ∫ | 0 | 1 | 0 | 1 | 0 | 1 | 1 | 1984 | 7C0 | 7936 | 1F00 |
| 352.5− | 0 | 1 | 0 | 1 | 0 | 1 | 0 | 2005 | 7D5 | 8021 | 1F55 |
| 352.5+ | 0 | 1 | 0 | 1 | 0 | 0 | 1 | 2006 | 7D6 | 8022 | 1F56 |
| ∫ | 0 | 1 | 0 | 1 | 0 | 0 | 0 | 2026 | 7EA | 8106 | 1FAA |
| (360.0) | — | — | — | — | — | — | — | (0) | (0) | (0) | (0) |

At least one of the gray code signals GRAY6 through GRAY1 is input to rotating position detector 121. With this embodiment, all six signal signals are input to the rotating position detector 121. Every time an edge of a designated gray code signal is detected, the rotating position detector 121 outputs a sampling pulse SP. In addition, the rotating position detector 121 supplies absolute value setting unit 127 with a signal AD indicating the rotating position of the encoder, the indicated position being in effect when the sampling pulse SP is output. The gray code signals GRAY6 through GRAY1 may be input to the rotating position As depicted in FIG. 21, the signals GRAY1 through GRAY6 may be combined to split each revolution into divisions of 7.5° each. Thus if the resolution per revolution is 2,048, the transition point of each divided position is calculated as 2,048×(7.5×N/360) where, N=0, 1, 2, etc. Here, all values below (7.5×N)° are discarded and those equal to or greater than (7.5×N)° are raised to the nearest whole number. This is done so as to make the position data corresponding to each divided position an integer. For example, if N=2, the transition point at 15° is given as 2,048×(15/360)=85.3. The transition point is 85 (54H in hex) at −15° on the 0° side of edge 15°, and 86 (55H in hex) at +15° the 90° side of edge 15°. The same processing is performed for each division edge to obtain the data for the 2048P/R in Table 3. Where the resolution per revolution, multiplied by 4, is 8,192, the transition point is given as 8,192×(7.5×N/360) where, N=0, 1, 2, etc. The same processing as for the above resolution of 2,048 is then carried out to provide the divided position data for the 8192P/R in Table 3.

Figure 22:
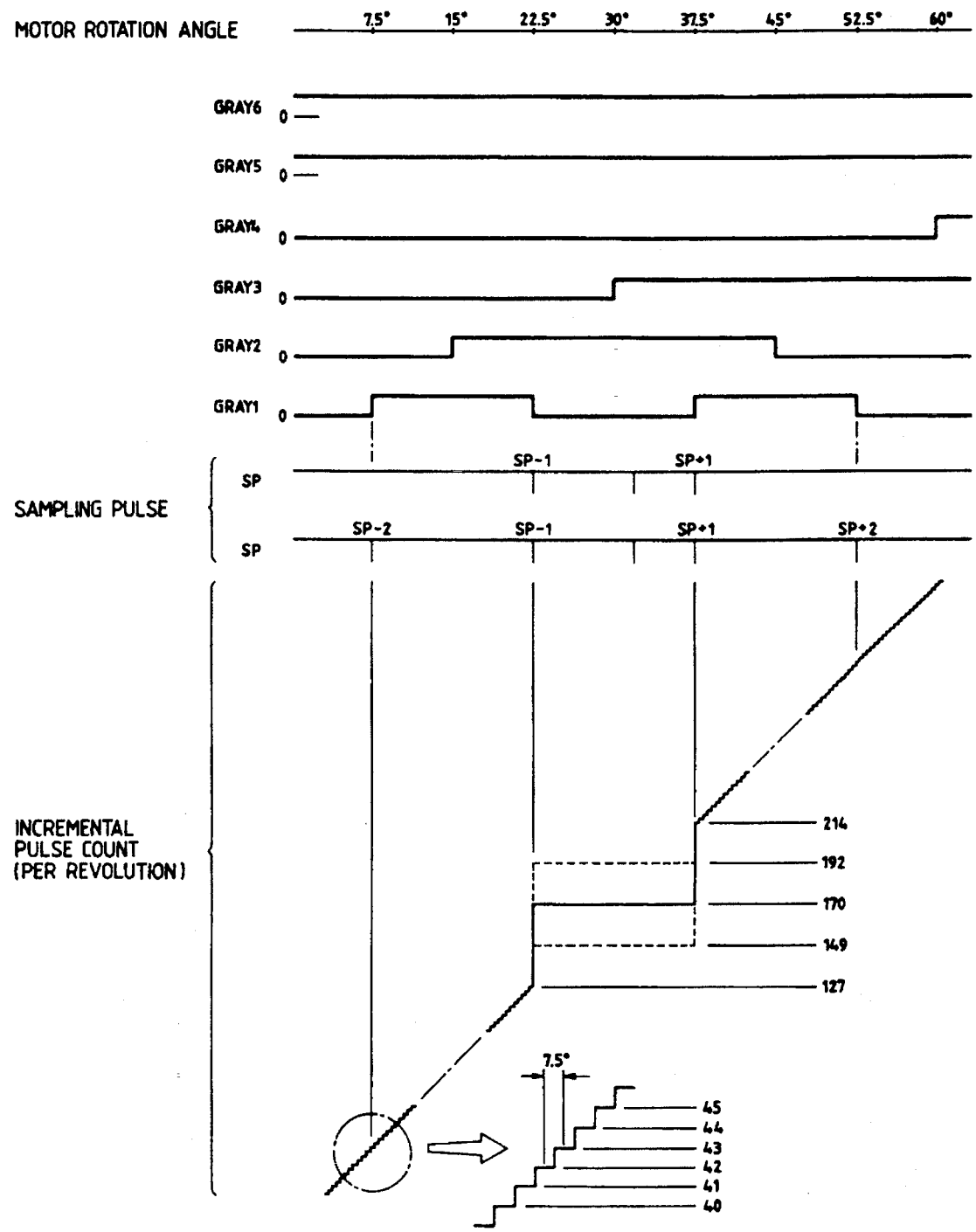
FIG. 22 is a view showing preset signal operations (in conjunction with gray codes)

How this embodiment functions will now be described with reference to FIGS. 22 and 23. In the description that follows, the precise position is preset at each edge of signal GRAY1. Because there exists only one signal to define the preset position, an increase in the position accuracy of signal GRAY1 and detection of differential signals for higher detection speed make the position accuracy of signals GRAY6 through GRAY2 coarse and hence the signal detection speed low. This in turn makes it easy to design and manufacture the slits and optical signal processing circuits.

The above scheme leaves the transition points of signals GRAY6 through GRAY2 dislodged relative to each edge of signal GRAY1. This feature takes advantage of one benefit of the gray codes, i.e., their ability to provide stable signals at the edges of signal GRAY1.

In this example, it is assumed that power Vcc is applied at 32°, between rotation angles 22.5° and 37.5°. With the power applied, a reset sampling pulse RSP causes the data indicating a rotation angle of 30 (hex data: AA) to be loaded into a counter 33. The rotation angle may be any angle between 22.5° (hex data: 80) and 37.5° (hex data: D5). In this example, the value 30° is selected because it may be regarded as the most average value.

When the encoder rotates, the rotating position detector 121 generates a sampling pulse SP. (If the encoder rotates in the forward direction, a sampling pulse SP+1 is generated at 37.5° and a sampling pulse SP+2 at 52.5°; if the encoder rotates in the reverse direction, a sampling pulse SP−1 is generated at 22.5° and a sampling pulse SP−2 at 7.5°.) This pulse occurs at an edge of signal GRAY1 and turns into a position signal of precise rotation angle which presets the counter to a precise value. Thereafter, the counter keeps indicating a correct rotation angle by counting the incremental signals IA and IB.

Figure 23:
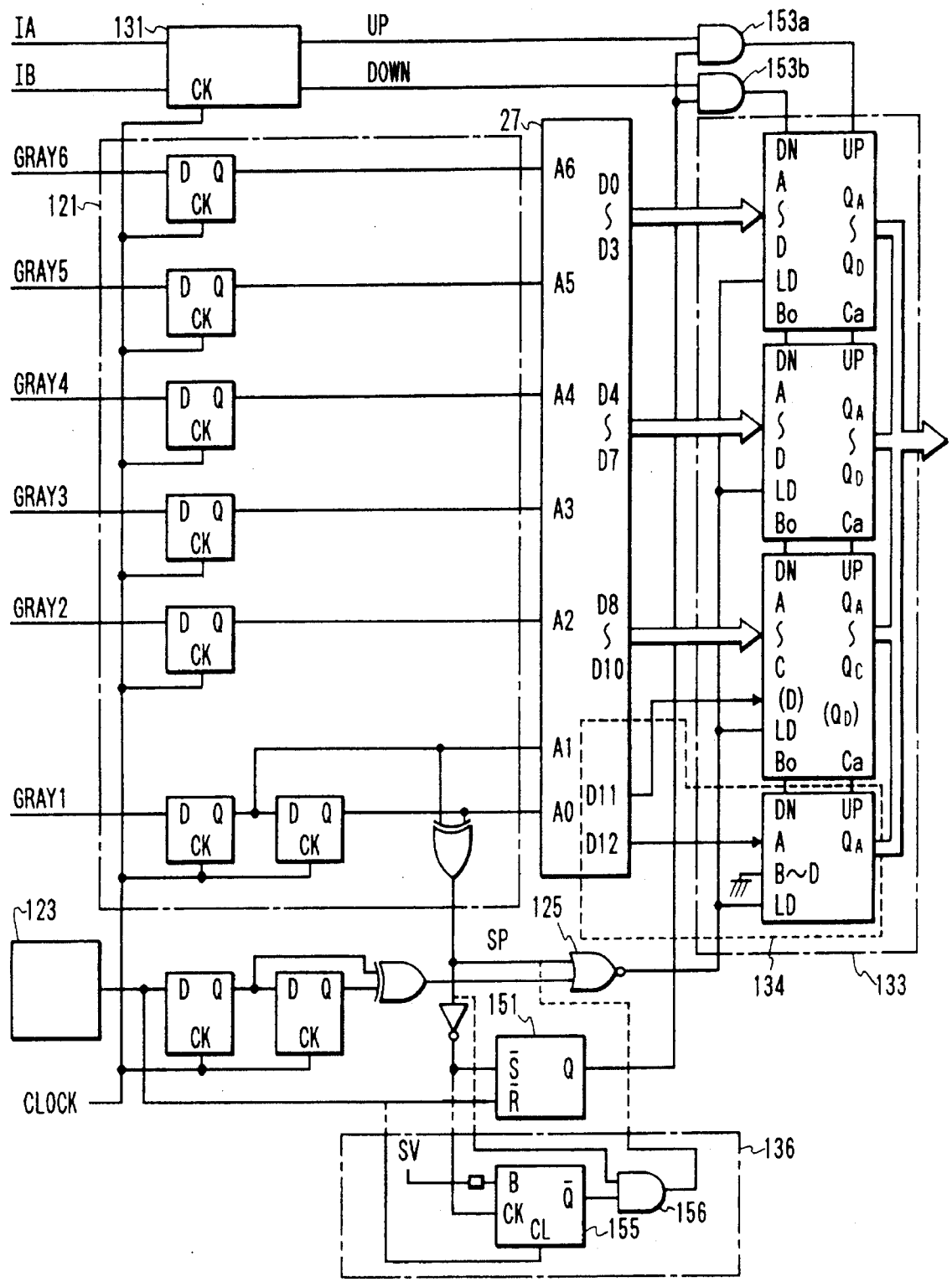
FIG. 23 is a block circuit diagram of a portion of an encoder utilizing gray codes.

FIG. 23 shows a typical arrangement of the rotating position detector 121, a NOR circuit 125 and reset signal generating means 23. As illustrated, signals GRAY6 through GRAY2 are sampled by D type flip-flops (called D-FF's) in synchronism with a clock signal. Signal GRAY1 is sampled by a two-stage D-FF. The output of each D-FF becomes the corresponding input to A6 through A0 constituting an address for the absolute value setting unit 127. That is, the output turns into a signal specifying an absolute value. In accordance with the inputs A0 through A6, the absolute value setting unit 127 supplies the counter 133 with a precise absolute value per encoder revolution as preset data. The outputs of the two-stage D-FF which has sampled signal GRAY1 enter an exclusive-OR circuit. If the two signals (A0 and A1) fail to match, a sampling pulse of one clock width is output at each edge of signal GRAY1. Of the other parts in FIG. 23, those having the same functions as their counterparts in FIG. 20 are designated by the same reference numerals.

As described, the counter 133 outputs a provisional absolute position using a reset sampling pulse RSP when power is applied. Following this, the counter 133 outputs a true absolute position using a sampling pulse SP. Thereafter, the counter 133 keeps outputting true absolute positions by counting the incremental signals. The incremental signals IA and IB are illustratively multiplied by 4 as follows: All that needs to be done is to add a circuit 134 and increase the output data by two bits (D0–D12), the resulting 13-bit output data being sent from the absolute value setting unit 127 to the counter 133 (incremental pulse counter) in the same manner as before. That is, the multiplying of the incremental signals is addressed by simply increasing the data bit count. Table 3 lists typical outputs from the absolute value setting unit 127 of this example.

Whereas each of signals GRAY6 through GRAY2 is latched by a D-FF in this example, a stable signal is acquired in a position where the SP signal is generated. Obviously, utilizing this feature will make it possible to remove the D-FF's that latch signals GRAY6 through GRAY2.

When a circuit 136 including a D-FF 155 and an AND circuit 155 is added to the embodiment of FIG. 23, the sampling pulses SP occurring at the edges of signal GRAY1 after the addition, only the SP signal generated after reset (SP+1 for forward rotation, SP−1 for reverse rotation) becomes effective and is used as a load signal SP. FIG. 22 illustrates signal states that apply to this example. In this example, the preset operation is completed while the revolution count is still low. This makes it possible to keep the speed of the signal processing circuit low.

Figure 25:
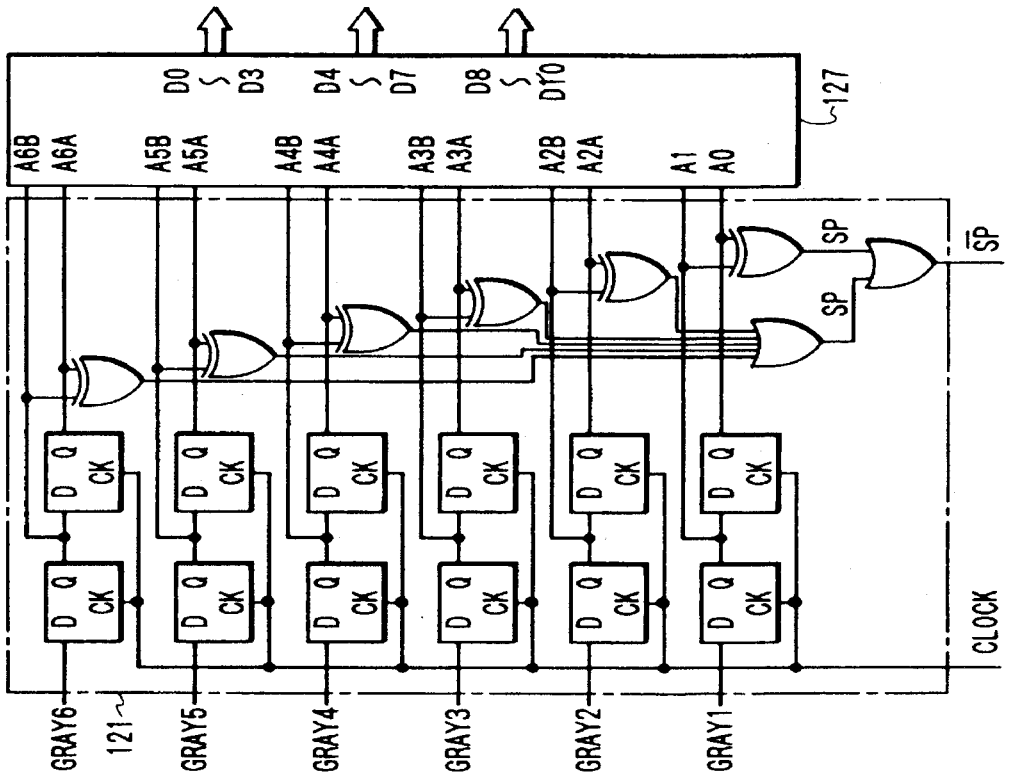
FIG. 25 is another block circuit diagram of a portion of the encoder in which preset signals are increased.
Figure 24:
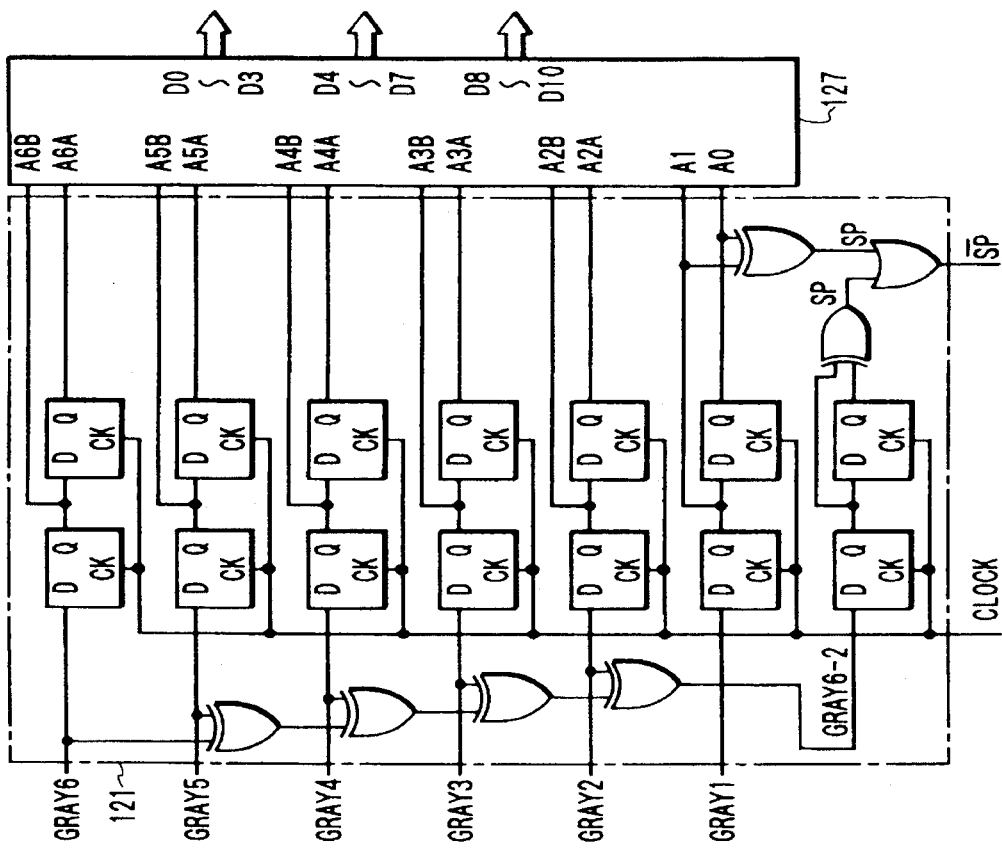
FIG. 24 is a block circuit diagram of a portion of the encoder in which preset signals are increased.

Referring to FIGS. 24 and 25, a scheme for reducing the rotation angle from the time power is applied until the time an accurate position is preset using the SP signal at edges of not only signal GRAY1 but also signals GRAY6 through GRAY2 is now described. The signals GRAY6 through GRAY2 of FIG. 21 are obtained by having the foregoing signals GRAY6 through GRAY2 exclusive-OR'ed. FIG. 24 shows typical circuit associated with this feature and Table 4 shows relations between inputs and outputs regarding the absolute position setting unit 127.

TABLE 4

| | | | | | | | | | | | | | GRAY 1~6 (ALL) | | | |
|---|---|---|---|---|---|---|---|---|---|---|---|---|---|---|---|---|
| | | | | | | | | | | | | | 2048P Established Data | | 8192P Established Data | |
| ANGLE | A6B | A6A | A5B | A5A | A4B | A4A | A3B | A3A | A2B | A2A | A1 | A0 | (DEC) | (HEX) | (DEC) | (HEX) |
| 0.0− | 0 | 1 | 1 | 1 | 0 | 0 | 0 | 0 | 0 | 0 | 0 | 0 | 2047 | 7FF | 8191 | 1FFF |
| 0.0+ | 1 | 0 | 1 | 1 | 0 | 0 | 0 | 0 | 0 | 0 | 0 | 0 | 0 | 0 | 0 | 0 |
| ∫ | 1 | 1 | 1 | 1 | 0 | 0 | 0 | 0 | 0 | 0 | 0 | 0 | 21 | 15 | 85 | 55 |
| 7.5− | 1 | 1 | 1 | 1 | 0 | 0 | 0 | 0 | 0 | 0 | 0 | 1 | 42 | 2A | 170 | AA |
| 7.5+ | 1 | 1 | 1 | 1 | 0 | 0 | 0 | 0 | 0 | 0 | 1 | 0 | 43 | 2B | 171 | AB |
| ∫ | 1 | 1 | 1 | 1 | 0 | 0 | 0 | 0 | 0 | 0 | 1 | 1 | 64 | 40 | 256 | 100 |
| 15.0− | 1 | 1 | 1 | 1 | 0 | 0 | 0 | 0 | 0 | 1 | 1 | 1 | 84 | 54 | 341 | 155 |

TABLE 4-continued

| | | | | | | | | | | | | | GRAY 1–6 (ALL) | | | |
| | | | | | | | | | | | | | 2048P Established Data | | 8192P Established Data | |
| ANGLE | A6B | A6A | A5B | A5A | A4B | A4A | A3B | A3A | A2B | A2A | A1 | A0 | (DEC) | (HEX) | (DEC) | (HEX) |
|---|---|---|---|---|---|---|---|---|---|---|---|---|---|---|---|---|
| 15.0+ | 1 | 1 | 1 | 1 | 0 | 0 | 0 | 0 | 1 | 0 | 1 | 1 | 85 | 55 | 342 | 156 |
| ∫ | 1 | 1 | 1 | 1 | 0 | 0 | 0 | 0 | 1 | 1 | 1 | 1 | 106 | 6A | 427 | 1AB |
| 22.5− | 1 | 1 | 1 | 1 | 0 | 0 | 0 | 0 | 1 | 1 | 1 | 0 | 127 | 7F | 511 | 1FF |
| 22.5+ | 1 | 1 | 1 | 1 | 0 | 0 | 0 | 0 | 1 | 1 | 0 | 1 | 128 | 80 | 512 | 200 |
| ∫ | 1 | 1 | 1 | 1 | 0 | 0 | 0 | 0 | 1 | 1 | 0 | 0 | 149 | 95 | 597 | 255 |
| 30.0− | 1 | 1 | 1 | 1 | 0 | 0 | 0 | 1 | 1 | 1 | 0 | 0 | 170 | AA | 682 | 2AA |
| 30.0+ | 1 | 1 | 1 | 1 | 0 | 0 | 1 | 0 | 1 | 1 | 0 | 0 | 171 | AB | 683 | 2AB |
| ∫ | 1 | 1 | 1 | 1 | 0 | 0 | 1 | 1 | 1 | 1 | 0 | 0 | 192 | C0 | 768 | 300 |
| 37.5− | 1 | 1 | 1 | 1 | 0 | 0 | 1 | 1 | 1 | 1 | 0 | 1 | 213 | D5 | 853 | 355 |
| 37.5+ | 1 | 1 | 1 | 1 | 0 | 0 | 1 | 1 | 1 | 1 | 1 | 0 | 214 | D6 | 854 | 356 |
| ∫ | 1 | 1 | 1 | 1 | 0 | 0 | 1 | 1 | 1 | 1 | 1 | 1 | 235 | EB | 939 | 3AB |
| 45.0− | 1 | 1 | 1 | 1 | 0 | 0 | 1 | 1 | 1 | 0 | 1 | 1 | 255 | FF | 1023 | 3FF |
| 45.0+ | 1 | 1 | 1 | 1 | 0 | 0 | 1 | 1 | 0 | 1 | 1 | 1 | 256 | 100 | 1024 | 400 |
| ∫ | 1 | 1 | 1 | 1 | 0 | 0 | 1 | 1 | 0 | 0 | 1 | 1 | 277 | 115 | 1109 | 455 |
| 52.5− | 1 | 1 | 1 | 1 | 0 | 0 | 1 | 1 | 0 | 0 | 1 | 0 | 298 | 12A | 1194 | 4AA |
| 52.5+ | 1 | 1 | 1 | 1 | 0 | 0 | 1 | 1 | 0 | 0 | 0 | 1 | 299 | 12B | 1195 | 4AB |
| ∫ | ∫ | ∫ | ∫ | ∫ | ∫ | ∫ | ∫ | ∫ | ∫ | ∫ | ∫ | ∫ | ∫ | ∫ | ∫ | ∫ |
| 307.5− | 0 | 0 | 1 | 1 | 0 | 0 | 1 | 1 | 0 | 0 | 0 | 1 | 1749 | 6D5 | 6997 | 1B55 |
| 307.5+ | 0 | 0 | 1 | 1 | 0 | 0 | 1 | 1 | 0 | 0 | 1 | 0 | 1750 | 6D6 | 6998 | 1B56 |
| ∫ | 0 | 0 | 1 | 1 | 0 | 0 | 1 | 1 | 0 | 0 | 1 | 1 | 1770 | 6EA | 7082 | 1BAA |
| 315.0− | 0 | 0 | 1 | 1 | 0 | 0 | 1 | 1 | 0 | 1 | 1 | 1 | 1791 | 6FF | 7167 | 1BFF |
| 315.0+ | 0 | 0 | 1 | 1 | 0 | 0 | 1 | 1 | 1 | 0 | 1 | 1 | 1792 | 700 | 7168 | 1C00 |
| ∫ | 0 | 0 | 1 | 1 | 0 | 0 | 1 | 1 | 1 | 1 | 1 | 1 | 1813 | 715 | 7253 | 1C55 |
| 322.5− | 0 | 0 | 1 | 1 | 0 | 0 | 1 | 1 | 1 | 1 | 1 | 0 | 1834 | 72A | 7338 | 1CAA |
| 322.5+ | 0 | 0 | 1 | 1 | 0 | 0 | 1 | 1 | 1 | 1 | 0 | 1 | 1835 | 72B | 7339 | 1CAB |
| ∫ | 0 | 0 | 1 | 1 | 0 | 0 | 1 | 1 | 1 | 1 | 0 | 0 | 1856 | 740 | 7424 | 1D00 |
| 330.0− | 0 | 0 | 1 | 1 | 0 | 0 | 1 | 0 | 1 | 1 | 0 | 0 | 1877 | 755 | 7509 | 1D55 |
| 330.0+ | 0 | 0 | 1 | 1 | 0 | 0 | 0 | 1 | 1 | 1 | 0 | 0 | 1878 | 756 | 7510 | 1D56 |
| ∫ | 0 | 0 | 1 | 1 | 0 | 0 | 0 | 0 | 1 | 1 | 0 | 0 | 1898 | 76A | 7594 | 1DAA |
| 337.5− | 0 | 0 | 1 | 1 | 0 | 0 | 0 | 0 | 1 | 1 | 0 | 1 | 1919 | 77F | 7679 | 1DFF |
| 337.5+ | 0 | 0 | 1 | 1 | 0 | 0 | 0 | 0 | 1 | 1 | 1 | 0 | 1920 | 780 | 7680 | 1E00 |
| ∫ | 0 | 0 | 1 | 1 | 0 | 0 | 0 | 0 | 1 | 1 | 1 | 1 | 1941 | 795 | 7765 | 1E55 |
| 345.0− | 0 | 0 | 1 | 1 | 0 | 0 | 0 | 0 | 1 | 0 | 1 | 1 | 1962 | 7AA | 7850 | 1EAA |
| 345.0+ | 0 | 0 | 1 | 1 | 0 | 0 | 0 | 0 | 0 | 1 | 1 | 1 | 1963 | 7AB | 7851 | 1EAB |
| ∫ | 0 | 0 | 1 | 1 | 0 | 0 | 0 | 0 | 0 | 1 | 1 | 1 | 1984 | 7C0 | 7936 | 1F00 |
| 352.5− | 0 | 0 | 1 | 1 | 0 | 0 | 0 | 0 | 0 | 1 | 1 | 0 | 2005 | 7D5 | 8021 | 1F55 |
| 352.5+ | 0 | 0 | 1 | 1 | 0 | 0 | 0 | 0 | 0 | 0 | 0 | 1 | 2006 | 7D6 | 8022 | 1F56 |
| ∫ | 0 | 0 | 1 | 1 | 0 | 0 | 0 | 0 | 0 | 0 | 0 | 0 | 2026 | 7EA | 8106 | 1FAA |
| 360.0− | 0 | 1 | 1 | 1 | 0 | 0 | 0 | 0 | 0 | 0 | 0 | 0 | 2047 | 7FF | 8191 | 1FFF |
| 360.0+ | 1 | 0 | 1 | 1 | 0 | 0 | 0 | 0 | 0 | 0 | 0 | 0 | 0 | 0 | 0 | 0 |

Signals GRAY6 through GRAY2 are latched by D-FF's which are a two-stage type each and which are sampled synchronously with the same clock signal. The first-stage D-FF outputs become inputs AnB (GRAY6: A6B, GRAY5: A5B, GRAY4: A4B, GRAY3: A3B, GRAY2: A2B) to the absolute position setting unit 127, and the second-state D-FF outputs become inputs AnA (GRAY6: A6A, GRAY5: A5A, GRAY4: A4A, GRAY3: A3A, GRAY2: A2A) to the unit 127. Signals GRAY6 through GRAY2 after their composition are also latched by D-FF's which are a two-stage type each and which are sampled synchronously with the same clock signal. The first-stage D-FF outputs and the second-stage D-FF outputs enter the same exclusive-OR circuit. The result is a signal SPB that presets a precise position. The SPB signal is OR'ed with an SPA signal generated at an edge of signal GRAY1. The result is NOR'ed with the reset sampling pulse RSP by the NOR circuit 125, to become a sampling pulse SP. On the other hand, the absolute position setting unit 127 outputs to the incremental pulse counter 133 precise absolute position data per revolution in accordance with the state of inputs A6B, A2A, A1 and A0. The output from the counter 127 and the above-mentioned sampling pulse SP combine to cause a precise absolute position to be set to the incremental pulse counter 133. Thereafter, the incremental pulse counting counter 133 keeps outputting precise absolute positions by counting the incremental signals.

As depicted in FIG. 25, the signal SPB may also be obtained by placing each latched GRAY signal into exclusive-OR inputs and by having them OR'ed.

Figure 26:
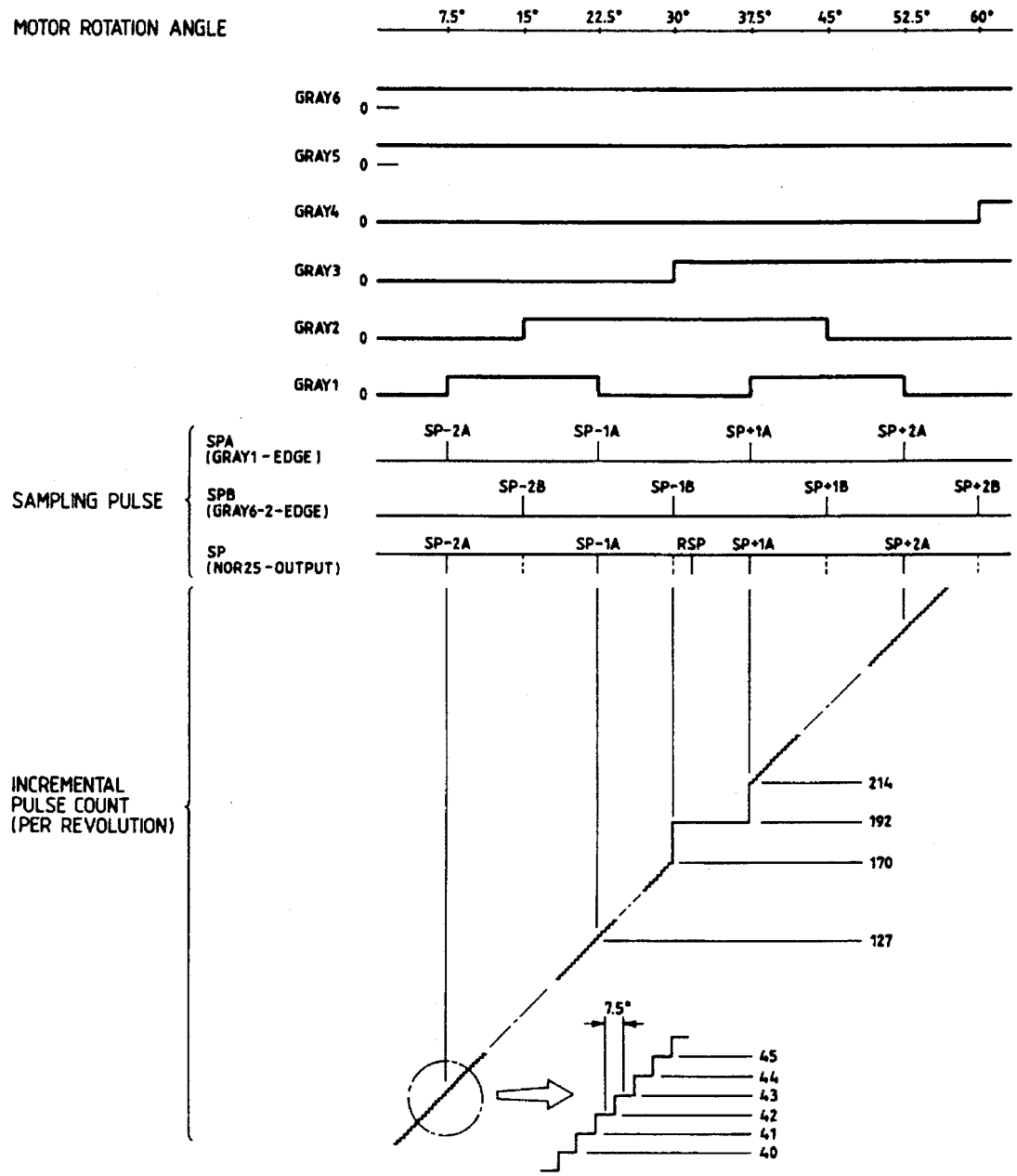
FIG. 26 is a view illustrating encoder signals and an operation when the number of preset signals is raised.

FIG. 26 illustrates how the encoder signal is output when all signals GRAY 6 through GRAY1 are used. As in the case of FIG. 22, it is assumed here that power is applied at a rotation angle of 32°. With power applied, the reset sampling pulse RSP causes the data (hex data: C0) indicating a rotation angle of 33.75° to be loaded into the counter 133. After the rotation made as per the loaded data, an original signal of the sampling pulse is generated (edge signal SPA triggered by signal GRAY1: sampling pulse SP+1A at 37.5° and SP+2A at 52.5° for forward rotation, SP-LA at 22.5° and SP−2A at 7.5° for reverse rotation; edge signal SPB triggered by signals GRAY6–GRAY2: sampling pulse SP+1B at 15.0° and SP+2B at 60.0° for forward rotation, SP−1B at 30.0° and SP−2B at 15.0° for reverse rotation). Position data 214 (hex data: D6) is set by a rotation-generated sampling pulse at 37.5° during forward rotation, and position data 170

(hex data: AA) Is set likewise at 30.0° during reverse rotation. Thereafter, the incremental signals are counted.

Figure 27:
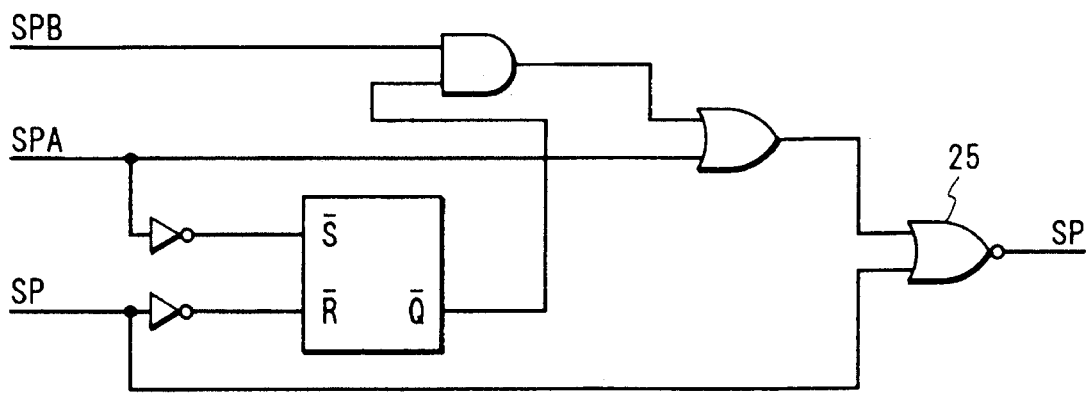
FIG. 27 is a circuit diagram of a portion of the encoder for selecting a preset signal.

In this example, the signal SP has been described as signal obtained from the logic output of signals SPB, SPA and RSP, as shown in FIG. 27. The logic circuit of FIG. 27 presets a precise position using the SPB signal after rotation began from the position provisionally obtained with the RSP signal and before a precise position is preset by the SPA signal. Once the precise position is preset by use of the SPA signal, the logic circuit allows only the SPA signal to be effective. This feature is intended to make the manufacture of the encoder easier by getting the signal accuracy and the detection circuit responsiveness solely dependent on signal GRAY1. The SPB signal is used, as it were, as an auxiliary signal. Otherwise, it is necessary to manufacture an encoder that would require all signals GRAY6 through GRAY1 to be highly accurate. Still, the SPB signal may he always used. Needless to say, the use of the SPB signal allows accurate positions to be obtained with small rotation angles.

It should be noted that the circuit of FIG. 23 can be modified by removing the circuit D-FF 151 and AND circuit 153a and 153b. The removed circuits 151, 153a and 153b were used to retain the position data set by the RSP signal until the SP signal is input. In this modified circuit example, up pulses and down pulses derived from the incremental signals IA and IB are kept input. This means that the counter 133 is kept updated after provisional position data has been set by the RSP signal, as shown in FIG. 26. In this case, too, a sampling pulse SP at each edge of signal GRAY1 causes a precise absolute position to be preset to the incremental pulse counter 133. After this, the counter 133 keeps indicating precise absolute positions by counting the up pulses and down pulses.

The method described above uses gray codes to keep indicating precise absolute positions. As illustrated in FIG. 21, the CS (commutation signal) signal may be composed of gray code signals.

Figure 28:
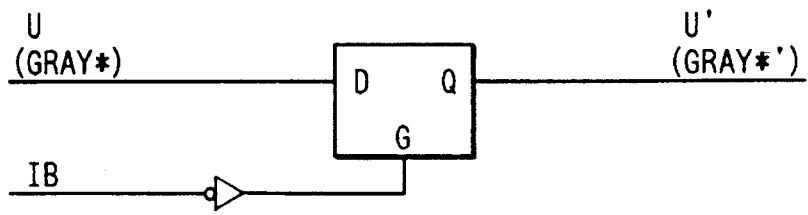
FIG. 28 shows a signal synchronization circuit according to the invention for use with gray codes.
Figure 29:
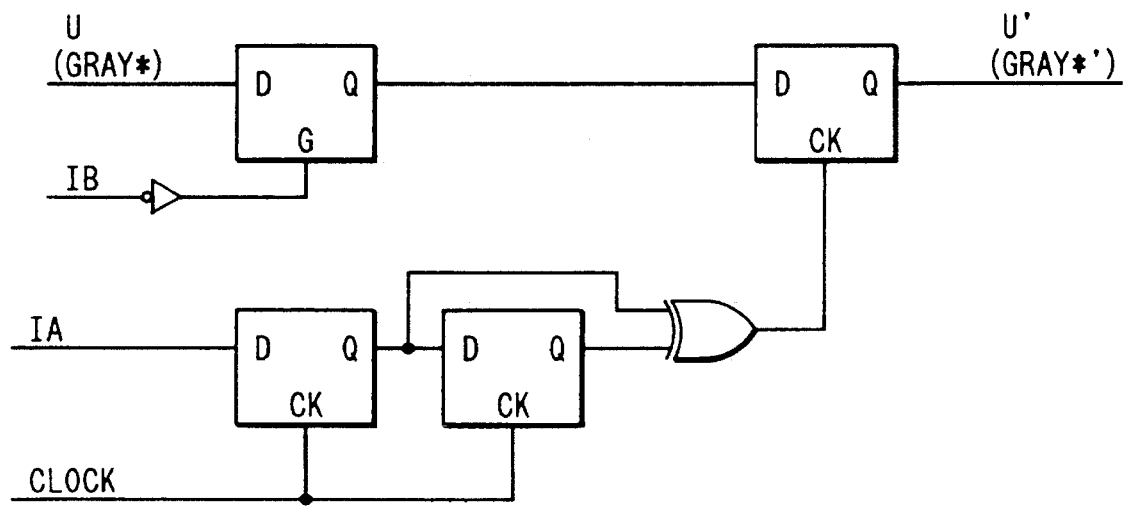
FIG. 29 shows another signal synchronization circuit according to the invention for use with gray codes.

How precise absolute positions are preset at edges of the gray signals has been described so far. From the discussion above, there is recognized a need to keep the relationship unique between the edges of the gray signals on the one hand, and the increment signals IA and IB on the other. Typical ways to fulfill this need are illustrated in FIGS. 28 and 29. The various signals (representative signal U and gray signals) may be used as shown in FIG. 28, and the signals IA and IB used as depicted in FIG. 29. These signals are subjected to latching operation by a signal synchronization circuit. This circuit is interposed between the CMP output (shown in FIG. 20) and the rotating position detector 121.

The cases described so far have involved splitting one revolution into 48 divisions using signals GRAY6 through GRAY1. But as is known, up to 64 divisions (=26) are available by use of six signals.

Figure 30:
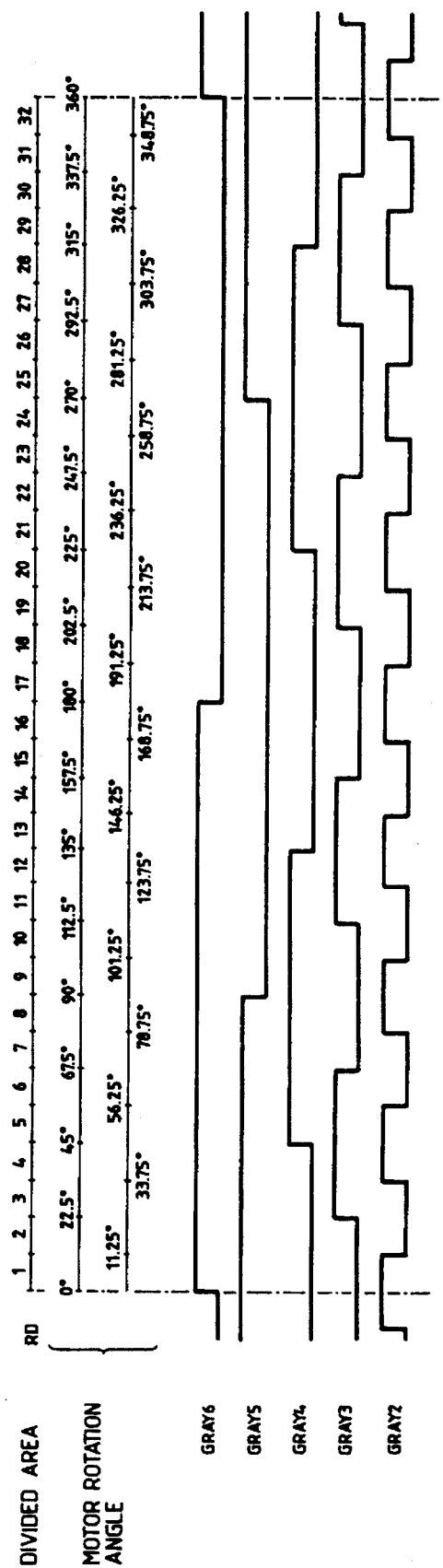
FIG. 30 is a view illustrating encoder signals (of 32 divisions) for use when the highest order signal is set to 0°.

FIG. 30 illustrates a typical case in which 32 divisions are made using five signals GRAY6 through GRAY2. Conventionally, signals GRAY6 and GRAY5 are used to detect and count revolutions. For the counting actually to take place at an edge of signal GRAY6, that edge is positioned at a rotation angle of 0°. Another arrangement in this respect is disclosed in Japanese Patent Laid-Open No. 63-83612. In the disclosed arrangement, a magnetic encoder is utilized to detect a revolution count while an optical encoder is employed to detect the rotation angle per revolution. The two encoders combine to constitute a multiple revolution absolute value encoder. Yet another arrangement is disclosed in Japanese Patent Laid-Open No. 1-305315. In this case, the signal edge from the slit for detecting the revolution count may not be obtained precisely at a rotation angle of 0°; the edge may occur at 359° or 1°. These arrangements are proposed in part to solve the problem of dislocation between the signal edge from the slit for revolution count detection and the precise rotation angle of 0°. However, the dislocation problem is often left untouched to give precedence to higher accuracy in encoder manufacture and more reductions in power dissipation.

Figure 31:
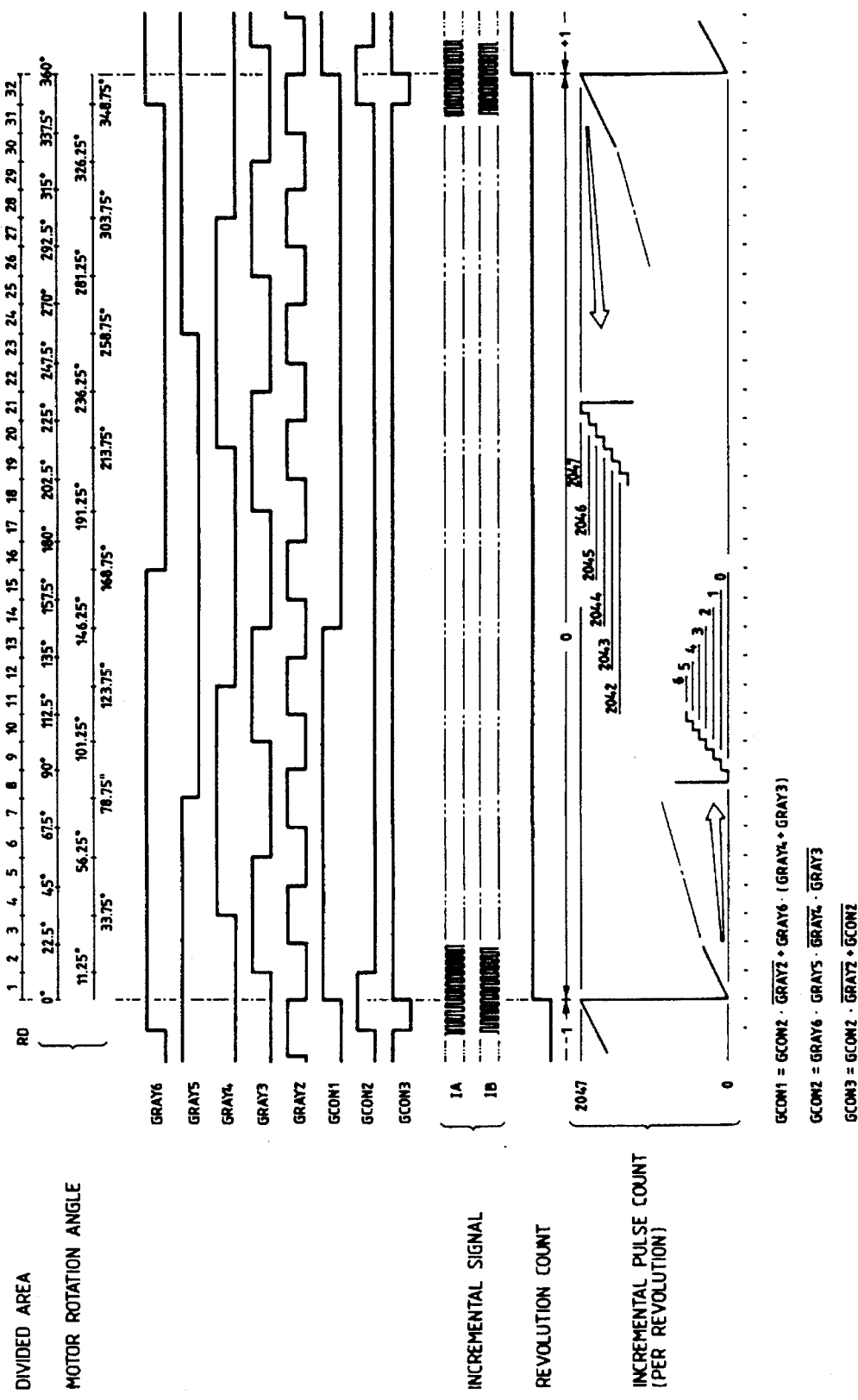
FIG. 31 illustrates encoder signals (of 32 divisions) for use when the revolution count detection signals are dislodged.

One way to correct the dislocation of revolution count detection signals according to the invention will now be described using GRAY signals and with reference to FIGS. 31 through 34. For descriptive simplicity, an encoder utilizing five signals GRAY6 through GRAY2 shown in FIG. 31 is taken as an example. It is assumed that the edges of revolution count detection signals GRAY6 and GRAY5 are appreciably dislodged from the rotation angle of 0°, i.e., the edges of signal GRAY5 at 168.75° and 348.75°, the edges of signal GRAY6 at 78.75° and 258.75°. It is also assumed that the edges of signal GRAY4 are positioned at 33.75°, 123.75°, 213.75° and 303.75°, the edges of signal GRAY3 at 11.25°, 56.25°, 101.25°, 116.25°, 191.25°, 236.25°, 281.25° and 326.25° and the edges of signal GRAY2 at 0.00°, 22.5°, 67.50°, 90.00°, 112.50°, 135.00°, 157.50°, 180.00°, 202.50°, 225.00°, 247.50°, 270.00°, 292.50°, 315.00°, 337.50° and 360.00°. One of the edges of signal GRAY2, positioned at the rotation angle of 0°, is taken as reference It is to be noted that this is merely an example and some other reference signal may replace signal GRAY2. Table 5 shows relations between inputs and outputs regarding the absolute position setting means 27 when the edge of signal GRAY2 is at 0° and that of signal GRAY6 is also at 0°.

TABLE 5

| RELATION BETWEEN EDGE OF GRAY CODE SIGNAL AND 0° | | | | | | | | | | | | | 2048P Established Data | | 8192P Established Data | |
|---|---|---|---|---|---|---|---|---|---|---|---|---|---|---|---|---|
| | GRAY6 = 0 deg | | | | | | GRAY2 = 0 deg | | | | | | | | | |
| ANGLE | A6 | A5 | A4 | A3 | A2B | A2A | A6 | A5 | A4 | A3 | A2B | A2A | (DEC) | (HEX) | (DEC) | (HEX) |
| 0.00− | 0 | 1 | 0 | 0 | 1 | 1 | 1 | 1 | 0 | 0 | 1 | 0 | 2047 | 7FF | 8191 | 1FFF |
| 0.00+ | 1 | 1 | 0 | 0 | 1 | 1 | 1 | 1 | 0 | 0 | 0 | 1 | 0 | 0 | 0 | 0 |
| ∫ | 1 | 1 | 0 | 0 | 1 | 1 | 1 | 1 | 0 | 0 | 0 | 0 | 31 | 1F | 127 | 7F |
| 11.25− | 1 | 1 | 0 | 0 | 1 | 0 | 1 | 1 | 0 | 0 | 0 | 0 | 63 | 3F | 255 | AA |
| 11.25+ | 1 | 1 | 0 | 0 | 0 | 1 | 1 | 1 | 0 | 1 | 0 | 0 | 64 | 40 | 256 | AB |
| ∫ | 1 | 1 | 0 | 0 | 0 | 0 | 1 | 1 | 0 | 1 | 0 | 0 | 95 | 5F | 383 | 17F |
| 22.50− | 1 | 1 | 0 | 0 | 0 | 0 | 1 | 1 | 0 | 1 | 0 | 1 | 127 | 7F | 511 | 1FF |
| 22.50+ | 1 | 1 | 0 | 1 | 0 | 0 | 1 | 1 | 0 | 1 | 1 | 0 | 128 | 80 | 512 | 200 |

TABLE 5-continued

| | RELATION BETWEEN EDGE OF GRAY CODE SIGNAL AND 0° | | | | | | | | | | | 2048P Established Data | | 8192P Established Data | |
|---|---|---|---|---|---|---|---|---|---|---|---|---|---|---|---|
| | GRAY6 = 0 deg | | | | | | GRAY2 = 0 deg | | | | | | | | |
| ANGLE | A6 | A5 | A4 | A3 | A2B | A2A | A6 | A5 | A4 | A3 | A2B | A2A | (DEC) | (HEX) | (DEC) | (HEX) |
| ∫ | 1 | 1 | 0 | 1 | 0 | 0 | 1 | 1 | 0 | 1 | 1 | 1 | 159 | 9F | 639 | 27F |
| 33.75– | 1 | 1 | 0 | 1 | 0 | 1 | 1 | 1 | 0 | 1 | 1 | 1 | 191 | BF | 767 | 2FF |
| 33.75+ | 1 | 1 | 0 | 1 | 1 | 0 | 1 | 1 | 1 | 1 | 1 | 1 | 192 | C0 | 768 | 300 |
| ∫ | 1 | 1 | 0 | 1 | 1 | 1 | 1 | 1 | 1 | 1 | 1 | 1 | 223 | DF | 895 | 37F |
| 45.00– | 1 | 1 | 0 | 1 | 1 | 1 | 1 | 1 | 1 | 1 | 1 | 0 | 255 | FF | 1023 | 3FF |
| 45.00+ | 1 | 1 | 1 | 1 | 1 | 1 | 1 | 1 | 1 | 1 | 0 | 1 | 256 | 100 | 1024 | 400 |
| ∫ | ∫ | ∫ | ∫ | ∫ | ∫ | ∫ | ∫ | ∫ | ∫ | ∫ | ∫ | ∫ | ∫ | ∫ | ∫ | ∫ |
| 315.00– | 0 | 1 | 1 | 1 | 1 | 1 | 0 | 1 | 0 | 1 | 1 | 0 | 1791 | 6FF | 7167 | 1BFF |
| 315.00+ | 0 | 1 | 0 | 1 | 1 | 1 | 0 | 1 | 0 | 1 | 0 | 1 | 1792 | 700 | 7168 | 1C00 |
| ∫ | 0 | 1 | 0 | 1 | 1 | 1 | 0 | 1 | 0 | 1 | 0 | 0 | 1823 | 71F | 7295 | 1C7F |
| 326.25– | 0 | 1 | 0 | 1 | 1 | 0 | 0 | 1 | 0 | 1 | 0 | 0 | 1855 | 73F | 7423 | 1CFF |
| 326.25+ | 0 | 1 | 0 | 1 | 0 | 1 | 0 | 1 | 0 | 0 | 0 | 0 | 1856 | 740 | 7424 | 1D00 |
| ∫ | 0 | 1 | 0 | 1 | 0 | 0 | 0 | 1 | 0 | 0 | 0 | 0 | 1887 | 75F | 7551 | 1D7F |
| 337.50– | 0 | 1 | 0 | 0 | 0 | 0 | 0 | 1 | 0 | 0 | 0 | 1 | 1919 | 77F | 7679 | 1DFF |
| 337.50+ | 0 | 1 | 0 | 0 | 0 | 0 | 0 | 1 | 0 | 0 | 1 | 0 | 1920 | 780 | 7680 | 1E00 |
| ∫ | 0 | 1 | 0 | 0 | 0 | 0 | 0 | 1 | 0 | 0 | 1 | 1 | 1951 | 79F | 7807 | 1E7F |
| 348.75– | 0 | 1 | 0 | 0 | 0 | 1 | 0 | 1 | 0 | 0 | 1 | 1 | 1983 | 7BF | 7935 | 1EFF |
| 348.75+ | 0 | 1 | 0 | 0 | 1 | 0 | 1 | 1 | 0 | 0 | 1 | 1 | 1984 | 7C0 | 7936 | 1F00 |
| ∫ | 0 | 1 | 0 | 0 | 1 | 1 | 1 | 1 | 0 | 0 | 1 | 1 | 2015 | 7DF | 8063 | 1F7F |
| 360.00– | 0 | 1 | 0 | 0 | 1 | 1 | 1 | 1 | 0 | 0 | 1 | 0 | 2047 | 7FF | 8191 | 1FFF |
| 360.00+ | 1 | 1 | 0 | 0 | 1 | 1 | 1 | 1 | 0 | 0 | 0 | 1 | 0 | 0 | 0 | 0 |

One conventional method for solving the above-described problem is to bring the dislodged edge of signal GRAY6 to the rotation angle of 0° and then to count revolutions. More specifically, new signals GCON2 and GCON1 are generated by the logic of FIG. 31, with signal GCON1 replacing signal GRAY6. One disadvantage of this method is that power dissipation increases during battery-driven operation because all gray codes (GRAY6–GRAY2) are needed to count revolutions.

Figure 32:
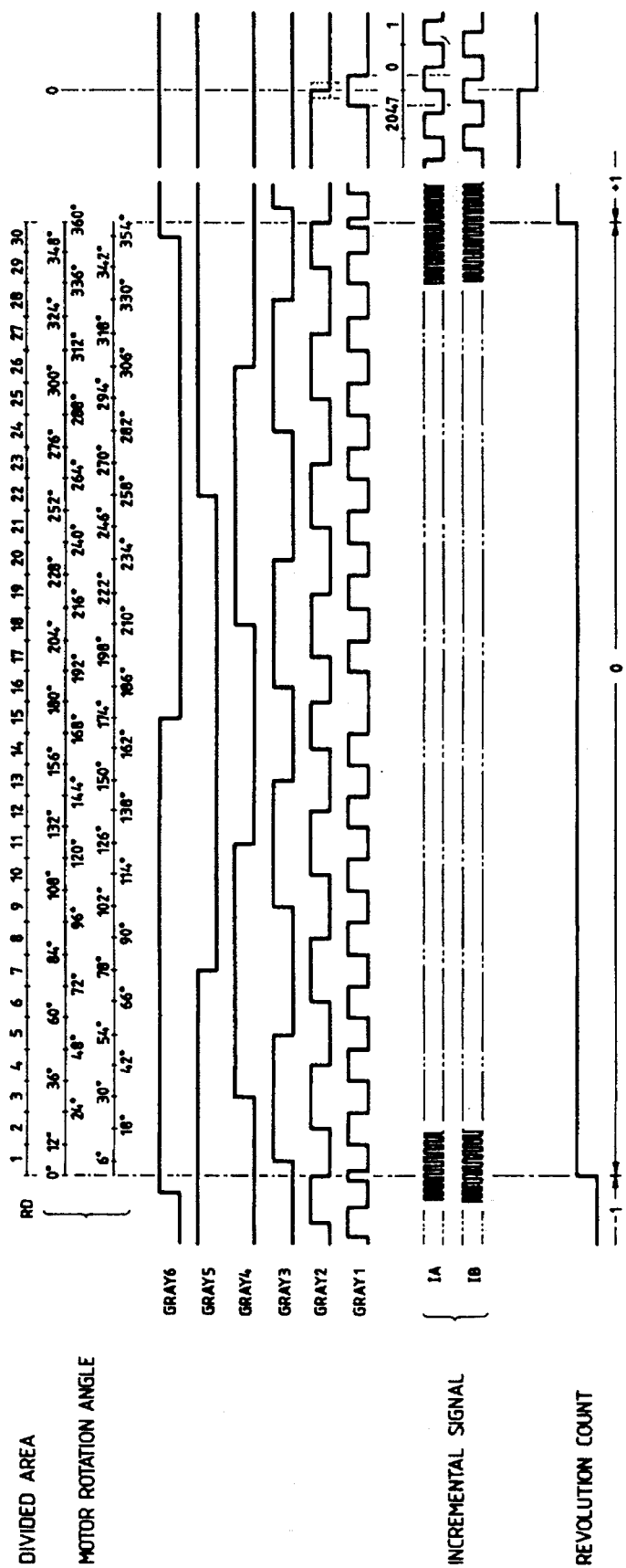
FIG. 32 illustrates encoder signals (of 60 divisions) for use when special signals are generated.

Another conventional method for solving the above problem is to use signals GRAY6 and GRAY5 to count revolutions and to count up pulses and down pulses at the dislodged edges of signal GRAY6. When the power Vcc is applied, the revolution count is corrected by use of a signal relative to signal GRAY2 which indicates the correct position. That is, signal GRAY2 whose edge is at 0° is used to correct the revolution count obtained with signal GRAY6. The signal for this correction, called SEL, is generated by a circuit 189 of FIG. 20 (logic is shown in FIG. 32) through the use of signals GRAY6 to GRAY2. More specifically, when the power Vcc is applied, a new signal GCON3 is generated in addition to the above signals GCON2 and GCON1. When GCON3=1 (i.e., High), the count taken by signal GRAY6 is the applicable revolution count; when GCON3=0 (Low), the count taken by signal GRAY6 minus 1 is the applicable revolution count.

Referring again to FIG. 20, the specific circuit arrangement implementing the above functions will be described. To this embodiment, units 185 and 189, omitted from the foregoing description, are added. Rotating direction detecting unit 181 outputs up pulses and down pulses identifying the rotating direction and indicating the amount of rotation, as disclosed in Japanese Patent Laid-Open No. 60-4924. The up and down pulses enter a revolution counter 183 which counts revolutions. The rotating direction detecting unit 181 and revolution counter 183, driven by battery, keep counting revolutions and retain the revolution count. The output of the revolution counter 183 is input to revolution count correction outputting unit 185. Meanwhile, revolution count correction signal generator 189 admits signals GRAY6 through GRAY2 and output the signal SEL using its logic circuit.

The revolution count correction outputting unit 185 outputs the result from the revolution counter 183 unchanged as the revolution count when SEL=1, and outputs the result minus 1 when SEL=0. In this case, the output becomes the same as when signal GCON3 is used. As described, the revolution count correction outputting unit 185 may illustratively be an arrangement having an operating function based on the SEL signal or a ROM having a state changing function. The output of the revolution count correction outputting unit 185 is used as a revolution count for use with multiple revolution absolute positions.

Figure 33:
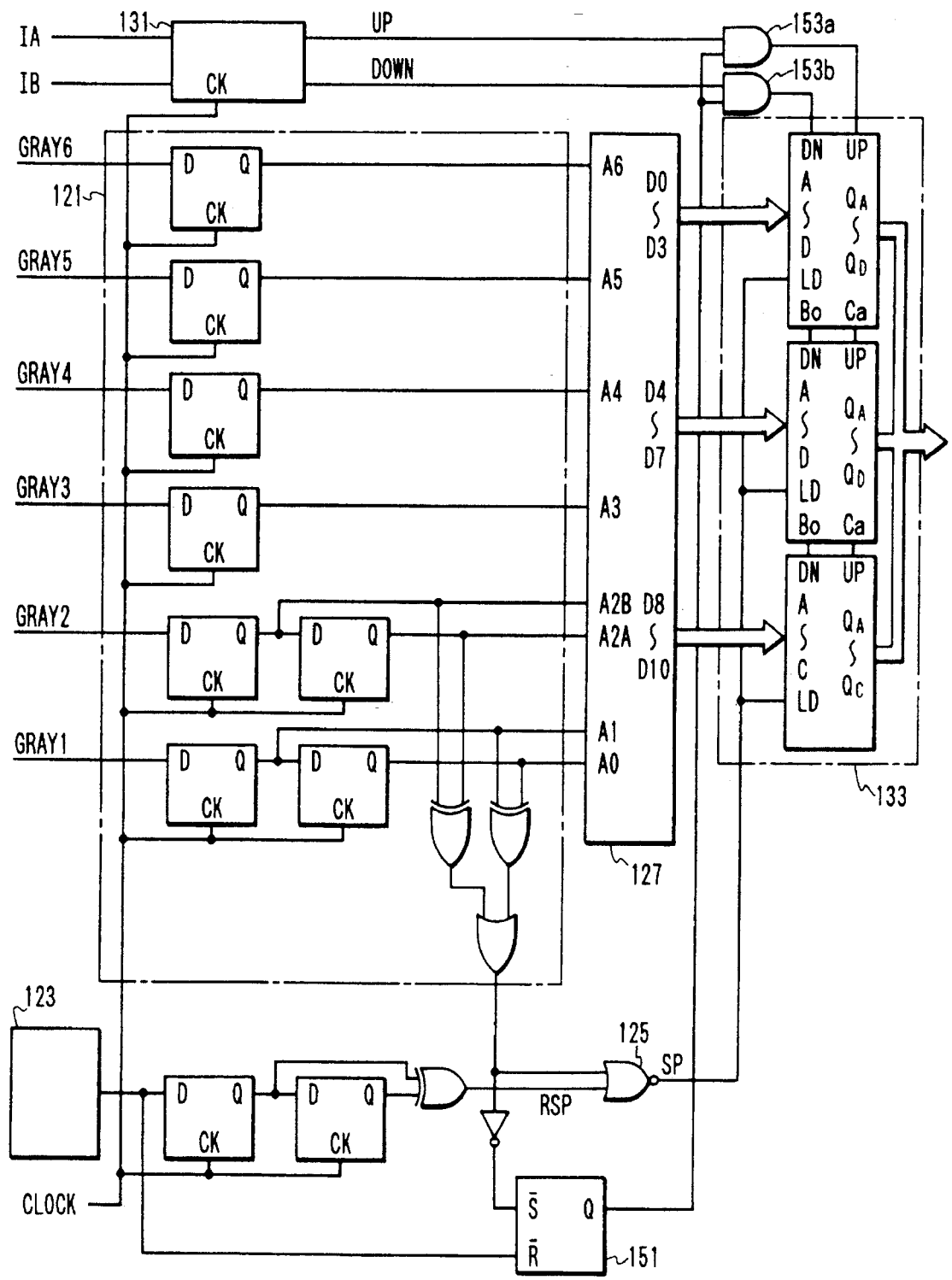
FIG. 33 illustrates a block circuit diagram of a portion of an encoder utilizing the signals of FIG. 32.

Described below is a way of maintaining synchronism with the incremental signals IA and IB in order to make the detection of revolution counts more accurate relative to absolute positions. FIGS. 32 and 33 are referred to utilizing as an example a signal generated once per revolution (i.e., the so-called Z phase signal for conventional encoders). In this example, the signal is generated in combination with other signals on the basis of signal GRAY1. This scheme is intended to compose multiple edges of signal GRAY1 for higher signal utilization efficiency. It is assumed here that the following signal change has taken place. As described above, the edges of revolution count detection signals GRAY6 and GRAY5 are appreciably dislodged from the rotation angle of 0°, i.e., the edges of signal GRAY6 positioned at 174.0° and 352.0°, the edges of signal GRAY5 at 78.0° and 258.0°. The edges of the other signals GRAY4 through GRAY1 are positioned as shown in FIG. 32. Illustratively, the edges of signal GRAY4 are positioned at 30.0°, 126.0°, 210.0° and 306.0°; the edges of signal GRAY3 at 6.0°, 54.0°, 102.0°, 150.0°, 186.0°, etc.; the edges of signal GRAY2 at 0.0°, 18.0°, 42.0°, 66.0°, 90.0°, etc.; and the edges of signal GRAY1 at 12.0°, 24.0°, 36.0°, 48.0°, 60.0°, etc. It is also assumed that around the rotation angle of 0° an edge is formed below the ½ pulse range of position 2,047 and below the ½ pulse range of position 0. The signal waveforms applicable to this state are depicted in FIG. 34. At this time, signals GRAY2 and GRAY1 are assumed to be obtained by a differential detection circuit as locationally accurate and stable signals.

As shown in an enlarged manner in the right-hand side of FIG. 32, signal GRAY2 is assumed to be slightly dislodged from the exact 0° position and be within a 0°±¼ pulse range. As described above, signal GRAY1 is assumed to he generated within the 0°±½ pulse range. In practice, it is easy to form a slit pattern ensuring a signal accuracy level that falls within the respective dislocation amounts.

As described, the logic shown in FIG. 32 provides signals GCON1 through GCON3. Another new signal GCON4 is generated by the logic of FIG. 32. When taken as a new signal GRAY2, signal GCON4 may serve to detect the revolution count accurately in synchronism with the incremental signals IA and IB. FIG. 33 depicts a typical circuit that uses the signals of this example. Since signals GRAY2 and GRAY1 are used by a differential type detection circuit of FIG. 34 as locationally accurate and stable signals, the two signals are latched by a two-stage D-FF arrangement. The first and second stage outputs enter the absolute position setting unit 127. Furthermore, the edges of the two signals are used to generate the sampling pulse SP. This arrangement brings to 44 the number of positions where position determination is accurately available. This in turn reduces the amount of initial rotation or incremental pulse count. Table 6 lists relations between inputs and outputs regarding the absolute position setting unit 127 for the above example.

TABLE 6

|  | ANGLE | A6 | A5 | A4 | A3 | A2B | A2A | A1 | A0 | 2048P Established Data (DEC) | (HEX) | 8192P Established Data (DEC) | (HEX) |
|---|---|---|---|---|---|---|---|---|---|---|---|---|---|
| ** | 0.0− | 1 | 1 | 0 | 0 | 1 | 0 | # | # | 2047 | 7FF | 8191 | 1FFF |
| ** | 0.0+ | 1 | 1 | 0 | 0 | 0 | 1 | # | # | 0 | 0 | 0 | 0 |
|  | ∫ | 1 | 1 | 0 | 0 | 0 | 0 | 0 | 0 | 17 | 11 | 68 | 44 |
|  | (6.0−) | 1 | 1 | 0 | 0 | 0 | 0 | 0 | 0 | (34) | (22) | (136) | (88) |
|  | (6.0+) | 1 | 1 | 0 | 1 | 0 | 0 | 0 | 0 | (35) | (23) | (137) | (89) |
|  | ∫ | 1 | 1 | 0 | 1 | 0 | 0 | 0 | 0 | 51 | 33 | 205 | CD |
| * | 12.0− | 1 | 1 | 0 | 1 | 0 | 0 | 0 | 1 | 68 | 44 | 273 | 111 |
| * | 12.0+ | 1 | 1 | 0 | 1 | 0 | 0 | 1 | 0 | 69 | 45 | 274 | 112 |
|  | ∫ | 1 | 1 | 0 | 1 | 0 | 0 | 1 | 1 | 85 | 55 | 410 | 19A |
| ** | 18.0− | 1 | 1 | 0 | 1 | 1 | 1 | 1 | 1 | 102 | 66 | 546 | 222 |
| ** | 18.0+ | 1 | 1 | 0 | 1 | 1 | 0 | 1 | 1 | 103 | 67 | 547 | 223 |
|  | ∫ | 1 | 1 | 0 | 1 | 1 | 1 | 1 | 1 | 119 | 77 | 614 | 266 |
| * | 24.0− | 1 | 1 | 0 | 1 | 1 | 1 | 1 | 0 | 136 | 88 | 682 | 2AA |
| * | 24.0+ | 1 | 1 | 0 | 1 | 1 | 0 | 0 | 1 | 137 | 89 | 683 | 2AB |
|  | ∫ | 1 | 1 | 0 | 1 | 1 | 0 | 0 | 0 | '153 | 99 | 751 | 2EF |
|  | (30.0−) | 1 | 1 | 0 | 1 | 1 | 0 | 0 | 0 | (170) | (AA) | (819) | (333) |
|  | (30.0+) | 1 | 1 | 1 | 1 | 1 | 1 | 0 | 0 | (171) | (AB) | (820) | (334) |
|  | ∫ | 1 | 1 | 1 | 1 | 1 | 0 | 0 | 0 | 204 | CC | 887 | 377 |
| * | 36.0− | 1 | 1 | 1 | 1 | 1 | 1 | 0 | 1 | 238 | EE | 955 | 3BB |
| * | 36.0+ | 1 | 1 | 1 | 1 | 1 | 1 | 1 | 0 | 239 | EF | 956 | 3BC |
|  | ∫ | 1 | 1 | 1 | 1 | 1 | 1 | 1 | 1 | 256 | 100 | 1024 | 400 |
| ** | 42.0− | 1 | 1 | 1 | 1 | 1 | 0 | 1 | 1 | 273 | 111 | 1092 | 444 |
| ** | 42.0+ | 1 | 1 | 1 | 1 | 0 | 1 | 1 | 1 | 274 | 112 | 1093 | 445 |
|  | ∫ ∫ ∫ ∫ ∫ ∫ ∫ ∫ ∫ ∫ ∫ ∫ ∫ |  |  |  |  |  |  |  |  |  |  |  |  |
| ** | 318.0− | 0 | 1 | 0 | 1 | 1 | 0 | 1 | 1 | 1809 | 711 | 7236 | 1C44 |
| ** | 318.0+ | 0 | 1 | 0 | 1 | 0 | 1 | 1 | 1 | 1810 | 712 | 7237 | 1C45 |
|  | ∫ | 0 | 1 | 0 | 1 | 0 | 0 | 1 | 1 | 1826 | 722 | 7304 | 1C88 |
| * | 324.0− | 0 | 1 | 0 | 1 | 0 | 0 | 1 | 0 | 1843 | 733 | 7372 | 1CCC |
| * | 324.0+ | 0 | 1 | 0 | 1 | 0 | 0 | 0 | 1 | 1844 | 734 | 7373 | 1CCD |
|  | ∫ | 0 | 1 | 0 | 1 | 0 | 0 | 0 | 0 | 1860 | 744 | 7441 | 1D11 |
|  | (330.0−) | 0 | 1 | 0 | 1 | 0 | 0 | 0 | 0 | (1877) | (755) | (7509) | (1D55) |
|  | (330.0+) | 0 | 1 | 0 | 0 | 0 | 0 | 0 | 0 | (1878) | (756) | (7510) | (1D56) |
|  | ∫ | 0 | 1 | 0 | 0 | 0 | 0 | 0 | 0 | 1894 | 766 | 7577 | 1D99 |
| * | 336.0− | 0 | 1 | 0 | 0 | 0 | 0 | 0 | 1 | 1911 | 777 | 7646 | 1DDD |
| * | 336.0+ | 0 | 1 | 0 | 0 | 0 | 0 | 1 | 0 | 1912 | 778 | 7646 | 1DDE |
|  | ∫ | 0 | 1 | 0 | 0 | 0 | 0 | 1 | 1 | 1928 | 788 | 7714 | 1E22 |
| ** | 342.0− | 0 | 1 | 0 | 0 | 0 | 1 | 1 | 1 | 1945 | 799 | 7782 | 1E66 |
| ** | 342.0+ | 0 | 1 | 0 | 0 | 1 | 0 | 1 | 1 | 1946 | 79A | 7783 | 1E67 |
|  | ∫ | 0 | 1 | 0 | 0 | 0 | 1 | 1 | 1 | 1962 | 7AA | 7850 | 1EAA |
| * | 348.0− | 0 | 1 | 0 | 0 | 1 | 1 | 1 | 0 | 1979 | 7BB | 7918 | 1EEE |
| * | 348.0+ | 0 | 1 | 0 | 0 | 1 | 0 | 0 | 1 | 1980 | 7BC | 7919 | 1EEF |
|  | ∫ | 0 | 1 | 0 | 0 | 1 | 1 | 0 | 0 | 1996 | 7CC | 7987 | 1F33 |
|  | (354.0−) | 0 | 1 | 0 | 0 | 1 | 0 | 0 | 0 | (2013) | (7DD) | (8055) | (1F77) |
|  | (354.0+) | 1 | 1 | 0 | 0 | 1 | 0 | 0 | 0 | (2014) | (7DE) | (8056) | (1F78) |
|  | ∫ | 1 | 1 | 0 | 0 | 1 | 0 | 0 | 0 | 2030 | 7EE | 8123 | 1FBB |
| ** | 360.0− | 1 | 1 | 0 | 0 | 1 | 0 | # | # | 2047 | 7FF | 8191 | 1FFF |
| ** | 360.0+ | 1 | 1 | 0 | 0 | 0 | 1 | # | # | 0 | 0 | 0 | 0 |

*: GRAY 1.
**: GRAY 2.
: do not care

Figure 34A:
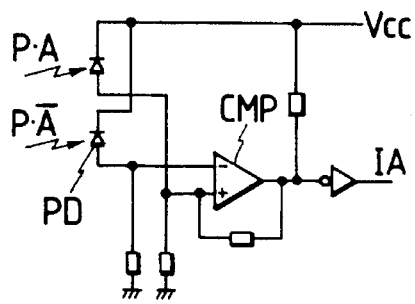
FIGS. 34(A) and 34(B) illustrate detection signal circuits including a differential type detection circuit and a reference voltage type detection circuit, respectively.
Figure 34B:
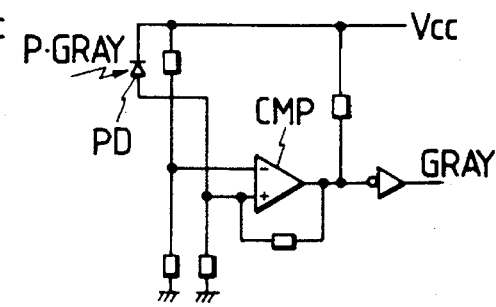

Below is a description of the detection circuit, already mentioned a number of times, wherein FIG. 34(A) shows a differential type detection circuit, and FIG. 34(B) depicts a reference voltage type detection circuit. The differential type detection circuit provides stable signals of high accuracy by capturing and comparing optical signals as reciprocal signals. The reference voltage type detection circuit is noted for its simple circuit construction because it simply discriminates optical signals with respect to a reference voltage.

Tables 3 through 6 summarize the above-described relations between inputs and outputs regarding the absolute position setting unit 127.

Figure 35:
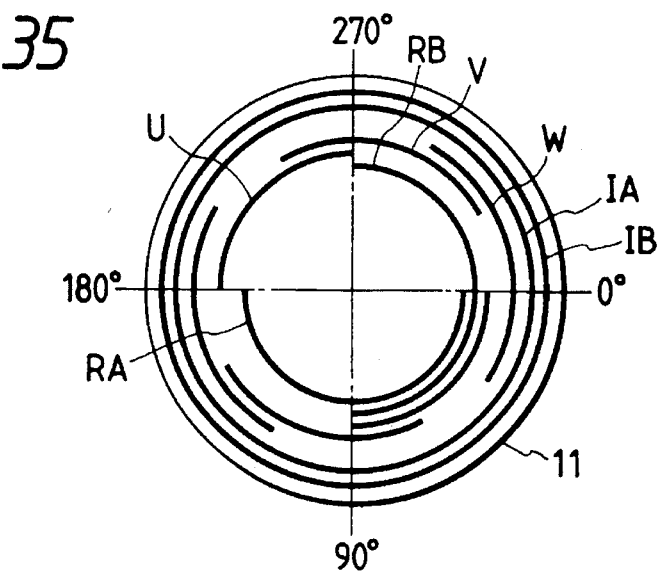
FIG. 35 illustrates an encoder disk slit pattern corresponding to a four-pole motor.
Figure 36:
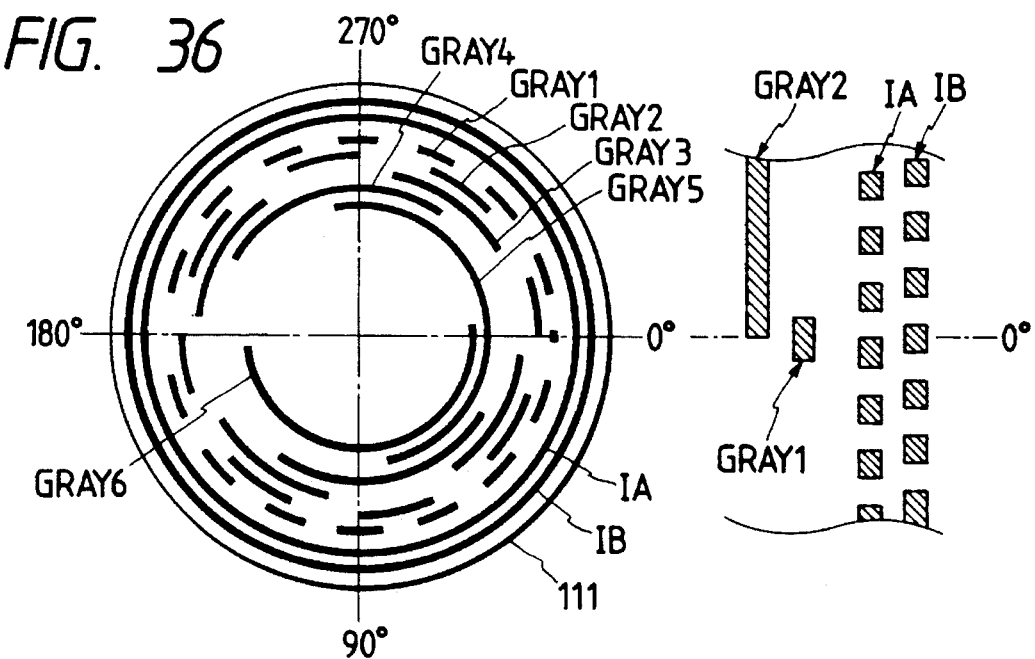
FIG. 36 illustrates an encoder disk slit pattern for generating special signals including gray code signals.

The signal patterns of encoder signals and their processing have been discussed. What follows is a description of the slit pattern formed on the rotating disk 111 with reference to FIGS. 35 and 36. The rotating disk 11, as shown in FIG. 35, has slits formed centripetally to represent signals, the outermost slit representing the signal requiring the highest accuracy. For an incremental encoder with U, V and W phases, the slits representing signals IB, IA, W, V, U, RB and RA are arranged centripetally, in that order. For an absolute position encoder of low resolution (e.g., the rotating disk 111 as shown in FIG. 36), the slits representing signals IB, TA, and gray signals GRAY1, GRAY2, GRAY3, GRAY4, GRAY5 and GRAY6 are formed centripetally, in that order with the right-side showing the slits in the region of 0° in enlarged form. Light beams from LED's pass through or reflect on the slits (shaded in the figure) and are received by photodiodes for conversion into voltage signals. The voltage signals are rectified in waveform by comparators, thereby constituting the High level of each of the signals mentioned above. That is, the slit pattern of FIG. 35 generates signals for use with a four-pole motor, while the slit pattern of FIG. 36 generates the signals for FIG. 32. Other slit patterns for generating signals shown in other figures may also be formed on the basis of the same principle.

Figure 37:
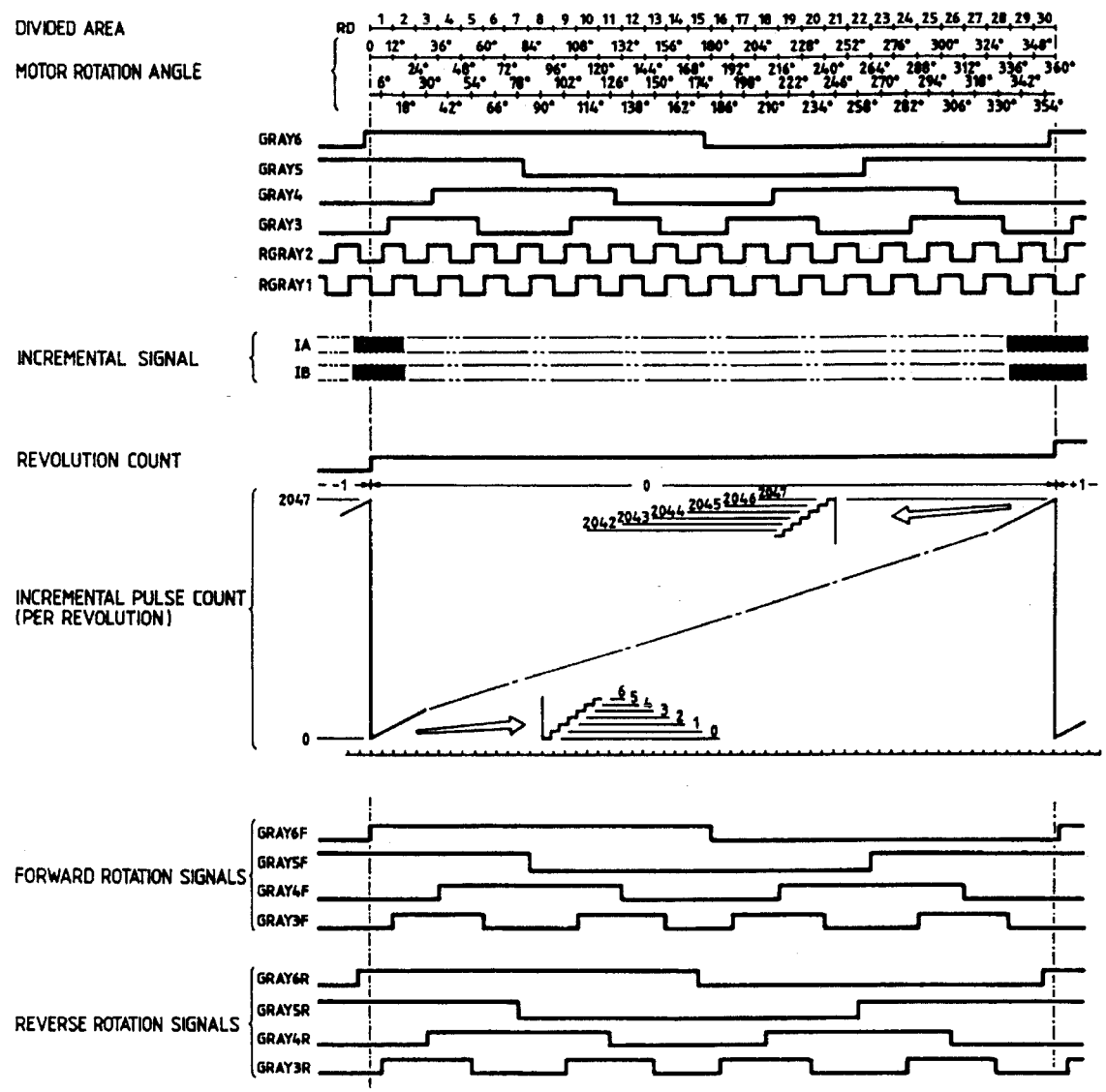
FIG. 37 illustrates encoder signals in effect when two-phase signals are used to generate a preset signal.

The examples above have dealt with gray code signals. Below is a description of an embodiment precisely arranged to use special signal patterns for reducing the amount of rotation after power-up. As shown in FIG. 37, this embodiment utilizes two-phase signals RGRAY2 and RGRAY1, 90° apart in phase, for detecting accurate positions. In FIG. 37, signals GRAY6 through GRAY3 need only be interposed between the edges of signals RGRAY2 and RGRAY1. For descriptive simplicity, it is assumed that the signals are dislodged about 3° from each edge. It is therefore assumed that the edges of the revolution count detection signals GRAY6 and GRAY5 are dislodged from the rotation angle of 0°, i.e., the edges of signal GRAY 6 positioned at 177.0° and 357.0°, the edges of signal GRAY5 at 81.0° and 261.0°. Likewise, it is assumed that the edges of signal GRAY4 are positioned at 33.0°, 129.0°, 213.0°, and 309.0°; and the edges of signal GRAY3 at 9.0°, 57.0°, 105.0°, 153.0°, 189.0°, 237.0°, 285.0° and 333.0°. The edges of signals RGRAY2 and RGRAY1 requiring sufficient positional accuracy for generating sampling pulses are depicted in FIG. 37. Illustratively, the edges of RGRAY2 are positioned at intervals of 12.0° starting from 6.0°, i.e., 6.0°, 18.0°, 30.0°, 42.0°, etc., and the edges of RGRAY1 are likewise positioned at intervals of 12.0° starting from 0.0°, i.e., 0.0°, 12.0°, 24.0°, 36.0°, etc. Signals RGRAY2 and RGRAY1 are detected by the differential detection circuit whereby locationally stable signals are obtained.

Figure 38:
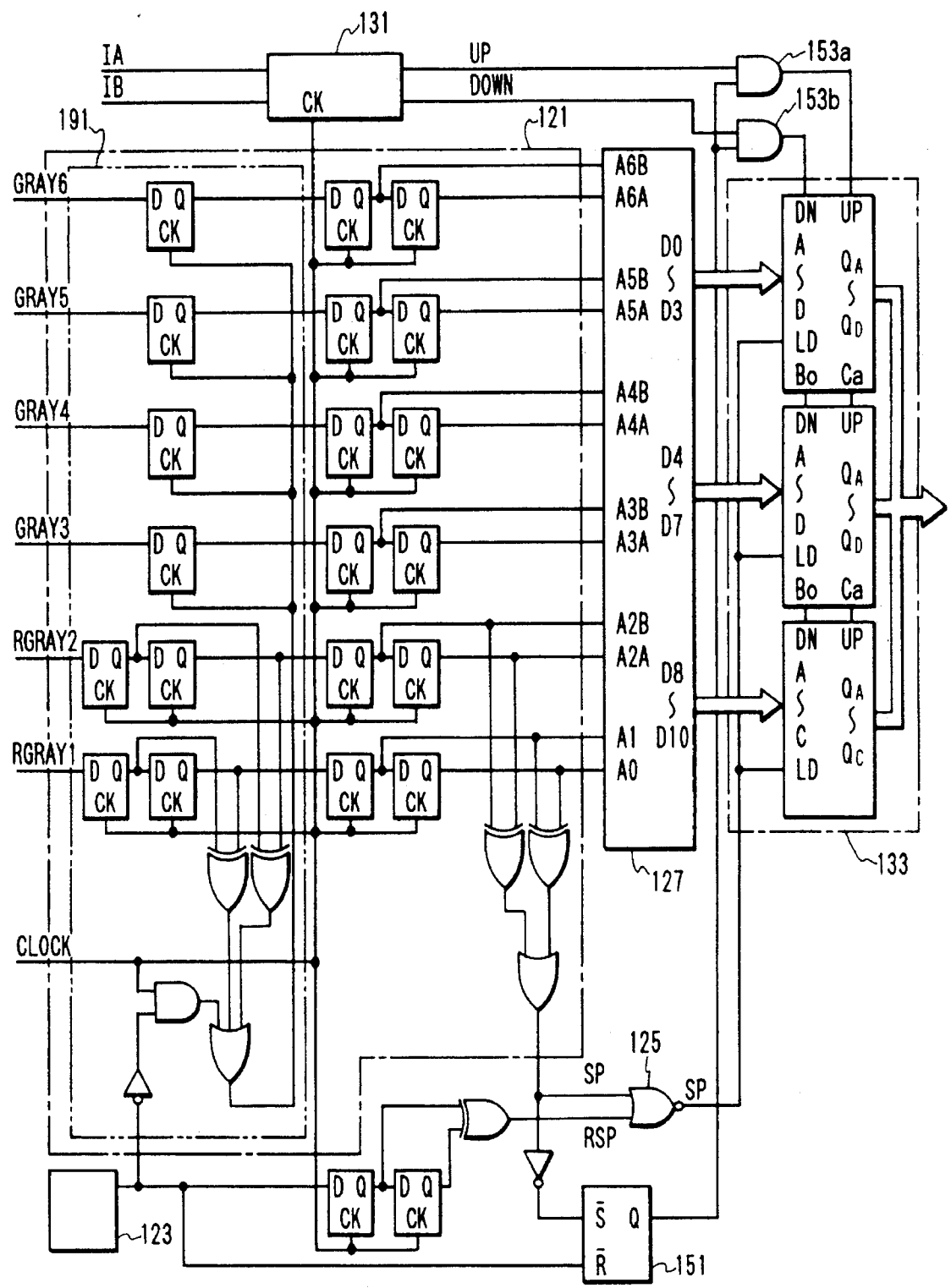
FIG. 38 illustrates a block circuit diagram of a portion of the encoder utilizing the signals of FIG. 37.

FIG. 38 illustrates a typical circuit for implementing this embodiment wherein each of the GRAY signals and RGRAY signals becomes an input signal to a slit signal synchronization circuit 191. The slit signal synchronization circuit 191 is made of two-stage D-FF's. The first-stage D-FF's sample signals RGRAY2 and RGRAY1. The edges of the two signals are detected by an exclusive-OR circuit. The detected edge signals, a reset signal and the clock signal are AND'ed to generate another signal. This is a D-FF sampling signal for sampling the GRAY signals. The above operations keep the GRAY signals synchronous with the RGRAY signals.

The operations described above correct the GRAY signals during forward rotation, positioning the edges of signal GRAY6F at 0.0° and 180.0°; the edges of signal GRAY5F at 84.0° and 264.0°; the edges of signal GRAY4F at 36.0°, 132.0°, 216.0° and 312.0°; and the edges of GRAY3F at 12.0°, 60.0°, 108.0°, 156.0°, 192.0°, 240.0°, 288.0° and 336.0°. Likewise, the GRAY signals are corrected during reverse rotation, the edges of signal GRAY6R positioned at 174.0° and 354.0°; the edges of signal GRAY5R at 78.0°, and 258.0°; the edges of signal GRAY4R at 30.0°, 126.0°, 210.0° and 306.0°; and the edges of GRAY3R at 6.0°, 54.0°, 102.0°, 150.0°, 186.0°, 234.0°, 282.0° and 330.0°. How these corrections take place is illustrated in FIG. 37. As seen in FIG. 38, the processing subsequent to signal correction is the same as the above-mentioned inventive processing based on the gray codes. That is, this embodiment is implemented by using the corrected signals of FIG. 37 and by following the steps based on the use of the above-mentioned gray code signals.

Tables 7 and 8 list data for use with the signal processing discussed.

TABLE 7

| | Code Condition | | | | | | Value | Established Data | | Generally Established Data | | | |
|---|---|---|---|---|---|---|---|---|---|---|---|---|---|
| | G6 | G5 | G4 | G3 | G2 | G1 | During | 2048P | 8192P | 2048P | | 8192P | |
| ANGLE | 32 | 16 | 8 | 4 | 2 | 1 | ON | (DEC) | (DEC) | (DEC) | (HEX) | (DEC) | (HEX) |
| 0–6 | 1 | 1 | 0 | 0 | 0 | 0 | 48 | 17 | 68 | | 17 | 11 | 68 | 44 |
| 6–9 | 1 | 1 | 0 | 0 | 1 | 0 | 50 | 52 | 205 | | 52 | 34 | 205 | CD |
| 9–12 | 1 | 1 | 0 | 1 | 1 | 0 | 54 | 120 | 571 | *W01 | 52 | 34 | 205 | CD |
| 12–18 | 1 | 1 | 0 | 1 | 1 | 1 | 55 | 86 | 342 | | 86 | 56 | 342 | 156 |
| 18–24 | 1 | 1 | 0 | 1 | 0 | 1 | 53 | 120 | 478 | | 120 | 78 | 478 | 1DE |
| 24–30 | 1 | 1 | 0 | 1 | 0 | 0 | 52 | 154 | 615 | | 154 | 9A | 615 | 267 |
| 30–33 | 1 | 1 | 0 | 1 | 1 | 0 | 54 | 120 | 578 | *W01 | 188 | BC | 751 | 3EF |
| 33–36 | 1 | 1 | 1 | 1 | 1 | 0 | 62 | 256 | 1024 | *W02 | 188 | BC | 751 | 2EF |
| 36–42 | 1 | 1 | 1 | 1 | 1 | 1 | 63 | 222 | 888 | | 222 | DE | 888 | 378 |
| 42–48 | 1 | 1 | 1 | 1 | 0 | 1 | 61 | 256 | 1024 | | 256 | 100 | 1024 | 400 |
| 48–54 | 1 | 1 | 1 | 1 | 0 | 0 | 60 | 291 | 1161 | | 291 | 123 | 1161 | 489 |
| 54–57 | 1 | 1 | 1 | 1 | 1 | 0 | 62 | 256 | 1024 | *W02 | 325 | 145 | 1297 | 511 |
| 57–81 | | | | | | | | | | *W03 | | | | |
| 81–105 | | | | | | | | | | *W04 | | | | |
| 105–129 | | | | | | | | | | *W05 | | | | |
| 129–153 | | | | | | | | | | *W06 | | | | |
| 153–177 | | | | | | | | | | *W07 | | | | |

TABLE 7-continued

| | | | | | | | | | | | | | | |
|---|---|---|---|---|---|---|---|---|---|---|---|---|---|---|
| 177~180 | 0 | 0 | 0 | 0 | 1 | 0 | 2 | 1016 | 4062 | | 1016 | 3F8 | 4062 | FDE |
| 180~186 | 0 | 0 | 0 | 0 | 1 | 1 | 3 | 1041 | 4164 | | 1041 | 411 | 4164 | 1044 |
| 186~189 | 0 | 0 | 0 | 0 | 0 | 1 | 1 | 1067 | 4267 | | 1067 | 428 | 4267 | 10AB |
| 189~213 | | | | | | | | | | *W08 | | | | |
| 213~237 | | | | | | | | | | *W09 | | | | |
| 237~261 | | | | | | | | | | *W10 | | | | |
| 261~285 | | | | | | | | | | *W11 | | | | |
| 285~309 | | | | | | | | | | *W12 | | | | |
| 309~333 | | | | | | | | | | *W13 | | | | |
| 333~336 | 0 | 1 | 0 | 0 | 0 | 1 | 17 | 1963 | 7851 | *W14 | 1895 | 767 | 7578 | 1D9A |
| 336~342 | 0 | 1 | 0 | 0 | 0 | 0 | 16 | 1929 | 7714 | | 1929 | 789 | 7714 | 1E22 |
| 342~348 | 0 | 1 | 0 | 0 | 1 | 0 | 18 | 1963 | 7851 | | 1963 | 7AB | 7851 | 1EAB |
| 348~354 | 0 | 1 | 0 | 0 | 1 | 1 | 19 | 1997 | 7987 | | 1997 | 7CD | 7987 | 1F33 |
| 354~357 | 0 | 1 | 0 | 0 | 0 | 1 | 17 | 1963 | 7851 | *W14 | 2031 | 7EF | 8124 | 1FBC |
| 357~360 | 1 | 1 | 0 | 0 | 0 | 1 | 49 | 2031 | 8124 | | 2031 | 7EF | 8124 | 1FBC |

| ANGLE | Value During ON | Established Data 2048P (DEC) | Established Data 8192P (DEC) | Corrected Calculated Value forward | Rev. |
|---|---|---|---|---|---|
| 0–6 | 48 | 17 | 68 | 48 | 48 |
| 6–9 | 50 | 52 | 205 | 50 | 54 |
| 9–12 | 54 | 120 | 478 | 50 | 54 |
| 12–18 | 54 | 120 | 478 | 55 | 55 |
| 18–24 | 54 | 120 | 478 | 53 | 53 |
| 24–30 | 54 | 120 | 478 | 52 | 52 |
| 30–33 | 54 | 120 | 478 | 54 | 61 |
| 33–36 | 62 | 256 | 1024 | 54 | 62 |
| 36–42 | 62 | 256 | 1024 | 63 | 63 |
| 42–48 | 62 | 256 | 1024 | 61 | 61 |
| 48–54 | 62 | 256 | 1024 | 60 | 60 |
| 54–57 | 62 | 256 | 1024 | 62 | 58 |
| 57–81 | | | | | |
| 81–105 | | | | | |
| 105–129 | | | | | |
| 129–153 | | | | | |
| 153–177 | | | | | |
| 177–180 | 2 | 1016 | 4062 | 34 | 2 |
| 180–186 | 3 | 1041 | 4164 | 3 | 3 |
| 186–189 | 1 | 1067 | 4267 | 1 | 5 |
| 189–213 | | | | | |
| 213–237 | | | | | |
| 237–261 | | | | | |
| 261–285 | | | | | |
| 285–309 | | | | | |
| 309–333 | | | | | |
| 333–336 | 17 | 1963 | 7851 | 21 | 17 |
| 336–342 | 17 | 1963 | 7851 | 16 | 16 |
| 342–348 | 17 | 1963 | 7851 | 18 | 18 |
| 348–354 | 17 | 1963 | 7851 | 19 | 19 |
| 354–357 | 17 | 1963 | 7851 | 17 | 49 |
| 357–360 | 49 | 2031 | 8124 | 17 | 49 |

TABLE 8

| ANGLE | Calculated Value | Forward Rotation A6B | A6A | A5B | A5A | A4B | A4A | A3B | A3A | Common A2B | A2A | A1 | A0 | 2048P Established Data (DEC) | (HEX) | 8192P Established Data (DEC) | (HEX) |
|---|---|---|---|---|---|---|---|---|---|---|---|---|---|---|---|---|---|
| 0.0+ | 48 | 1 | 0 | 1 | 1 | 0 | 0 | 0 | 0 | 0 | 0 | 1 | 0 | 0 | 0 | 0 | 0 |
| 6.0+ | 50 | 1 | 1 | 1 | 1 | 0 | 0 | 0 | 0 | 1 | 0 | 1 | 1 | 35 | 23 | 137 | 89 |
| 12.0+ | 55 | 1 | 1 | 1 | 1 | 0 | 0 | 1 | 0 | 1 | 1 | 0 | 1 | 69 | 45 | 274 | 112 |
| 18.0+ | 53 | 1 | 1 | 1 | 1 | 0 | 0 | 1 | 1 | 0 | 1 | 0 | 0 | 103 | 67 | 410 | 19A |
| 24.0+ | 52 | 1 | 1 | 1 | 1 | 0 | 0 | 1 | 1 | 0 | 0 | 1 | 0 | 137 | 89 | 547 | 223 |
| 30.0+ | 54 | 1 | 1 | 1 | 1 | 0 | 0 | 1 | 1 | 1 | 0 | 1 | 1 | 171 | AB | 683 | 2AB |
| ∫ | ∫ | . | . | . | . | . | . | . | . | . | . | . | . | ∫ | ∫ | ∫ | ∫ |
| 174.0+ | 34 | 1 | 1 | 0 | 0 | 0 | 0 | 0 | 0 | 1 | 0 | 0 | 0 | 990 | 3DE | 3960 | F78 |
| 180.0+ | 3 | 0 | 1 | 0 | 0 | 0 | 0 | 0 | 0 | 1 | 1 | 1 | 0 | 1024 | 400 | 4096 | 1000 |
| 186.0+ | 1 | 0 | 0 | 0 | 0 | 0 | 0 | 0 | 0 | 0 | 1 | 1 | 1 | 1059 | 423 | 4233 | 1089 |

TABLE 8-continued

| ANGLE | Calculated Value | A6B | A6A | A5B | A5A | A4B | A4A | A3B | A3A | A2B | A2A | A1 | A0 | 2048P (DEC) | (HEX) | 8192P (DEC) | (HEX) |
|---|---|---|---|---|---|---|---|---|---|---|---|---|---|---|---|---|---|
| ∫ | ∫ | . | . | . | . | . | . | . | . | . | . | . | . | ∫ | ∫ | ∫ | ∫ |
| 330.0+ | 21 | 0 | 0 | 1 | 1 | 0 | 0 | 1 | 1 | 0 | 1 | 0 | 0 | 1878 | 756 | 7510 | 1D56 |
| 336.0+ | 16 | 0 | 0 | 1 | 1 | 0 | 0 | 0 | 1 | 0 | 0 | 1 | 0 | 1912 | 778 | 7646 | 1DDE |
| 342.0+ | 18 | 0 | 0 | 1 | 1 | 0 | 0 | 0 | 0 | 1 | 0 | 1 | 1 | 1946 | 79A | 7783 | 1E67 |
| 348.0+ | 19 | 0 | 0 | 1 | 1 | 0 | 0 | 0 | 0 | 1 | 1 | 0 | 1 | 1980 | 7BC | 7919 | 1EEF |
| 354.0+ | 17 | 0 | 0 | 1 | 1 | 0 | 0 | 0 | 0 | 0 | 1 | 0 | 0 | 2014 | 7DE | 8056 | 1F78 |
| 360.0+ | 48 | 1 | 0 | 1 | 1 | 0 | 0 | 0 | 0 | 0 | 0 | 1 | 0 | 0 | 0 | 0 | 0 |

| | Calculated | Reverse Rotation | | | | | | | | Common | | | | 2048P | | 8192P | |
|---|---|---|---|---|---|---|---|---|---|---|---|---|---|---|---|---|---|
| ANGLE | Value | A6B | A6A | A5B | A5A | A4B | A4A | A3B | A3A | A2B | A2A | A1 | A0 | (DEC) | (HEX) | (DEC) | (HEX) |
| 0.0– | 49 | 1 | 1 | 1 | 1 | 0 | 0 | 0 | 0 | 0 | 0 | 0 | 1 | 2047 | 7FF | 8191 | 1FFF |
| 6.0– | 48 | 1 | 1 | 1 | 1 | 0 | 0 | 0 | 1 | 0 | 1 | 1 | 1 | 34 | 22 | 136 | 88 |
| 12.0– | 54 | 1 | 1 | 1 | 1 | 0 | 0 | 1 | 1 | 1 | 1 | 1 | 0 | 68 | 44 | 273 | 111 |
| 18.0– | 56 | 1 | 1 | 1 | 1 | 0 | 0 | 1 | 1 | 1 | 0 | 0 | 0 | 102 | 66 | 409 | 199 |
| 24.0– | 53 | 1 | 1 | 1 | 1 | 0 | 0 | 1 | 1 | 0 | 0 | 0 | 1 | 136 | 88 | 546 | 222 |
| 30.0– | 52 | 1 | 1 | 1 | 1 | 0 | 1 | 1 | 1 | 0 | 1 | 1 | 1 | 170 | AA | 682 | 2AA |
| ∫ | ∫ | . | . | . | . | . | . | . | . | . | . | . | . | ∫ | ∫ | ∫ | ∫ |
| 174.0– | 32 | 1 | 0 | 0 | 0 | 0 | 0 | 0 | 0 | 0 | 1 | 0 | 0 | 989 | 3DD | 3959 | F77 |
| 180.0– | 2 | 0 | 0 | 0 | 0 | 0 | 0 | 0 | 0 | 1 | 1 | 0 | 1 | 1023 | 3FF | 4095 | FFF |
| 186.0– | 3 | 0 | 0 | 0 | 0 | 0 | 0 | 0 | 1 | 1 | 0 | 1 | 1 | 1058 | 422 | 4232 | 1088 |
| ∫ | ∫ | . | . | . | . | . | . | . | . | . | . | . | . | ∫ | ∫ | ∫ | ∫ |
| 330.0– | 23 | 0 | 0 | 1 | 1 | 0 | 0 | 1 | 0 | 1 | 0 | 0 | 0 | 1877 | 755 | 7509 | 1D55 |
| 336.0– | 17 | 0 | 0 | 1 | 1 | 0 | 0 | 0 | 0 | 0 | 0 | 0 | 1 | 1911 | 777 | 7645 | 1DDD |
| 342.0– | 16 | 0 | 0 | 1 | 1 | 0 | 0 | 0 | 0 | 0 | 1 | 1 | 1 | 1945 | 799 | 7782 | 1E66 |
| 348.0– | 18 | 0 | 0 | 1 | 1 | 0 | 0 | 0 | 0 | 1 | 1 | 1 | 0 | 1979 | 7BB | 7918 | 1EEE |
| 354.0– | 19 | 0 | 1 | 1 | 1 | 0 | 0 | 0 | 0 | 1 | 0 | 0 | 0 | 2013 | 7DD | 8055 | 1F77 |
| 360.0– | 49 | 1 | 1 | 1 | 1 | 0 | 0 | 0 | 0 | 0 | 0 | 0 | 1 | 2047 | 7FF | 8191 | 1FFF |

For a clear understanding of the states involved, these tables show combinations of signals in the form of values. Signals GRAY6 through GRAY1 are weighted with 32, 16, 8, 1, 2 and 1, respectively. The High level of each signal is represented by "1" and the Low level thereof by "0". In this manner, the states of the signals are represented by numbers ranging from 1 to 63.

Prior to signal correction, there exist 14 overlapping states in effect upon power-up (*W01–*W14; for example, the range of 9° through 12° indicated by *W01 overlaps with the range of 30° through 33° at value 54). But after signal correction, the overlapping states disappear. Because after rotation, there is no adverse effect of the overlap and hence no associative problem, the processes involved are the same as before; only the set data to be in effect upon power-up need to be devised appropriately.

Table 7 lists typical data which are output using the RSP signal upon power-up for use with the absolute position setting unit 127. The data may be set in one of two ways, "generally" or "integrally." One way is to set data generally, which means dividing the data corresponding to values into as small groups as possible. Since there occur cases in which three states overlap with one another (e.g., the ranges of 9° to 1220, of 18° to 24° and of 30° to 33° overlap with respect to decimal data 120), both ends of the data in question are terminated with specific data (decimal data 100). This clearly shows the states to overlap with one another. That in turn makes special the processing upon power-up (e.g., only when the applicable data is output, is the initial rotation angle set to ±3°). The other way to set the data is to do so integrally, which means setting all overlapping ranges to the same data.

Table 8 lists typical input and output data to and from the absolute position setting unit 127, the data being processed using the SP signal after rotation.

Figure 39:
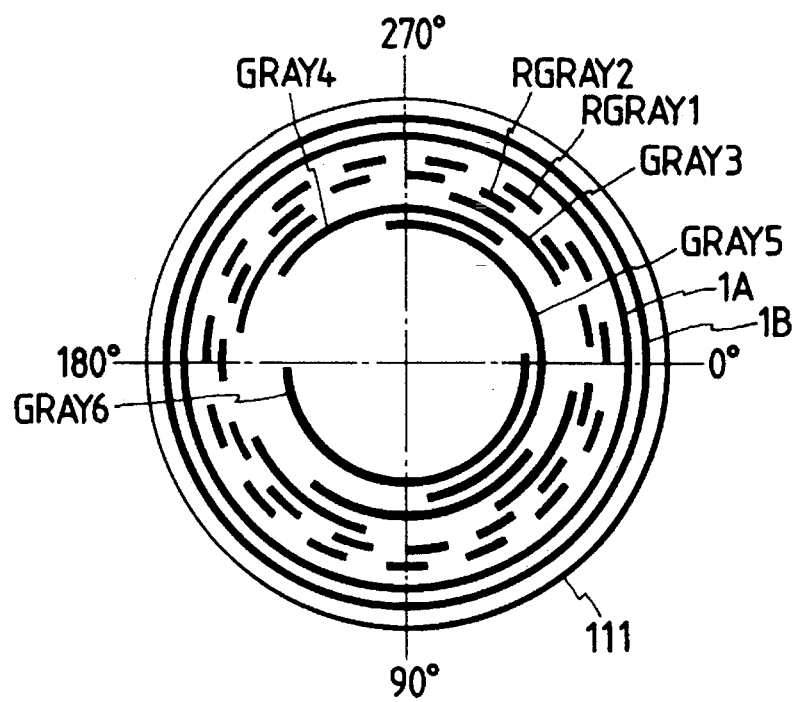
FIG. 39 illustrates an encoder disk slit pattern for use where two-phase signals are used to generate a preset signal.

Referring to FIG. 39, the slit pattern formed on the rotating disk 111 of this embodiment will be described further. As described with reference to FIGS. 36, the rotating disk 111 comprises slits corresponding centripetally to the incremental signals IB and IA, signals RGRAY1 and RGRAY2 for accurate position detection, and gray code signals GRAY3, GRAY4, GRAY5 and GRAY6, in that order. It is known that 90-degree phase difference signals may be produced from one slot by suitably disposing photodiodes PD's. Using this scheme allows a single slit to generate the two-phase signals GRAY6 and GRAY5, signals RGRAY2 and RGRAY1, and incremental signals IA and IB. In combination with signals GRAY4 and GRAY3, a total of five slits can constitute an encoder embodying the invention. In this manner, the encoder may be further downsized. If another slit is added to the rotating disk, the six slits provide non-overlapping signals of 60 divisions. That is, all that is needed is to obtain a signal by dividing the GRAY1 signal in two. The edges of such a signal, RGRAY1H, may be positioned at 0.0°, 24.0°, 48.0°, 72.0°, 96.0°, 120.0°, 144.0°, 168.0°, 180.0°, 204.0°, 228.0°, 252.0°, 276.0°, 300.0°, 324.0° and 342.0°.

Although several embodiments of the invention have been described separately, they may also be used in varying degrees of combination. The data that are preset to the counter 133 at the edges of the CS signals U, V and W (GRAY signals) may differ from those shown in Tables 1 through 8 for such reasons as constraints on encoder manufacture and combination with servo amplifiers. In the above embodiments, the preset signal SP is generated at edges of the CS signals U, V and W (GRAY signals). Alternatively, the preset signal SP may be a Z-phase signal for conventional encoders; the signal may also be a preset signal generated from a preset signal generating slit having special codes for preset operation. Thus approximate data may be preset to the counter 133. Furthermore, a signal synchronization circuit, two examples of which are shown in FIGS. 28 and 29 (with phase U only), may be interposed between the comparator output and the rotating position detector 121 in FIG. 20. The addition of the signal synchronization circuit, when implemented, makes the relationship unique between the edges of the pole position signal phases U, V and W on the one hand, and the edges of the incremental signal phases A and B on the other.

Described so far are the cases involving general use of slits (gray codes) on the rotating disk. Below is a description of an encoder utilizing the so-called M series that has been finding wider acceptance in recent years. One such encoder is disclosed in Japanese Patent Laid-Open No. 2-132324. The disclosed encoder employs M series random numbers constituting recurring patterns of $(2^k-1)$ different codes, wherein a pattern of adjacent k bits is read at any given time. Because only one pattern exists on a given circumference, an absolute position on the circumference is thereby identified. An M series type encoder according to the present invention first obtains the transition point of an absolute position by reading the k-bit pattern. The encoder then uses the transition point to determine the position in which to generate the sampling pulse SP as well as the data to be preset to the counter. The preset data for use upon power-up may be provisional values based on the absolute position obtained by reading the k-bit pattern.

Figure 40:
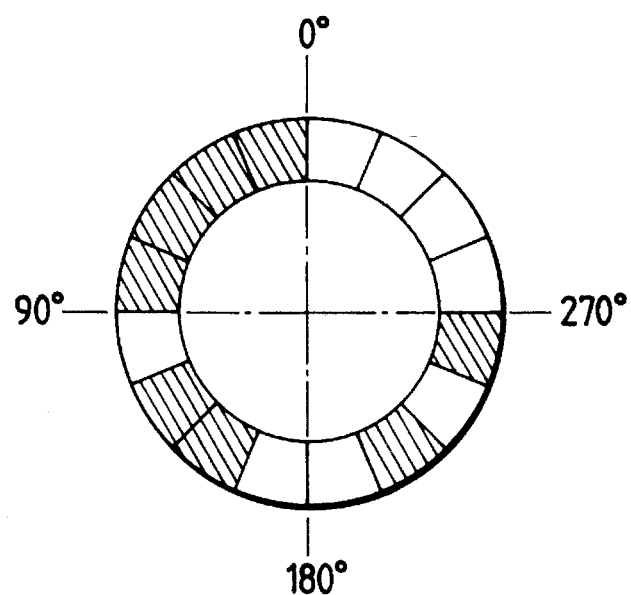
FIG. 40 illustrates rotary type encoder slit pattern based on the M series.

The M series type encoder embodying the invention will now be described in more detail with reference to FIGS. 40 and 41. FIG. 40 shows a rotary type slit pattern in which one revolution is divided into 16 regions. In FIG. 40, a hatched portion corresponds to "1" and a blank portion to "0" so that a given state made of four divided regions is detected by a detector. FIG. 41 illustrates a representative linear type slit pattern. As with the pattern of FIG. 40, the slit pattern of FIG. 41 allows a given state constituted by four divided regions to be detected by detector. The detected signals are the same whether they derive from the rotary type or linear type slit pattern. These signals represent values for the 16 divided regions (Nos. 1–16), and these values are listed in Table 9.

TABLE 9

| NO | $R_3$ | $R_2$ | $R_1$ | $R_0$ | Rotary Type | Linear Type |
|----|-------|-------|-------|-------|-------------|-------------|
| 1  | 1 | 1 | 1 | 1 | ○ | ○ |
| 2  | 1 | 1 | 1 | 0 | ○ | ○ |
| 3  | 1 | 1 | 0 | 1 | ○ | ○ |
| 4  | 1 | 0 | 1 | 1 | ○ | ○ |
| 5  | 0 | 1 | 1 | 0 | ○ | ○ |
| 6  | 1 | 1 | 0 | 0 | ○ | ○ |
| 7  | 1 | 0 | 0 | 1 | ○ | ○ |
| 8  | 0 | 0 | 1 | 1 | ○ | ○ |
| 9  | 0 | 1 | 0 | 1 | ○ | ○ |
| 10 | 1 | 0 | 1 | 0 | ○ | ○ |
| 11 | 0 | 1 | 0 | 0 | ○ | ○ |
| 12 | 1 | 0 | 0 | 0 | ○ | ○ |
| 13 | 0 | 0 | 0 | 0 | ○ | ○ |

TABLE 9-continued

| NO | $R_3$ | $R_2$ | $R_1$ | $R_0$ | Rotary Type | Linear Type |
|----|-------|-------|-------|-------|-------------|-------------|
| 14 | 0 | 0 | 0 | 1 | ○ | — |
| 15 | 0 | 0 | 1 | 1 | ○ | — |
| 16 | 0 | 1 | 1 | 1 | ○ | — |

Referring to FIG. 41, the operations of the reset sampling pulse RSP and the sampling pulse SP are described on the assumption that a leading edge of the incremental signal IA exists in a position coinciding with the transition point of each divided region of the M series slit pattern. It is also assumed that the signals detected by detector for output derive from an M series slit configuration involving a detecting section R3 (i.e., the state in effect upon detector output changes after all ranges detected by R3 have completed their shift relative to one of the divided regions D1 through D16 of the M series slit pattern).

If power is applied substantially at the center of the D2 region, a reset sampling pulse RSP is generated in that position. Then approximate data corresponding to the D2 region is preset to the above-mentioned counter. In accordance with the preset data, the encoder is rotatably or linearly operated. This causes the transition point of the region to be reached, and a sampling pulse is generated (SP-1 from D2 to D1; SP+1 from D3 to D3). Since the transition point indicates a specific absolute position, the sampling pulse is used in the manner described to preset that absolute position to the counter. Thereafter, counting the incremental signals provides an absolute position whose resolution is higher than that of the absolute position obtained conventionally with the M series.

Although the above operations have been described in connection with the rotary type slit pattern example, they may also be applied to the linear type. The invention, embodied as optical encoders above, is not limited thereto and may also be applied to other types of encoders such as magnetic encoders. In the embodiments described, units 121 and 127 are each made of a combination of function tables such as elements FF and a ROM. Alternatively, the functions of these components may be taken over by the CPU.

The invention offers the following major benefits:

(1) There is no need to furnish the rotating disk with a slit pattern indicating the absolute position per revolution, thus making it possible to use an encoder disk having phases U, V and W. This feature reduces the dimensions of the encoder and lowers the number of the parts involved. Smaller size and fewer parts boost encoder reliability.

(2) Reductions in size and part count make it possible to manufacture the encoder at about half the cost for producing equivalent conventional absolute value encoders (e.g., at 20,000 yen to 30,000 yen in Japan).

(3) Because incremental pulses are counted to determine absolute values, the positional resolution is enhanced by simply raising the resolution of the incremental signal. This can be accomplished in easy and simple steps.

(4) The switch from a four-pole encoder setup to an eight-pole encoder setup or vice versa is addressed by modifying the contents of the absolute value setting means. That is, a simple switching arrangement utilizing a ROM or the like may be used.

As described above, the present invention provides a multiple revolution encoder that is small in size and low in manufacturing cost. Edges of commutation signals U, V and W are detected by a rotating position detector, and position data per revolution, which is determined by the position where an edge is generated, is set and output by an absolute value setting unit. The output is set in an incremental pulse counter. After setting, the counter is incremented or decremented based on the output from incremental pulse count detector that receives incremental signals IA and IB. Thereafter, the counter always indicates the absolute value. The output of the counter and that of revolution counter are serially output via a modem. These parts and their operations constitute an absolute value encoder. With no need to furnish a slit pattern for absolute value detection, the encoder is made small, comprises fewer parts, and thus offers enhanced reliability. The manufacturing cost is about half of what it takes to produce equivalent conventional encoders. The positional resolution is readily enhanced by simply increasing incremental signals.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. An encoder for indicating a position of a relatively movable member and for generating at least two signals which are offset in phase from one another in accordance with movement of the movable member, comprising:

a position indicating member having a first pattern with a first period and a second pattern with a portion varying over an interval longer than an interval of the first period corresponding to a predetermined position in the first pattern;

first detecting means for detecting the first pattern, the first detecting means being disposed relatively movable with respect to the position indicating member;

second detecting means for detecting the second pattern, the second detecting means being disposed relatively movable with respect to the position indicating member;

signal generating means connected with the first detecting means for generating a signal indicative of direction and amount of movement in accordance with the first pattern;

setting means connected with the second detecting means for detecting the predetermined position and for setting a value corresponding to the predetermined position in the first pattern; and a presetable counter connected with the signal generating means and the setting means for receiving an output of the setting means and for setting a count in accordance therewith, for counting an output of the signal generating means and for outputting an absolute value corresponding to an actual position of the position indicating member.

2. An encoder according to claim 1, wherein the position indicating member includes an encoding member rotating in accordance with the movement of the movable member.

3. An encoder according to claim 2, wherein the presetable counter counts an incremental signal after being set for the absolute position, and further comprising communication means for outputting an absolute position signal indicative of the position of the movable member in accordance with the incremental signal count value of the presetable counter.

4. An encoder according to claim 2, wherein the presetable counter counts an incremental signal after being set for the absolute position, and further comprising means for indicating a revolution count of the number of revolutions of the encoding member, an absolute value generating means for combining the revolution count with the incremental signal count value of the presetable counter after setting of the presetable counter so as to enable outputting of an absolute position signal indicative of the position of the movable member.

5. An encoder according to claim 1, further comprising a battery connected to at least a portion of the encoder having means for indicating a revolution count of a number of revolutions of the position indicating member for supplying power thereto in the absence of an external power source.

6. An encoder according to claim 1, further comprising a servo member for driving the movable member, the encoder being coupled to the servo motor, the encoder providing an absolute position signal to a servo amplifier means, the servo amplifier means generating a motor command signal for driving the servo motor.

7. An encoder according to claim 6, wherein the movable member is part of an industrial robot.

8. An encoder according to claim 7, wherein the movable member is a wrist mechanism of the industrial robot.

9. An encoder according to claim 1, wherein said setting means utilizes an M series signal for setting the value.

10. An encoder according to claim 2, wherein a value of the presetable counter indicative of revolutions of the rotating position of the encoding member is corrected in accordance with one state selected from a group having signal states derived from codes indicating absolute positions and including states of different phases.

11. A servo system comprising an encoder for indicating a position of a servo member of a servo motor as a relatively movable member and for generating at least two signals which are offset in phase from one another in accordance with movement of the servo motor, comprising:

a position indicating member having a first pattern with a first period and a second pattern with a portion varying over an interval longer than an interval of the first period corresponding to a predetermined position in the first pattern;

first detecting means for detecting the first pattern, the first detecting means being disposed relatively movable with respect to the position indicating member;

second detecting means for detecting the second pattern, the second detecting means being disposed relatively movable with respect to the position indicating member;

signal generating means connected with the first detecting means for generating a signal indicative of direction and amount of movement in accordance with the first pattern;

setting means connected with the second detecting means for detecting the predetermined position and for setting a value corresponding to the predetermined position in the first pattern;

a presetable counter connected with the signal generating means and the setting means for receiving an output of the setting means and for setting a count in accordance therewith, for counting an output of the signal generating means and for outputting an absolute value corresponding to an actual position of the position indicating member as an output of the encoder; and a servo amplifier for generating a motor current in response to the output of the encoder, the servo motor being responsive to the motor current for being driven in accordance therewith.

12. A servo system according to claim 11, wherein the servo motor is coupled to a part of an industrial robot.

13. A servo system according to claim 12, wherein the part of the industrial rotor is a wrist mechanism of the industrial robot.

14. An industrial robot comprising an encoder for indicating a position of a servo member of a servo motor as a relatively movable member and for generating at least two signal which are offset in phase from one another in accordance with movement of the servo member, comprising:
- a position indicating member having a first pattern with a first period and a second pattern with a portion varying over an interval longer than an interval of the first period corresponding to a predetermined position in the first pattern;
- first detecting means for detecting the first pattern, the first detecting means being disposed relatively movable with respect to the position indicating member;
- second detecting means for detecting the second pattern, the second detecting means being disposed relatively movable with respect to the position indicating member;
- signal generating means connected with the first detecting means for generating a signal indicative of direction and amount of movement in accordance with the first pattern;
- setting means connected with the second detecting means for detecting the predetermined position and for setting a value corresponding to the predetermined position in the first pattern;
- a presetable counter connected with the signal generating means and the setting means for receiving an output of the setting means and for setting a count in accordance therewith, for counting an output of the signal generating means and for outputting an absolute value corresponding to an actual position of the position indicating member as an output of the encoder; and a servo amplifier for generating a motor current in response to the output of the encoder, the servo motor being responsive to the motor current for being driven in accordance therewith.

15. An industrial robot according to claim 14, wherein the encoder and the servo motor are disposed in a rest mechanism of the industrial robot.

16. An method for operating an encoder which indicates a position of a movable member comprising the steps of:
- supplying power to the encoder;
- setting tentative position data in a presetable counter on the basis of a signal generated by the encoder when power is supplied;
- moving the movable member until an accurate position value of the movable member is detected;
- setting the detected accurate position value in the presetable counter; and
- counting with the presetable counter an incremental signal indicative of direction and amount of movement of the movable member after setting the detected accurate position value in the presetable counter.

17. A method of operating an encoder indicating a position of a relatively movable member having a first pattern with a first period and a second pattern with a portion varying over an interval longer than the first period, comprising the steps of:
- supplying power to the encoder;
- setting tentative position data in a presetable counter on the basis of the signal generated when the power is supplied to the encoder
- moving the movable member until an accurate position value of the movable member is detected;
- setting the detected accurate position value in the presetable counter; and
- counting with the presetable counter an incremental signal indicative of direction and amount of movement of the movable member after setting the detected accurate position value in the presetable counter.

18. An encoder for indicating a position of a rotatable movable member and for generating at least two signals which are offset in phase from one another in accordance with movement of the movable member, comprising position detecting means, and a presettable counter, the position detecting means including means for detecting a rough absolute position of the movable member, means for generating a rough position signal indicating the rough absolute position, means for detecting at least one reference position, and means for generating a position reference signal indicating the at least one reference position during rotational movement of the movable member, and the presettable counter being preset for an absolute value of each revolution with respect to the reference position during rotational movement of the movable member when the position reference signal is generated.

19. An apparatus for at least indicating a position of a relatively movable member, comprising:
- a position indicating member providing position data for the relatively movable member including rough absolute position data, accurate reference position data and an amount of movement data;
- detecting means for detecting the rough absolute position data, the accurate reference position data and the movement data;
- a counter; and
- setting means for setting a value indicative of an accurate absolute position in the counter based on the rough absolute position data when the accurate reference position data is detected by the detecting means;
- wherein the counter counts the amount of movement data after the setting means sets the value indicative of the accurate absolute position.

20. An apparatus according to claim 19, wherein the apparatus includes an encoder for indicating the relatively movable member.

21. An apparatus according to claim 20, wherein the apparatus includes a servo system comprising a servo motor for moving the relatively movable member, the encoder for indicating the position of the relatively movable member, and a servo amplifier for generating current for the servo motor.

22. An apparatus according to claim 20, wherein the apparatus includes an industrial robot comprising a servo motor for moving the relatively movable member, the encoder for indicating the relatively movable member, a servo amplifier for generating current for the servo motor, and a part of the industrial robot where the servo motor is coupled, the servo amplifier generating the current for the servo motor in response to the output of the encoder.

23. An apparatus for at least indicating a position of a relatively movable member, comprising:

means for providing a roughly resolved absolute position data indicating a rough position of the relatively movable member;

means for providing a finely resolved data which is more accurate than the roughly resolved absolute position data, the finely resolved data indicating a position of the relatively movable member;

outputting means responsive to the roughly resolved absolute position data and the finely resolved data, the outputting means initially providing an output corresponding to a rough absolute position value based upon the roughly resolved absolute position data; and adjusting means for adjusting the outputting means;

wherein the outputting means is responsive to adjustment by the adjusting means for changing over the output thereof so that the outputting means outputs an output corresponding to an accurate absolute position value which is more accurate than the rough absolute position value with the resolution of the finely resolved data based on the finely resolved data.

24. An apparatus according to claim 23, wherein the apparatus includes an encoder.

25. An apparatus according to claim 24, wherein the apparatus includes a servo system comprising a servo motor for moving the relatively movable member, the encoder for indicating the position of the relatively movable member, and a servo amplifier for generating current for the servo motor, the servo amplifier generating the current for the servo motor in response to the output of the encoder.

26. An apparatus for at least indicating a position of a relatively movable member, comprising:

a position indicating member having rough absolute position data, accurate reference position data corresponding to a predetermined point of the relatively movable member, and movement data which is more accurate than the rough absolute position data;

detecting means for detecting the rough absolute position data, the accurate reference position data and the movement data; and generating means for initially generating a rough position value based on the detected rough absolute position data and thereafter generating an accurate position value based on the detected accurate reference position data.

27. An apparatus according to claim 26, wherein the apparatus includes an encoder.

28. An apparatus according to claim 27, wherein the apparatus includes a servo system comprising a servo motor for moving the relatively movable member, the encoder for indicating the position of the relatively movable member, and a servo amplifier for generating current for the servo motor, the servo amplifier generating the current for the servo motor in response to the output of the encoder.

29. An apparatus according to claim 26, wherein the apparatus includes an industrial robot comprising a servo motor for moving the relatively movable member, the encoder for indicating the position of the relatively movable member, a servo amplifier for generating current for the servo motor, and a part of the industrial robot wherein the servo motor is coupled, the servo amplifier generating a motor current in response to the output of the encoder.

30. A method for operating an apparatus which at least indicates a position of a movable member, comprising the steps of:

moving the movable member;

detecting rough position data corresponding to a rough absolute pattern on the movable member;

detecting a position of an accurate reference position data corresponding to a predetermined point of the movable member;

setting an accurate absolute position value in a counter based on the rough position data corresponding to the detection of the position of the accurate reference position data; and counting an amount of movement data of the movable member after setting the accurate absolute position value, wherein the movement data is more accurate than the rough absolute position data.

31. A method according to claim 30, wherein the apparatus includes an encoder which indicates the position of the movable member.

32. A method according to claim 31, wherein the apparatus includes a servo system, further comprising the steps of:

generating a motor current in response to the amount of movement data; and driving the servo system in accordance with the motor current.

33. A method for operating an apparatus which at least indicates a position of a relatively movable member, comprising the steps of:

generating roughly resolved absolute data indicating a rough position of the relatively movable member;

generating finely resolved absolute data which is more accurate than the roughly resolved data, the finely resolved absolute data indicating a position of the relatively movable member;

outputting by an outputting means a rough absolute position value based on the roughly resolved absolute data which is rougher than a movement data; and controlling the outputting by the outputting means for changing over from the outputting of the rough absolute position value based upon the roughly resolved absolute data to outputting a value based upon a finely resolved absolute data which is more finely resolved and more accurate than the roughly resolved absolute data.

34. A method according to claim 33, wherein the apparatus includes an encoder which indicates the position of the relatively movable member.

35. A method according to claim 33, wherein the apparatus includes a servo system and the relatively movable member is a servo member, further comprising the step of driving the servo system in accordance with the roughly resolved data and the accurately resolved data.

36. A method for operating an apparatus which at least indicates a position of a position indicating member, comprising the steps of:

detecting a rough absolute position data indicating a rough position of the position indicating member and amount of movement data of the position indicating member;

generating a rough absolute position value based on the detected rough absolute position data;

generating a position signal which is finer than the rough absolute position data; and initially providing an output of the rough absolute position value and changing over the rough absolute position value to provide an output of the position signal.

37. A method according to claim 36, wherein the apparatus includes an encoder which indicates the position of the position indicating member.

38. A method according to claim 36, wherein the apparatus includes a servo system, further comprising the step of driving the servo system in accordance with the rough position value and the accurate position value.

39. An industrial robot comprising a servo motor moving a relatively movable member, an encoder for indicating a position of the relatively movable member and a servo amplifier for generating a current for the servo motor, the encoder including:

means for providing a roughly resolved absolute position data indicating a rough position of said relatively movable member;

means for providing a finely resolved data which is more accurate than the roughly resolved absolute position data, the finely resolved data indicating a position of said relatively movable member;

outputting means responsive to the roughly resolved absolute position data and the finely resolved data, the outputting means initially providing an output corresponding to a rough absolute position value based upon the roughly resolved absolute position data; and adjusting means for adjusting the outputting means, wherein the outputting means is responsive to adjustment by the adjusting means for changing over the output thereof so that the outputting means outputs an output corresponding to an accurate absolute position value which is more accurate than said rough absolute position value with the resolution of the finely resolved data based on the finely resolved data, and the servo motor is coupled with the outputting means, and the servo amplifier generates a current for the servo motor in response to the output of the encoder.

* * * * *